United States Patent [19]

Oz et al.

[11] Patent Number: 5,872,960
[45] Date of Patent: *Feb. 16, 1999

[54] INTEGRATED CIRCUIT HAVING CPU CORE OPERABLE FOR SWITCHING BETWEEN TWO INDEPENDENT ASYNCHRONOUS CLOCK SOURCES OF DIFFERENT FREQUENCIES WHILE THE CPU CONTINUES EXECUTING INSTRUCTIONS

[75] Inventors: Oved Oz, Cfar Saba; Gideon Intrater, Tel Aviv; Yachin Afek, Cfar Saba, all of Israel

[73] Assignee: National Semiconductor Corporation, Santa Clara, Calif.

[*] Notice: The term of this patent shall not extend beyond the expiration date of Pat. No. 5,603,017.

[21] Appl. No.: 624,879

[22] Filed: Mar. 27, 1996

Related U.S. Application Data

[63] Continuation of Ser. No. 309,546, Sep. 20, 1994, Pat. No. 5,603,017, which is a continuation of Ser. No. 63,412, May 18, 1993, abandoned, which is a division of Ser. No. 806,082, Dec. 6, 1991, abandoned.

[51] Int. Cl.$^6$ ........................................................ G06F 1/04
[52] U.S. Cl. ................ 395/556; 395/800.35; 395/800.43
[58] Field of Search .......................... 395/800.35, 800.34, 395/556, 800.23, 800.43; 375/354, 357

[56] References Cited

U.S. PATENT DOCUMENTS

| | | | |
|---|---|---|---|
| 5,261,082 | 11/1993 | Ito et al. | 395/556 |
| 5,274,678 | 12/1993 | Ferolito et al. | 375/357 |
| 5,293,586 | 3/1994 | Yamazaki et al. | 395/800.34 |
| 5,381,542 | 1/1995 | Carlson | 395/556 |
| 5,448,597 | 9/1995 | Hashimoto | 375/354 |
| 5,481,697 | 1/1996 | Mathews et al. | 395/556 |
| 5,675,615 | 10/1997 | Watt | 375/354 |

Primary Examiner—Larry D. Donaghue
Attorney, Agent, or Firm—Limbach & Limbach L.L.P.

[57] ABSTRACT

An integrated data processing system includes a shared internal bus for transferring both instructions and data. A shared bus interface unit is connected to the shared internal bus and connectable via a shared external bus to a shared external memory array such that instructions and data held in the shared external memory array are transferrable to the shared internal bus via the shared bus interface unit. A general purpose (GP) central processing unit (CPU) is connected to the shared internal bus for retrieving GP instructions. The GP CPU includes an execution unit for executing GP instructions to process data retrieved by the GP CPU from the shared internal bus. A digital signal processor (DSP) module connected to the shared internal bus, the DSP module includes a signal processor for processing an externally-provided digital signal received by the DSP module by executing DSP command-list instructions. Execution of DSP command-list code instructions by the DSP module is independent of and in parallel with execution of GP instructions by the GP CPU. A shared internal memory that holds command-list code instructions and is connected for access by the DSP module for retrieval of command-list code instructions for execution by the DSP module and for access by the GP CPU for storage and retrieval of instructions and data.

2 Claims, 40 Drawing Sheets

Microfiche Appendix Included
(2 Microfiche, 36 Pages)

INTEGRATED CIRCUIT HAVING CPU CORE OPERABLE FOR SWITCHING BETWEEN TWO INDEPENDENT ASYNCHRONOUS CLOCK SOURCES OF DIFFERENT FREQUENCIES WHILE THE CPU CONTINUES EXECUTING INSTRUCTIONS

This is a continuation of application Ser. No. 08/309,546, filed Sep. 20, 1994, now U.S. Pat. No. 5,603,017, which is a continuation of application Ser. No. 08/063,412, now abandoned, filed May 18, 1993, which is a divisional of application Ser. No. 07/806,082, filed Dec. 6, 1991, now abandoned, for integrated Data Processing System Including CPU Core and Parallel, Independently Operating DSP Module.

COPYRIGHT NOTICE

A portion of the disclosure of this patent document contains material which is subject to copyright protection. The copyright owner, National Semiconductor Corporation, has no objection to the facsimile reproduction by anyone of the patent document or the patent disclosure, as it appears in the Patent and Trademark Office patent file or records, but otherwise reserves all copyright rights whatsoever.

MICROFICHE APPENDIX

This application is submitted with microfiche appendices A and B. Appendix A consists of one (1) microfiche with twenty-one (21) frames. Appendix B consists of one (1) microfiche and fifteen (15) frames.

BACKGROUND OF THE INVENTION

1. Field of the Invention

The present invention relates to integrated data processing systems and, in particular, to a processor system that integrates the functions of both a general purpose CPU core and a parallel, independently operating digital signal processor (DSP) module, and wherein the system is capable of implementing glitchless switching between different asynchronous frequencies.

2. Discussion of the Prior Art

Commonly assigned and co-pending U.S. patent application Ser. No. 467,148, filed Jan. 18, 1990, by Intrater et al. for INTEGRATED DIGITAL SIGNAL PROCESSOR/GENERAL PURPOSE CPU WITH SHARED INTERNAL MEMORY, now U.S. Pat. No. 5,630,153, discloses a data processing system that utilizes integrated general purpose processor (i.e., the National Semiconductor Corp. 32FX16 embedded processor) and digital signal processor (DSP) functions that are connected for common access to an internal shared memory array. The shared memory array stores the operands for a set of basic DSP operations that can be executed by the DSP function. The sequence of DSP operations to be executed by the DSP function is selectively configurable by the general purpose processor function; that is, the general purpose processor can define a variety of DSP algorithms that can be executed by the DSP function for processing different digital input signal formats.

In addition to storing the operands required by the DSP function for execution of a DSP algorithm, the internal shared memory array also stores selected instructions and data required by the general purpose processor function for execution of general purpose tasks. The operands, instructions and data may be selectively loaded to the internal shared memory array from system memory. After execution of a DSP algorithm, the corresponding information set may be down-loaded from the internal memory array to system memory and a new information set retrieved for execution of a subsequent DSP algorithm or a new general purpose processor task.

Thus, the general purpose processor selects a DSP algorithm for conditioning and recovering digital data from the incoming signal. That is, the general purpose processor selects from the set of basic DSP operations to define a specific sequence of DSP operations appropriate for processing the incoming signal. The general purpose processor then retrieves operands required for execution of the selected DSP algorithm and/or instructions and data critical to the general purpose processor for controlling the DSP function or for performing general purpose tasks and loads them into the internal shared memory array. Next, the general purpose processor invokes the first DSP operation in the selected sequence and the DSP function performs the DSP operation utilizing operands retrieved by the DSP function from both the shared memory array and system memory. Upon completion of the DSP operation by the DSP function, the general purpose processor function either reads the result of the DSP operation, invokes the next DSP operation in the selected sequence or performs a general purpose task.

While the input signal to the data processing system may be received directly from a digital source, the system described in the above-identified application includes an analog front end that converts a modulated input signal received on an analog channel to corresponding digital signal for processing by the data processing system.

Thus, the above-described data processing system provides unique system partitioning by integrating a small DSP module and a general purpose processor. This unique partitioning provides a single processor solution for both DSP and general purpose computations that can utilize the same programming model and the same system development tools for both functions. The DSP module provides the capability necessary to handle a variety of DSP requirements. The internal shared memory allows the DSP algorithms to be tuned or changed or new algorithms to be added to meet changing, expanding system requirements. General purpose, computation intensive tasks can also be executed directly from the internal shared memory.

While the above-described system provides a unique and innovative architecture for many DSP applications, it lacks the DSP computing capability that could be provided by a solution that integrates the general purpose function and a parallel, independently-operable DSP function on the same integrated circuit chip.

(U.S. patent application Ser. No. 467,148, including its Appendix A, are hereby incorporated by reference to provide additional background information regarding the invention disclosed herein.)

SUMMARY OF THE INVENTION

The present invention is directed to an integrated data processing system. The integrated data processing system includes a shared internal bus for transferring both instructions and data. A shared bus interface unit is connected to the shared internal bus and connectable via a shared external bus to a shared external memory array such that instructions and data held in the shared external memory array are transferrable to the shared internal bus via the shared bus interface unit. A general purpose (GP) central processing unit (CPU) is connected to the shared internal bus for retrieving GP instructions. The GP CPU includes means for executing GP instructions to process data retrieved by the GP CPU from the shared internal bus. A digital signal processor (DSP) module connected to the shared internal bus, the DSP module includes means for processing an externally-provided digital signal received by the DSP module by executing DSP command-list instructions. A shared internal memory that holds command-list code instructions and is connected for access by the DSP module for retrieval of command-list code instructions for execution by the DSP module and for access by the GP CPU for storage and retrieval of instructions and data. The system is capable of glitchless switching between different asynchronous operating frequencies.

A better understanding of the features and advantages of the present invention will be obtained by reference to the following detailed description and accompanying drawings which set forth an illustrative embodiment in which the principles of the invention are utilized.

DESCRIPTION OF THE DRAWINGS

FIGS. 2A-1 and 2A-2 are a block diagram illustrating an integrated data processing system as in FIG. 1 operable in an internal ROM mode.

FIG. 2A' is a schematic representation of a loader read operation.

DETAILED DESCRIPTION OF THE INVENTION

I. General Description

Figure 1:
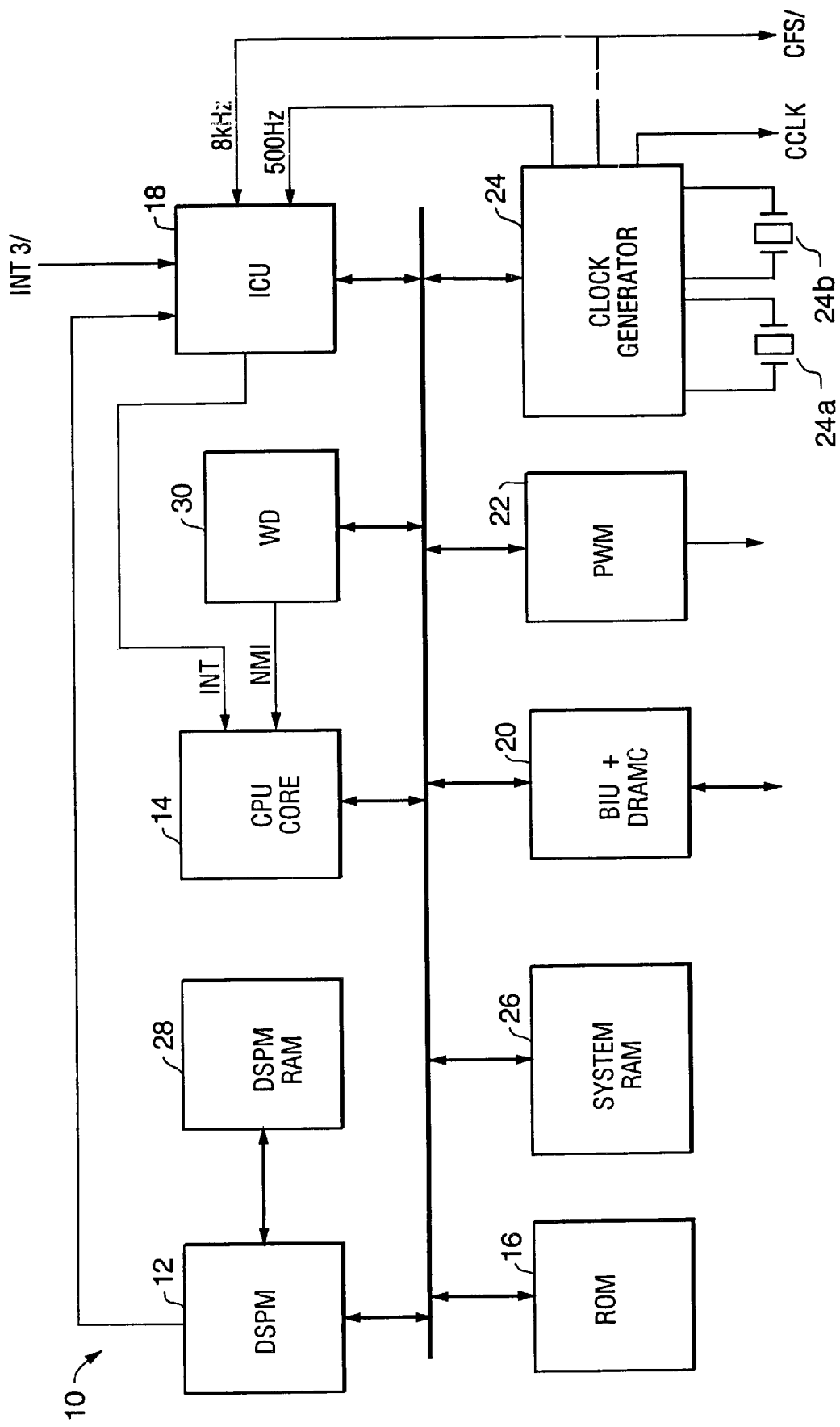
FIG. 1 is a block diagram illustrating an integrated data processing system in accordance with the present invention.

FIG. 1 shows an integrated data processing system 10 that is tuned for digital (tapeless) answering machine applications. The data processing system 10 integrates the functions of both a digital signal processor module (DSPM) 12 and a general purpose CPU core 14. As will be described in greater detail below, the system 10 supports functions such as DRAM control, interrupt control, pulse width modulation, CODEC interface, Watch Dog timing and clock generation. The system 10 can execute instructions from either its on-chip ROM 16 or from external ROM.

II. Functions

The data processing system 10 is tuned to perform the three main functions of a digital answering machine: system control, voice compression/decompression and dual tone multi-frequency (DTMF) detection.

The system control function includes a user interface via a keyboard and display handling. The system control function also controls the phone line and monitors the activity on the line. The system control function also keeps track of the time and detects power failures.

The voice compression/decompression function performs transformations between voice samples and compressed digital data. The on-chip DSPM 12 allows the running of different voice handling algorithms, such as GSM, Sub-Band Coding and LPC.

The DTMF function monitors the incoming data to detect any DTMF signaling. DTMF signals are used as commands for the system control function to change the current state of the answering machine.

The system 10 is operable in three different system configurations:

Internal ROM Mode

Figures 1, 2A:
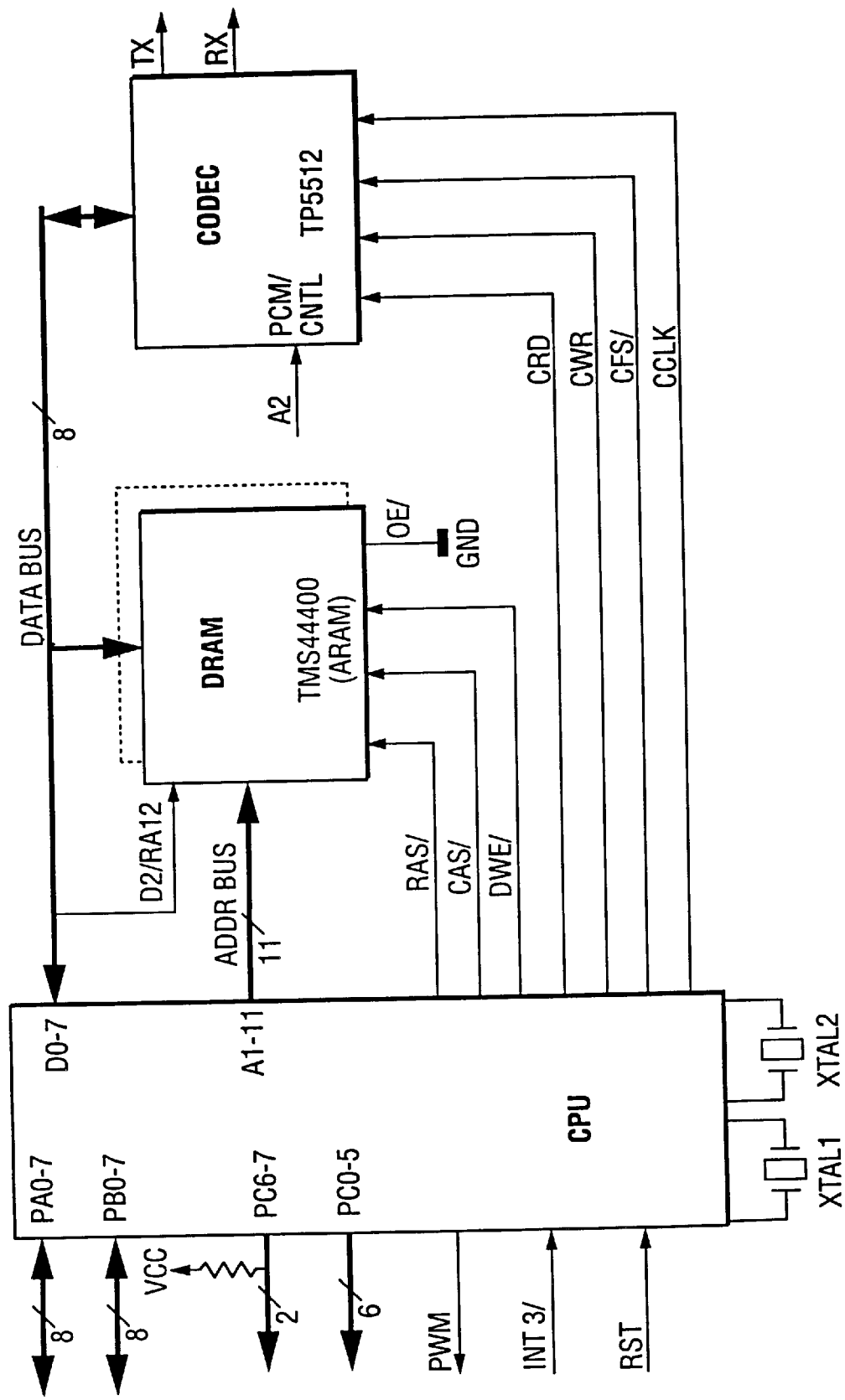
Figures 2, 2A:
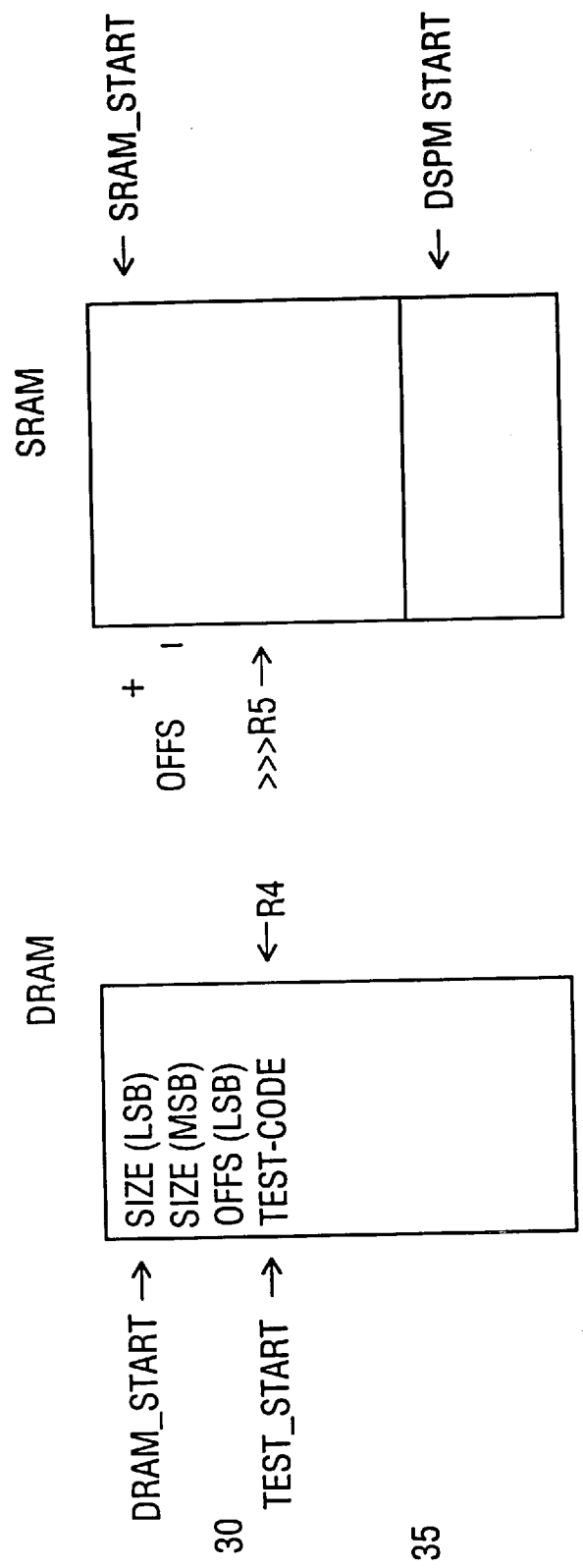

The system 10 in its Internal ROM mode provides the lowest chip count for a full digital answering machine solution. In this mode, the system 10 provides up to 32 Kbytes of on-chip program ROM and three on-chip general purpose I/O ports. FIG. 2A shows a digital answering machine based on the system 10 in its Internal ROM mode.

The system 10 provides testing hook functions to facilitate production testing in the Internal ROM mode. As stated above, in this mode, the entire system operation is on-chip, with most reads and writes being from internal memories.

The testing hook functions are:

a) ability to load program instructions from a tester into on-chip RAM and execute from the on-chip RAM.

This routine is intended to allow testability of system functions while in the Internal ROM mode, since in this mode the system 10 regularly executes the internal ROM application software.

The routine is part of the software in the ROM. In order to allow flexible testing, this routine loads the test-code from the external DRAM into internal RAM and jumps into it. It is the test-code's responsibility to loop/exit/halt.

The routine is invoked by the system application software if, after Reset, it senses a strap-pin (PB0) low.

As shown in FIG. 2A, the loader reads the first WORD @DRAM which specifies the SIZE of the test, i.e. how many bytes to load. Then it reads a WORD which specifies the OFFSET from SRAM start. Then it loops, loading this amount of bytes from the external DRAM into internal RAM, and then executes a "jump" to the internal RAM+OFFSET. If the OFFSET+SIZE are more than 1008 bytes, then the remaining bytes are loaded into the DSPM RAM 28. The test-code is responsible in execution-time for jumping accordingly.

b) reflect on-chip databus activity on pins for testing.

c) synchronize on-chip clock to externally generated clock.

External ROM Mode

Figure 2B:
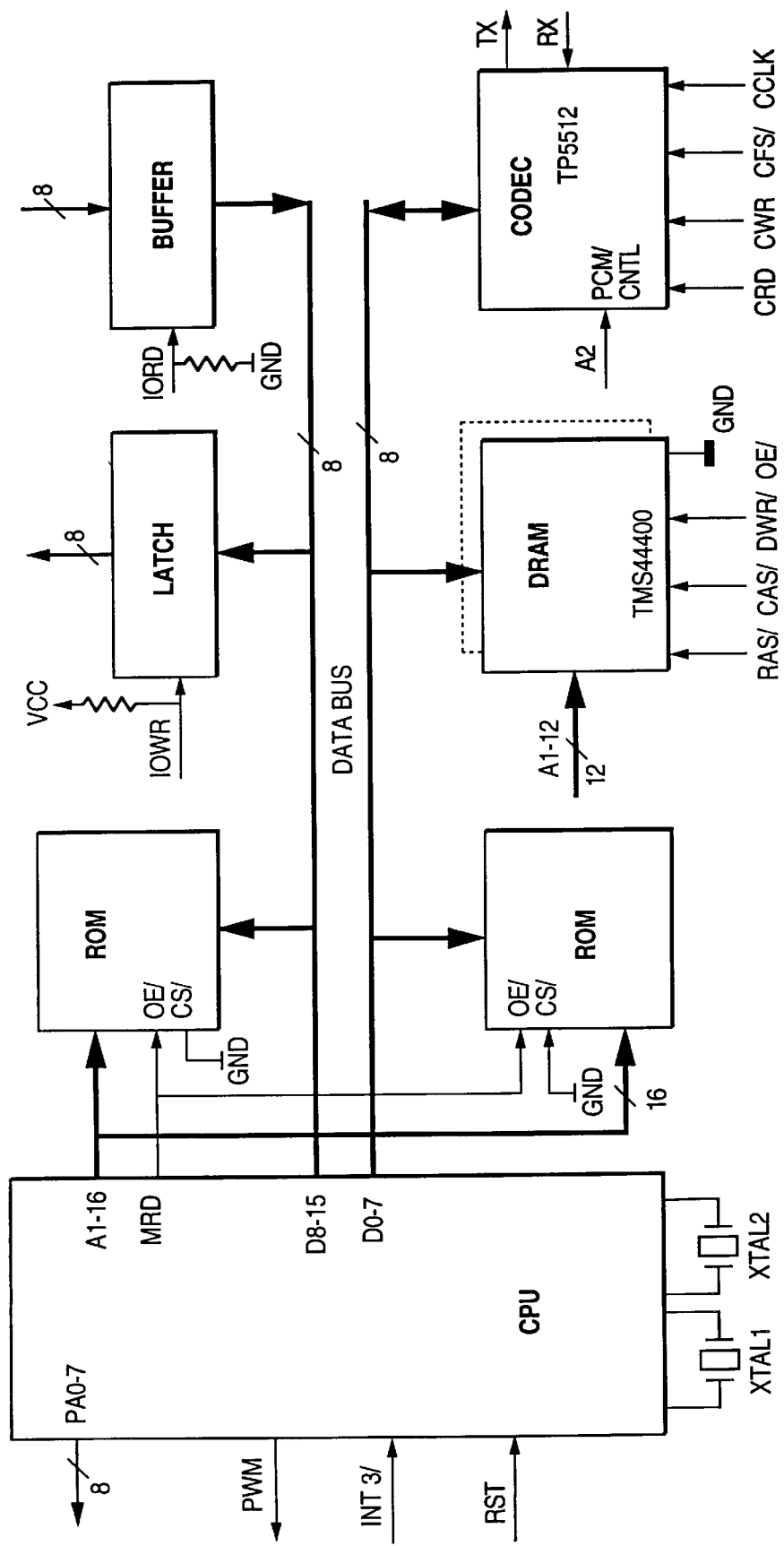
FIG. 2B is a block diagram illustrating an integrated data processing system as in FIG. 1 operable in an external ROM mode.

The system 10 in its External ROM mode allows program flexibility in digital answering machine applications. In this mode, an external ROM can be attached to the system 10 to provide a fast way of changing the answering machine's program. One on-chip general purpose I/O port is provided and two other I/O ports can be added with minimal logic. FIG. 2B shows a digital answering machine based on the system 10 in its External ROM mode.

Development Mode

Figure 2C:
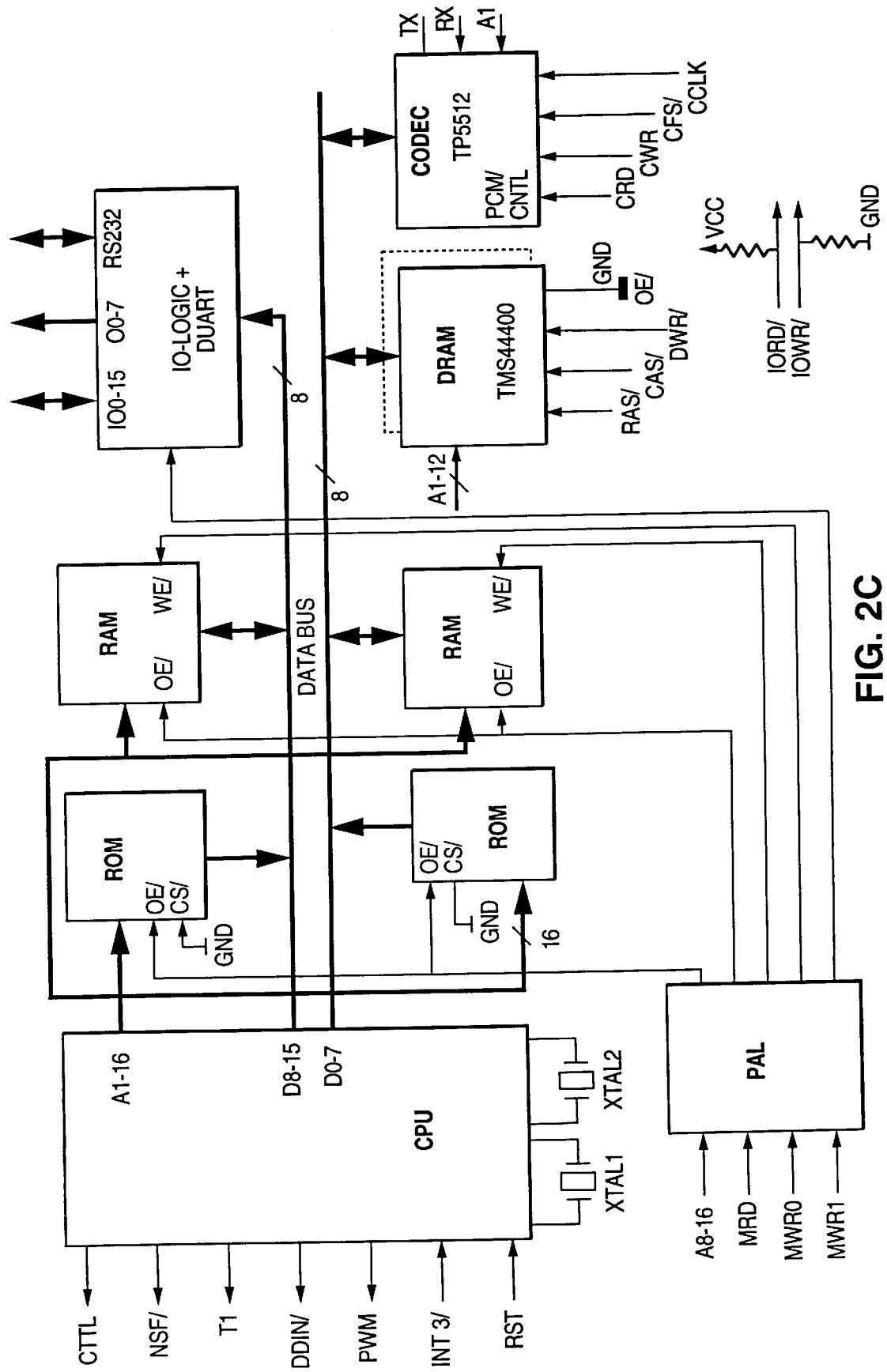
FIG. 2C is a block diagram illustrating an integrated data processing system as in FIG. 1 operable in a development mode.

Evaluation boards and testing are based on the system 10 in its Development mode. In this mode, external ROM, RAM and I/O devices can be connected to the system 10. Some pins are used to reflect the internal status of the system 10. No on-chip I/O ports are provided in this mode. FIG. 2C shows an evaluation board based on the system 10 in its Development mode.

III. External Interface

As shown in FIGS. 2A–2C, the system 10 interfaces in the digital answering machine system with a CODEC, DRAM and various I/O signals. In the External ROM mode, it also interfaces with external ROMs, a latch and a buffer. In the Development mode, it also interfaces with SRAMs and a DUART and provides some status signals for device testing.

Figure 3:
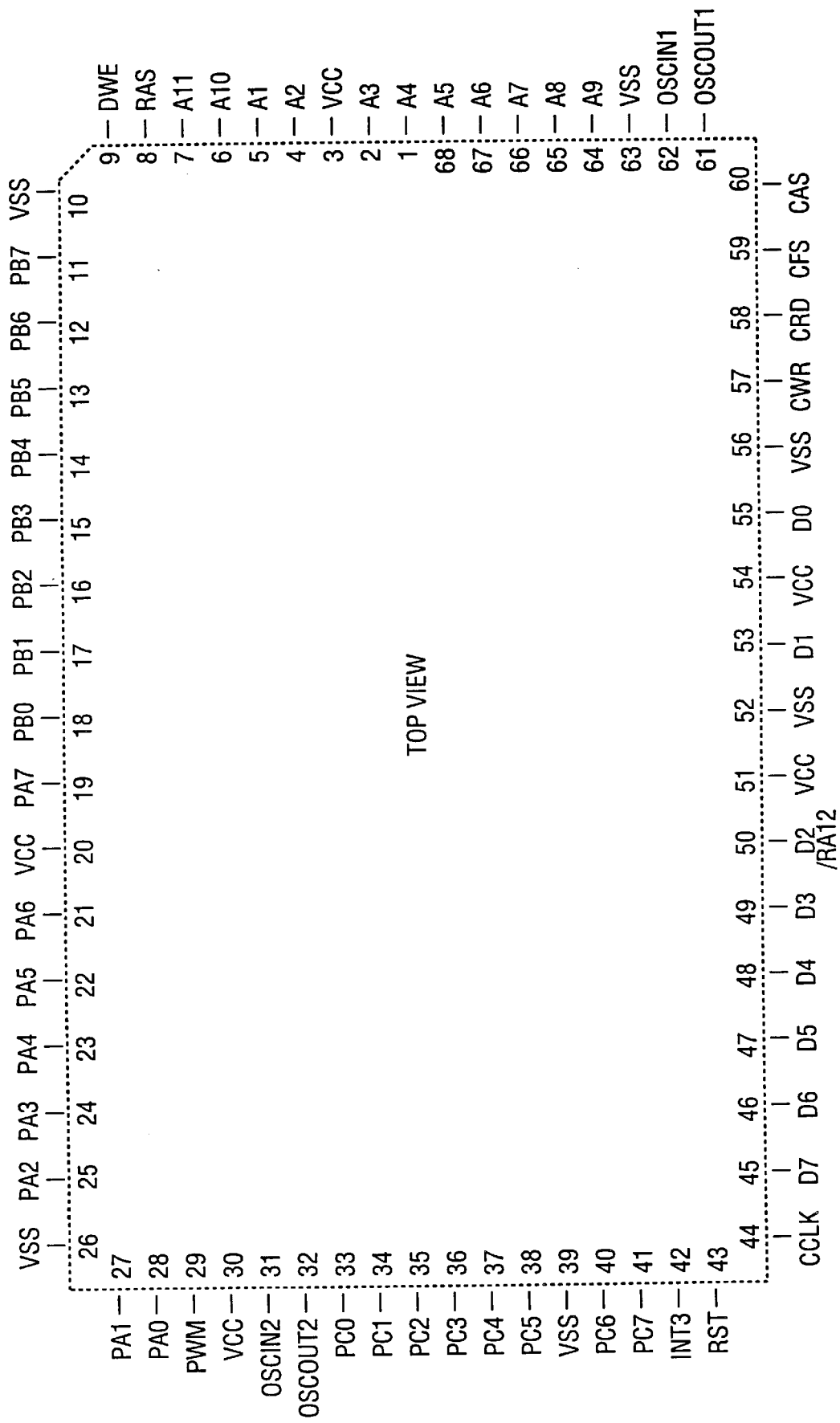
FIG. 3 is a representation of one possible set of pin assignments of an integrated data processing system in accordance with the present invention.
Figure 4:
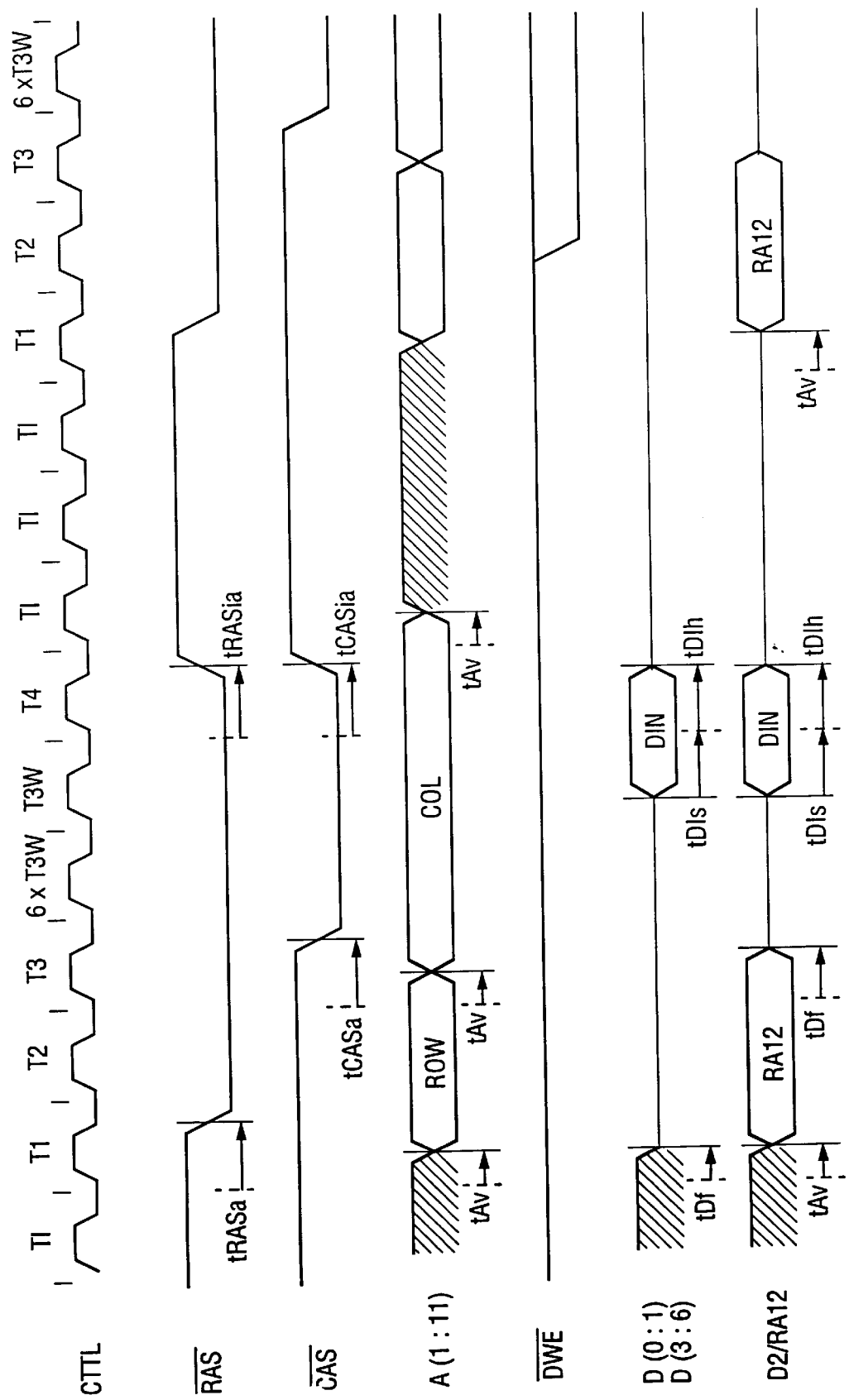
FIGS. 4–16, 17A, 17B, 17C, 18, 19A and 19B are timing diagrams illustrating the operation of an integrated data processing system in accordance with the present invention.
Figure 5:
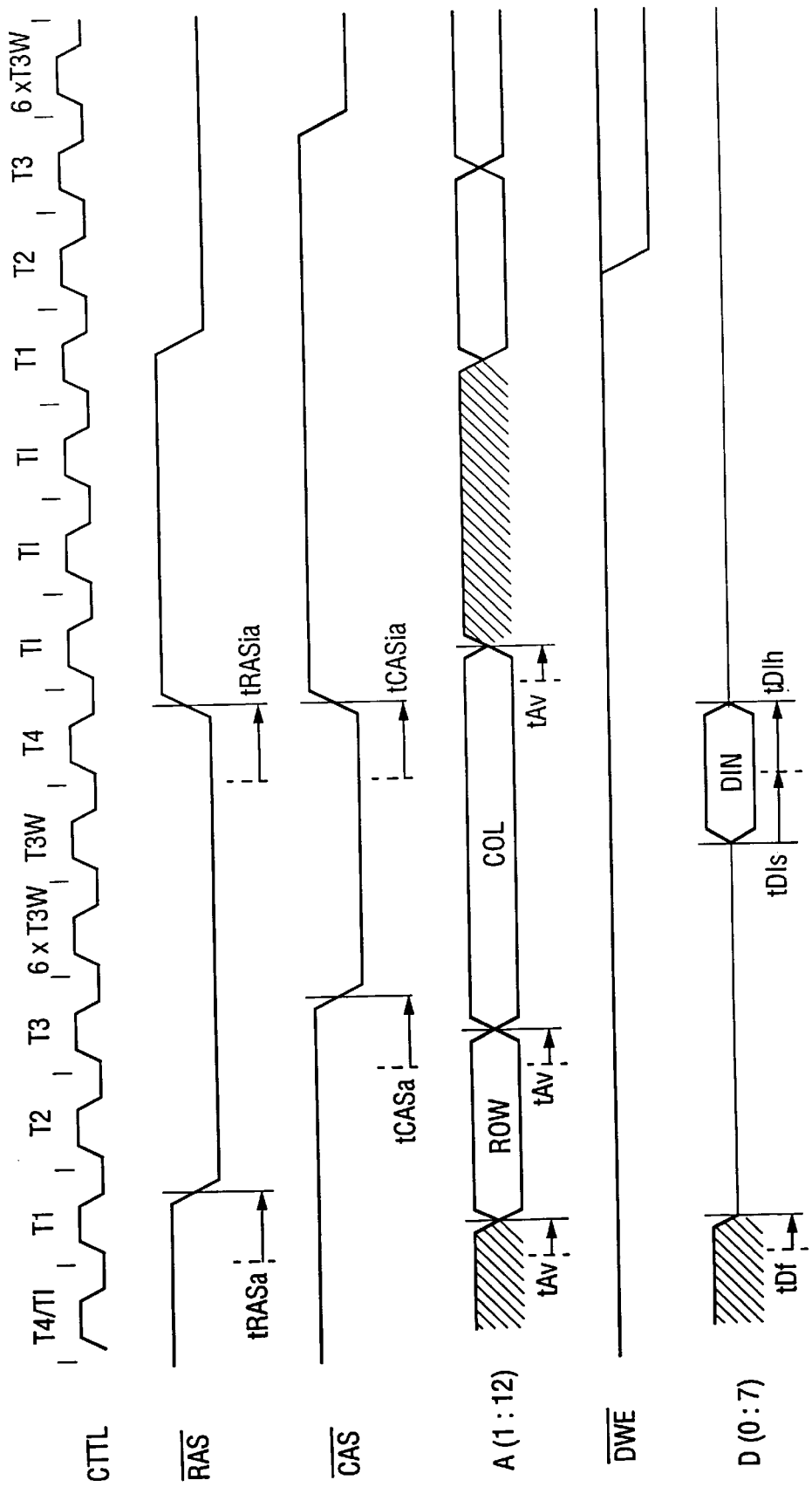
Figure 6:
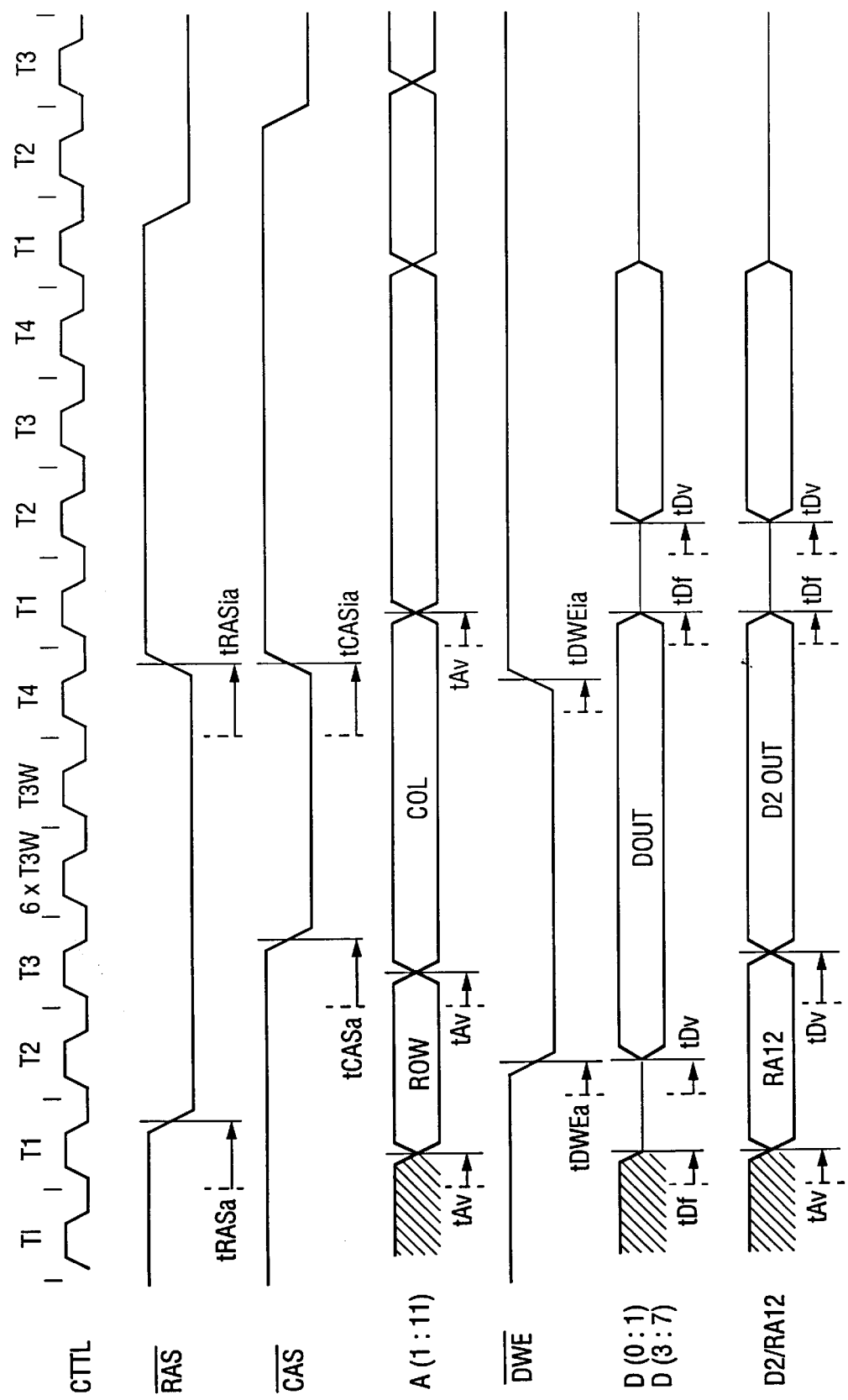
Figure 7:
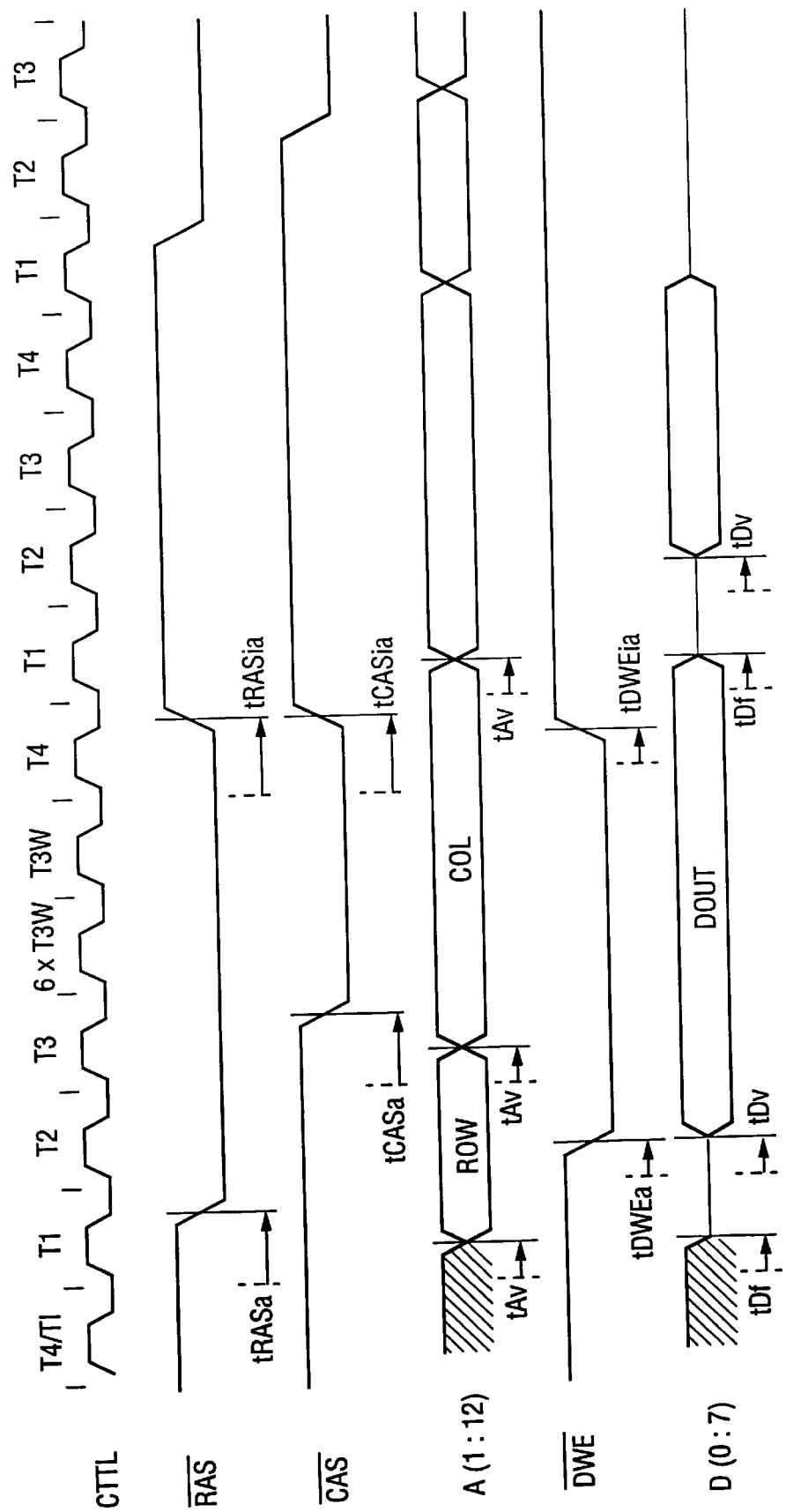
Figure 8:
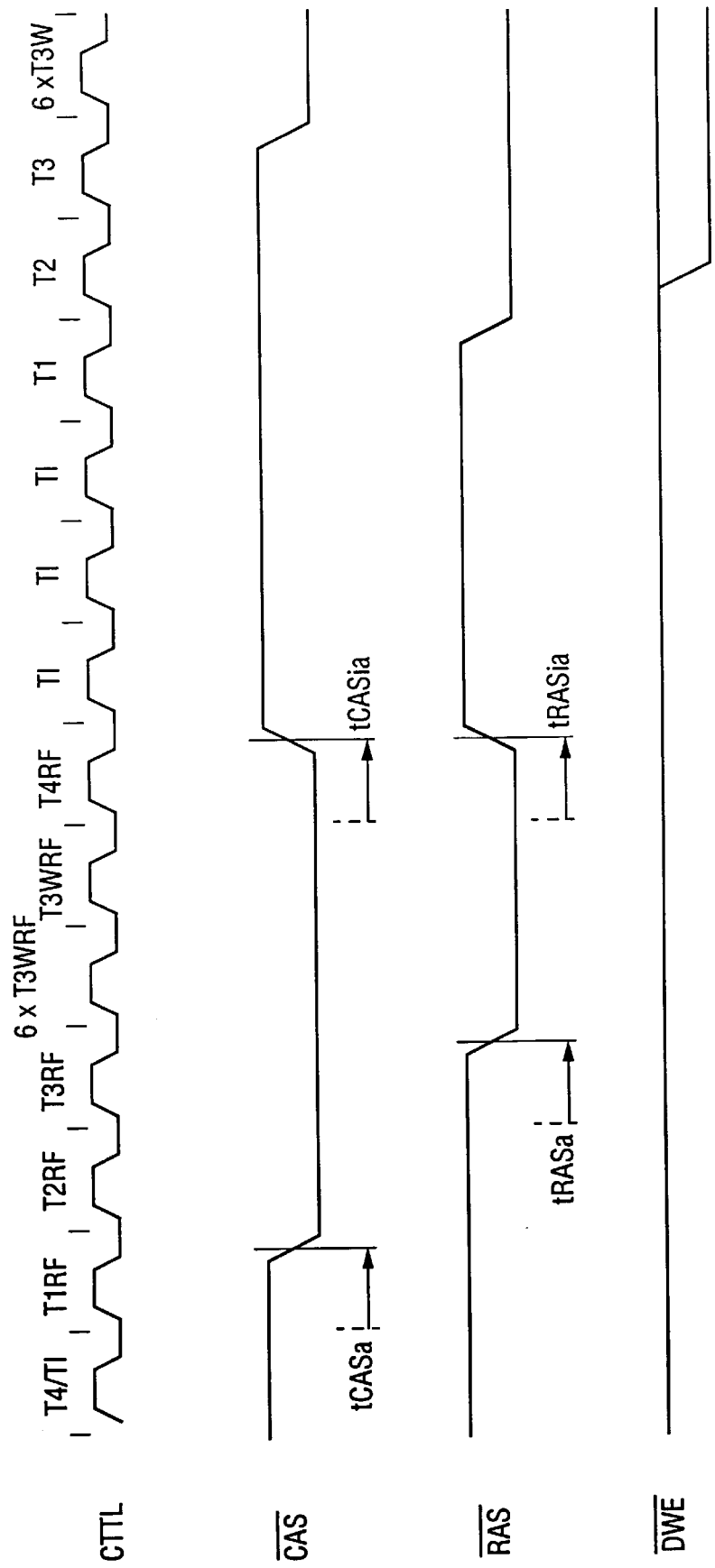
Figure 9:
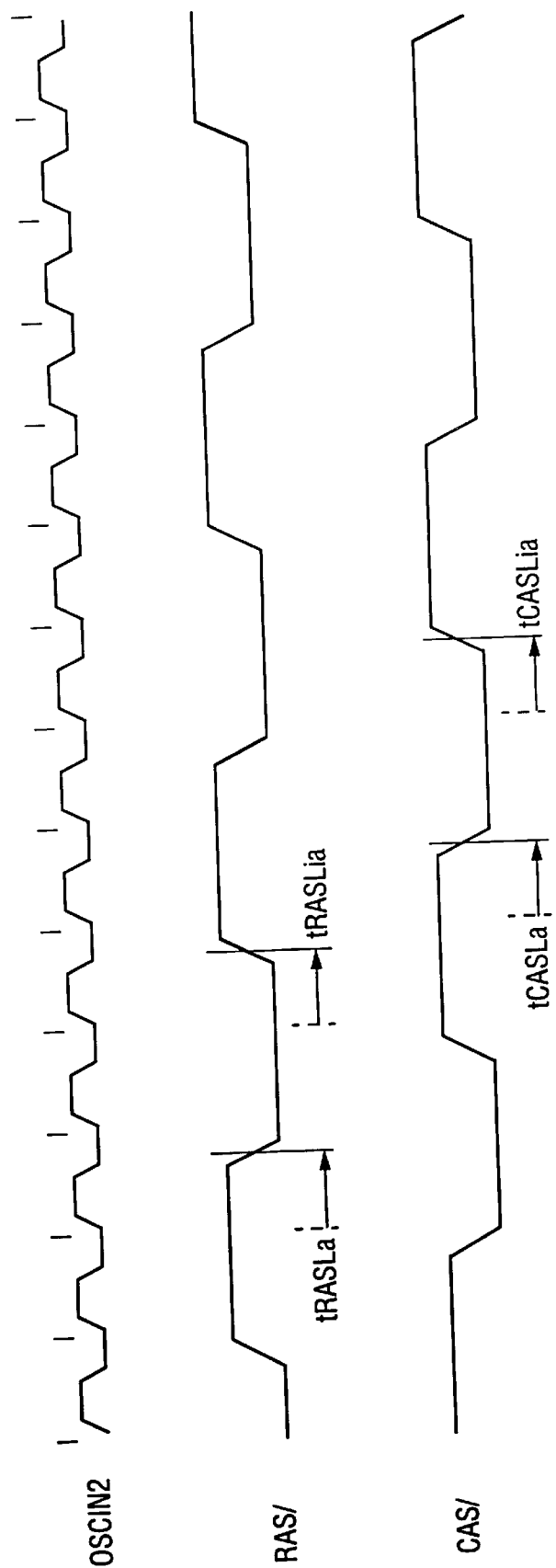
Figure 10:
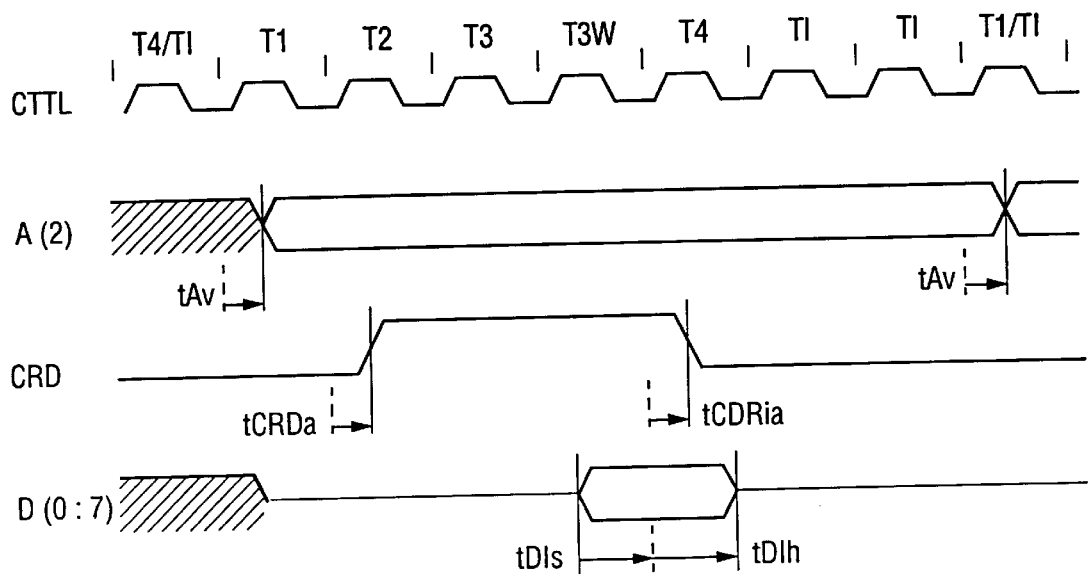
Figure 11:
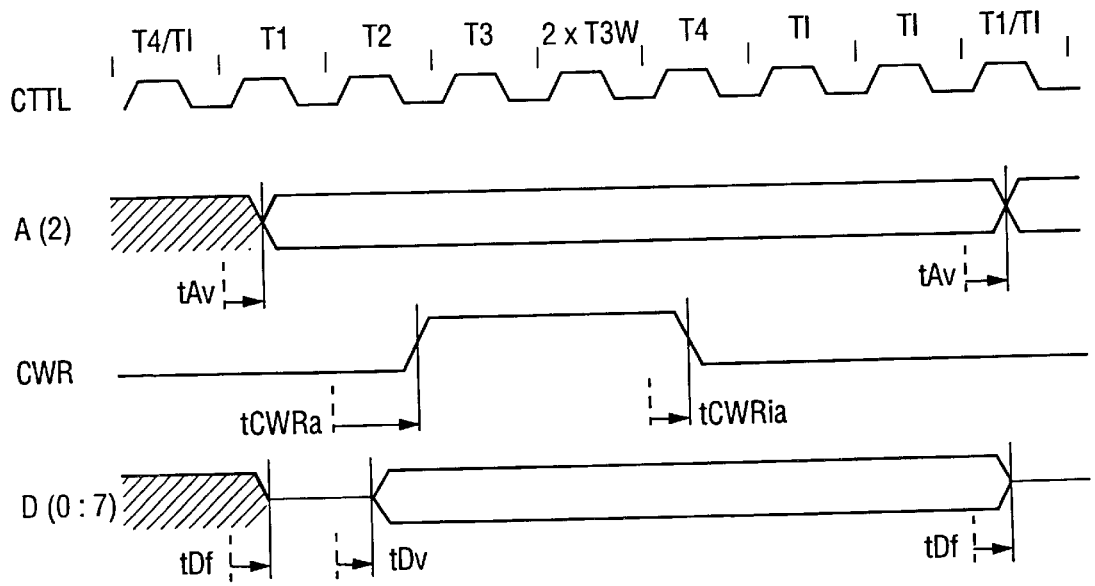
Figure 12:
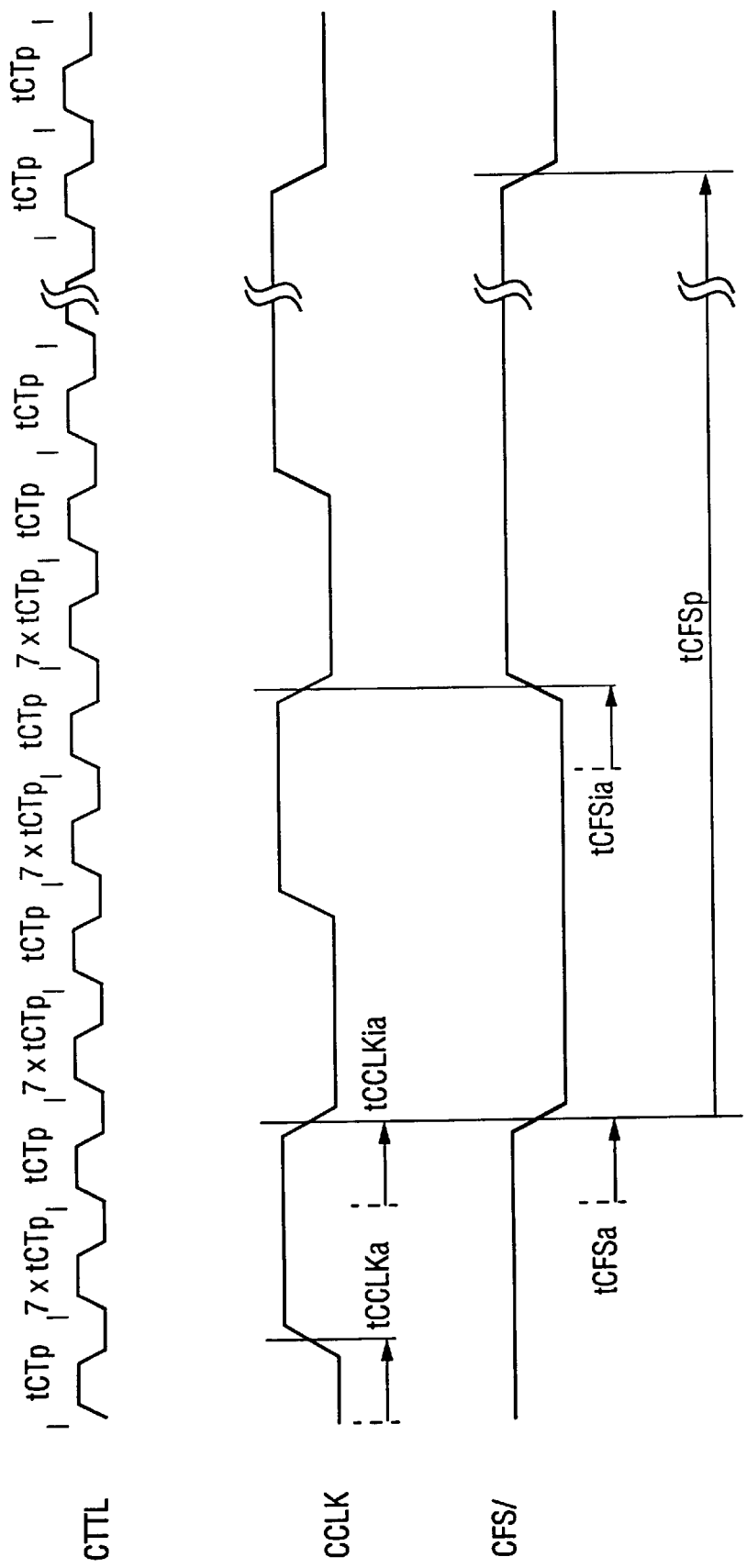
Figure 13:
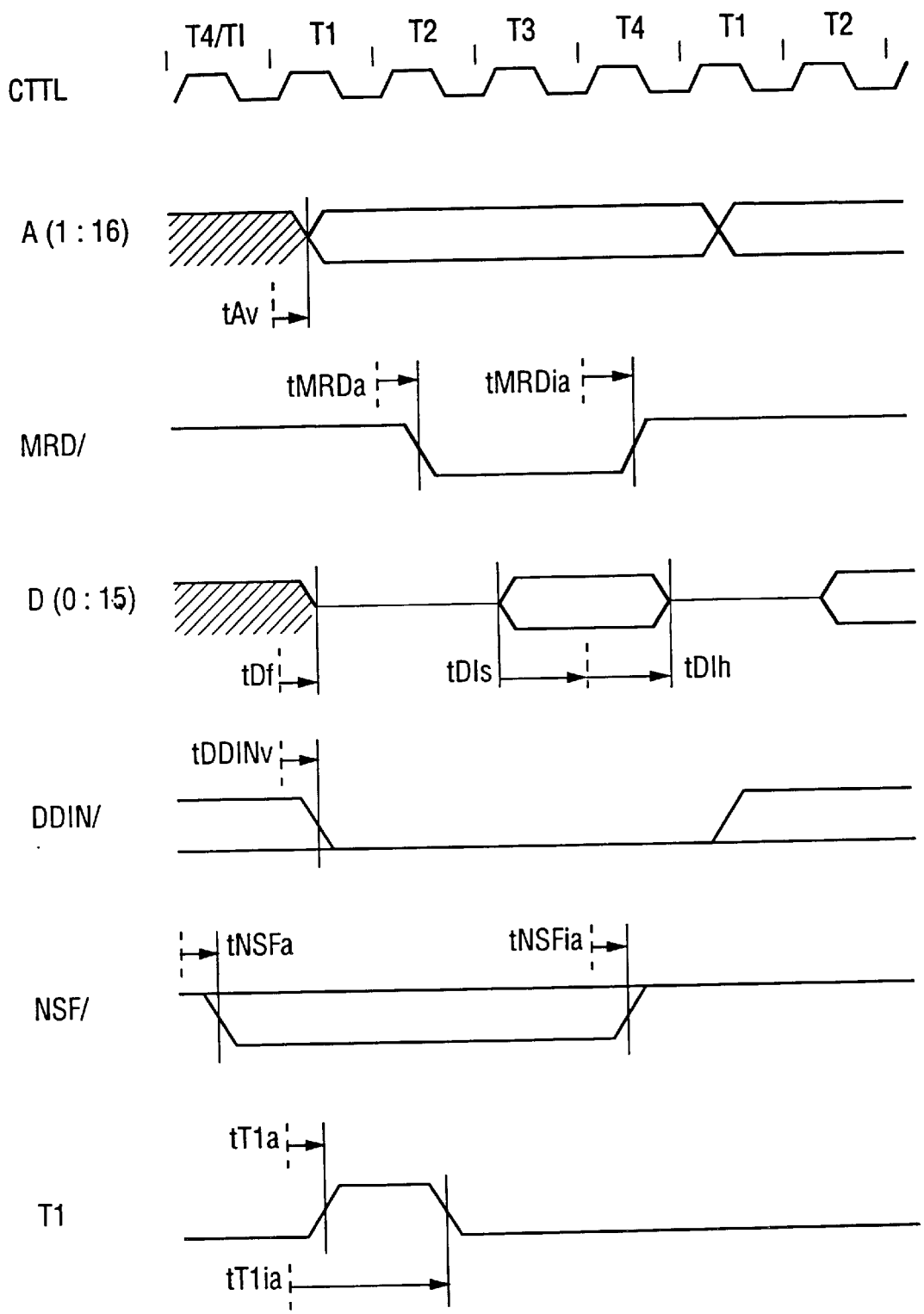
Figure 14:
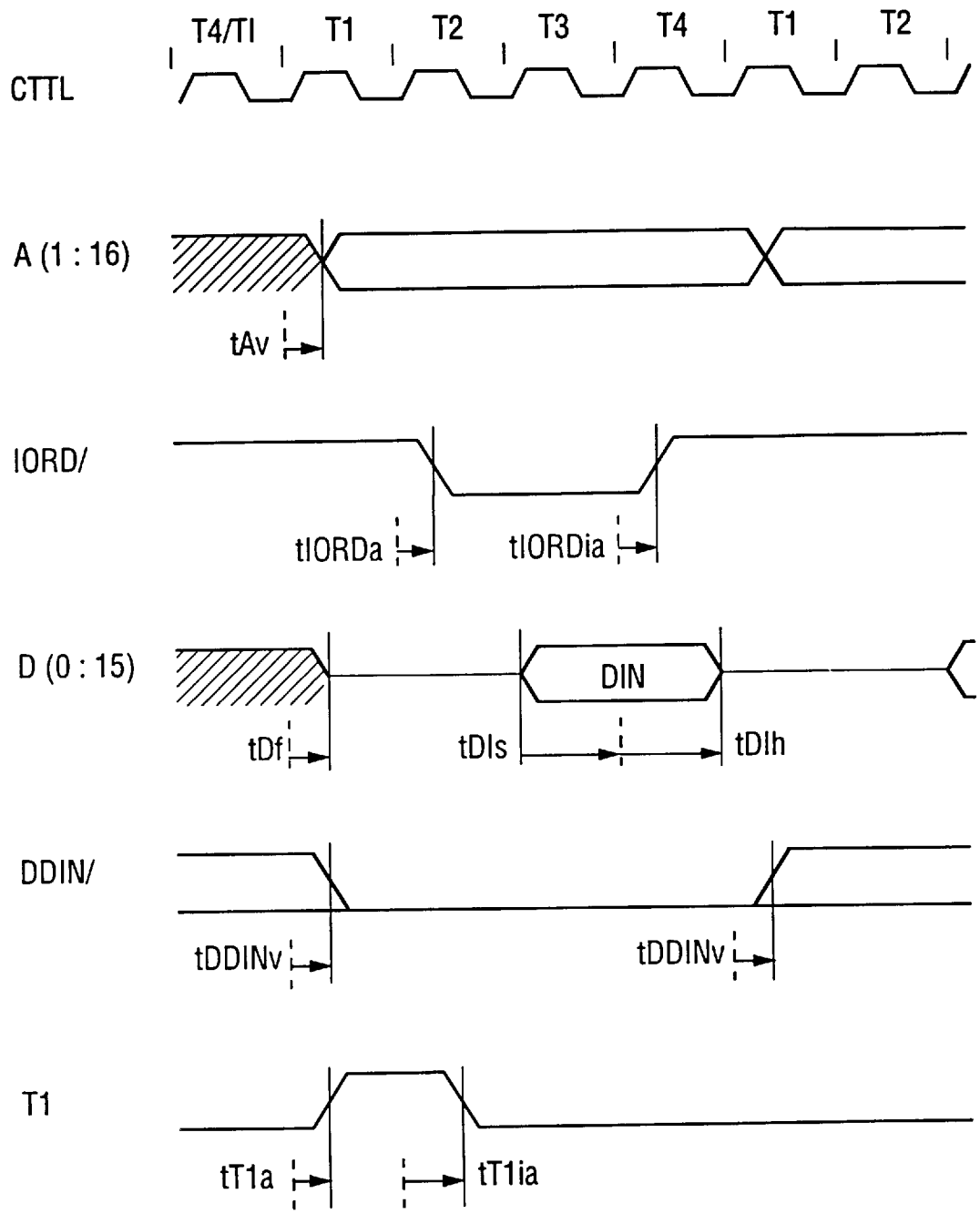
Figure 15:
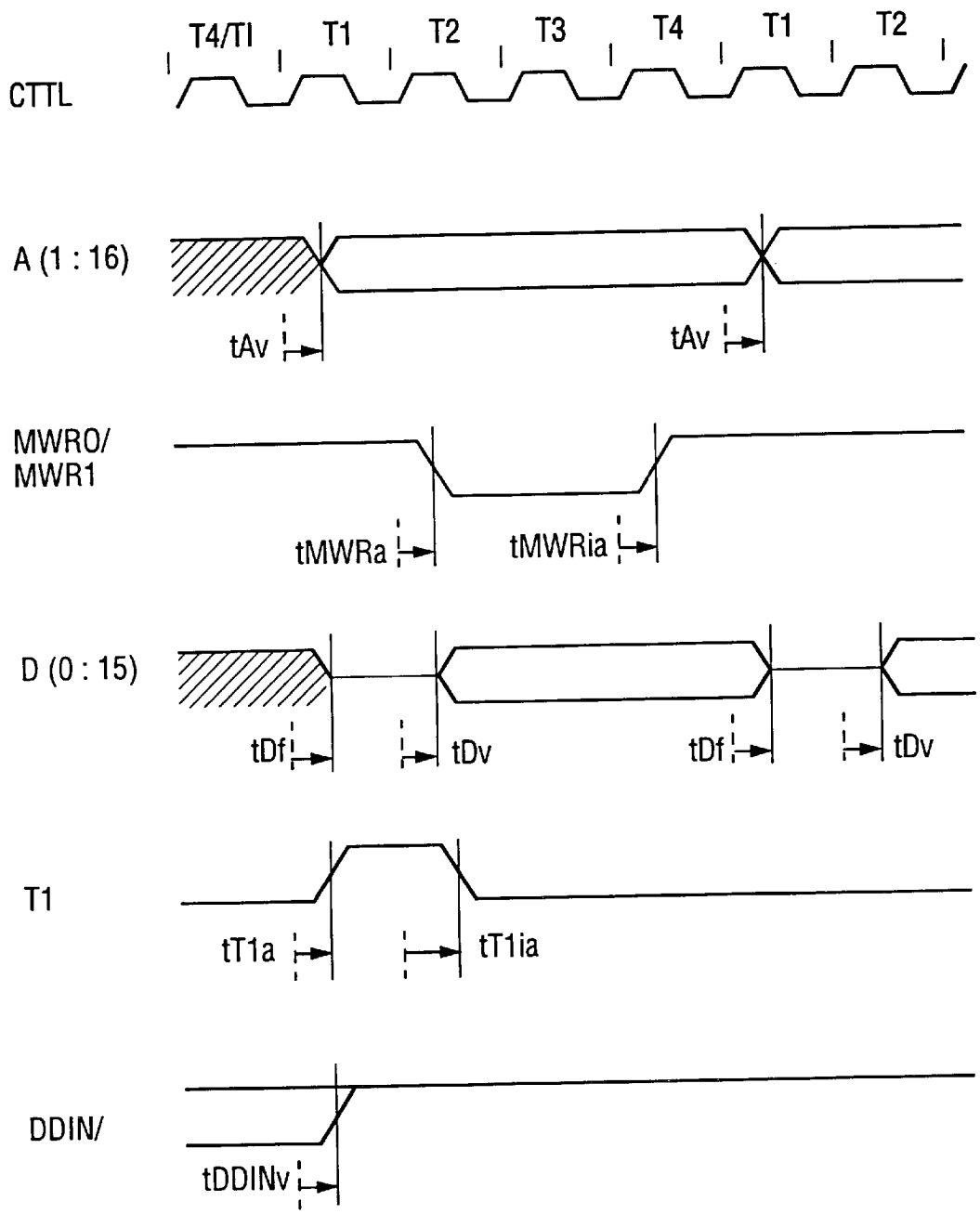
Figure 16:
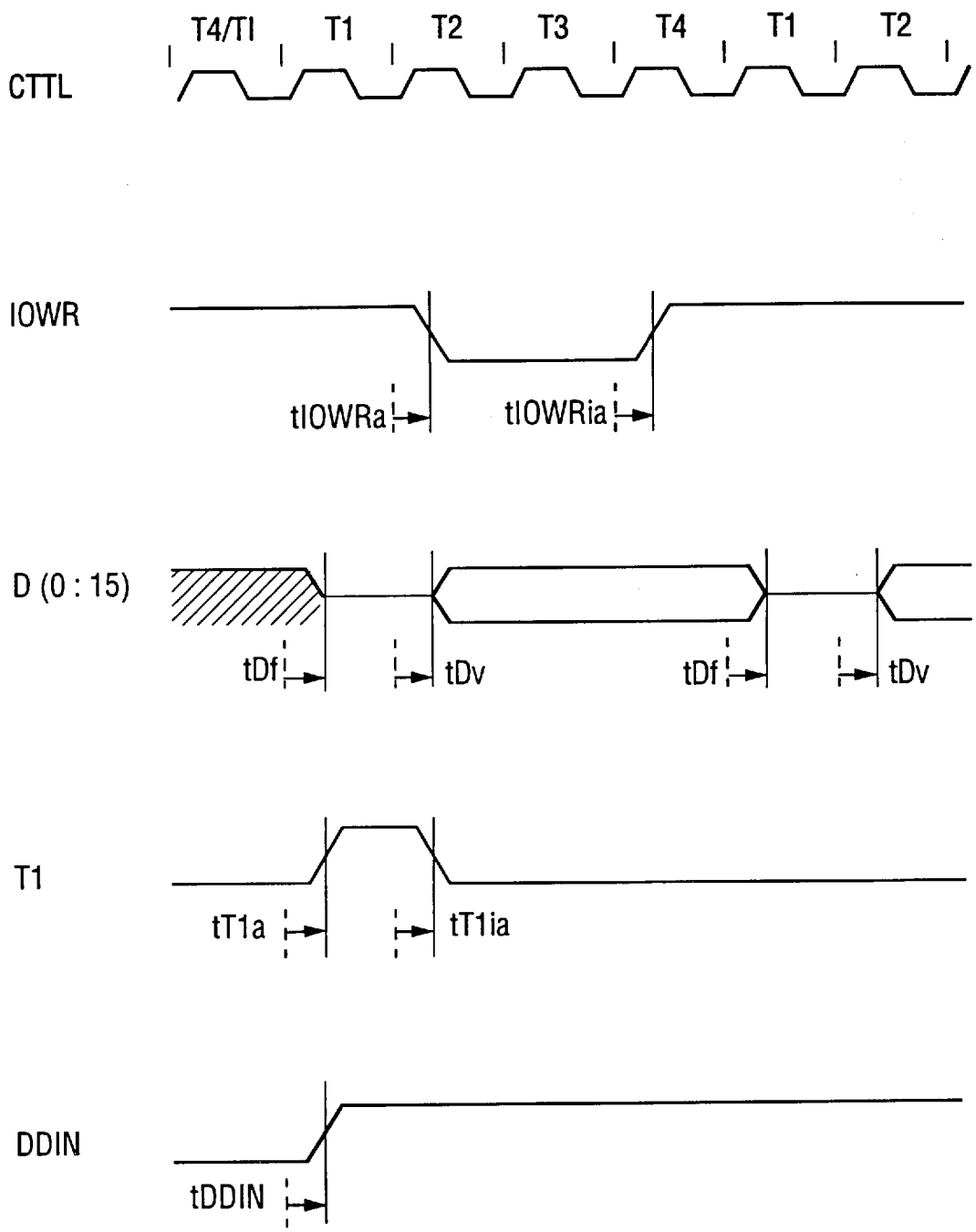
Figure 17A:
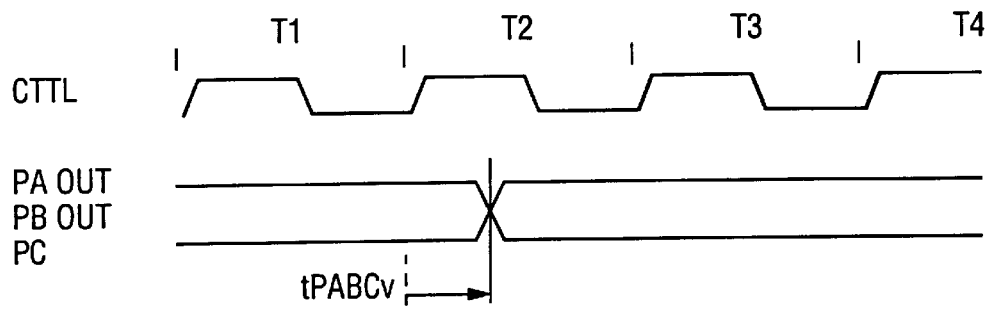
Figure 17B:
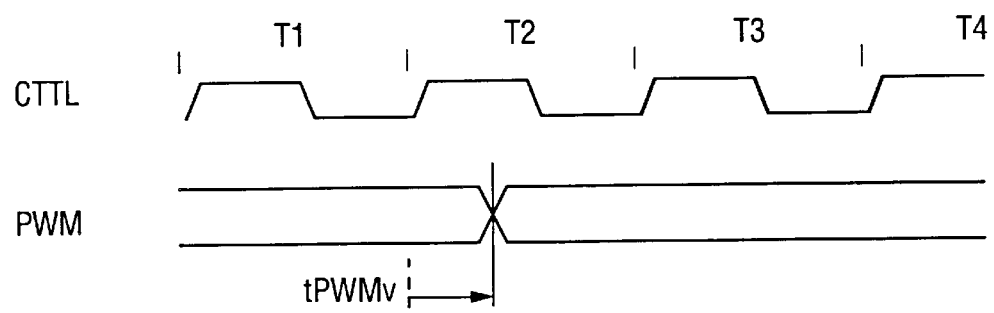
Figure 17C:
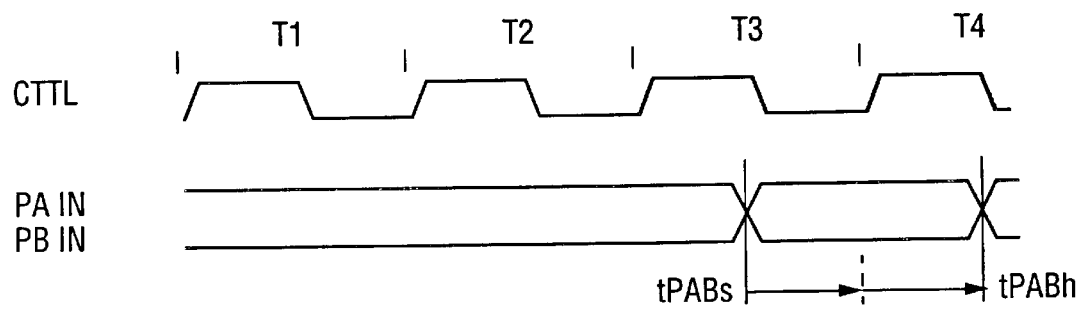
Figure 18:
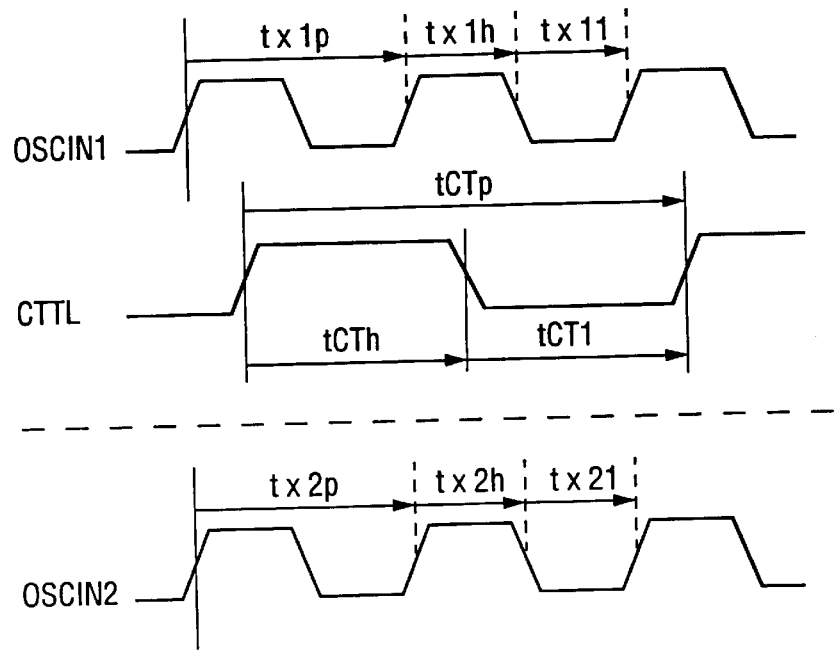
Figure 19A:
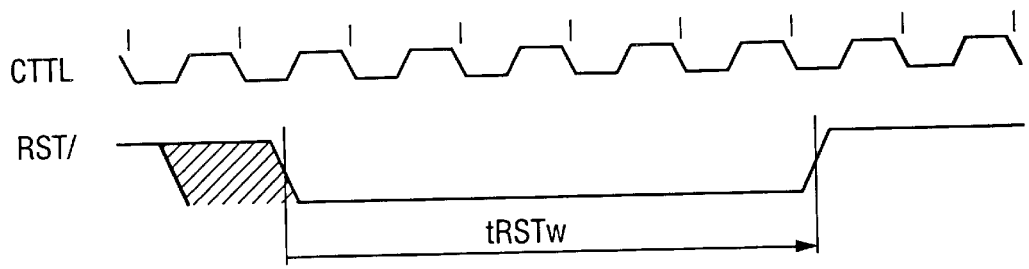
Figure 19B:
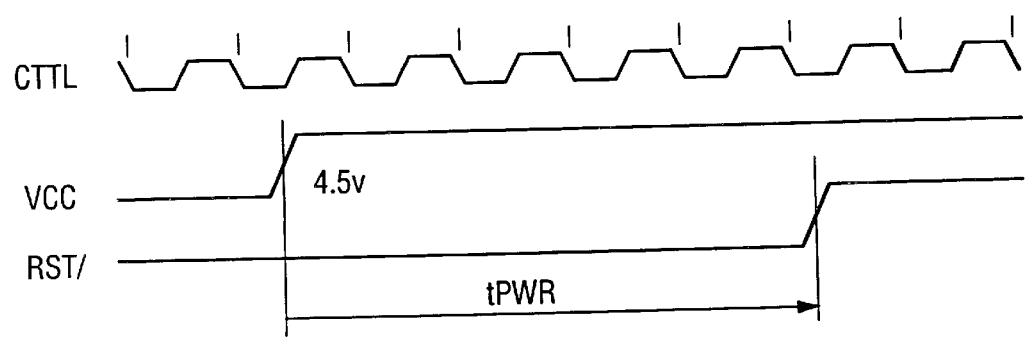

FIG. 3 shows a pin arrangement for the system 10, the associated pin description being as follows:

| Supplies | |
|---|---|
| Vcc Power. | +5 Volt positive supply (5 pins) |
| Vss Ground. | Ground reference for both on-chip logic and output drivers (6 pins) |

| Input Signals | |
|---|---|
| RST | Reset Input. |
| INT3 | External timer 30 (Falling Edge) |
| OSCN1 | Crystal-I, External Clock Input (40.96 MHz) |
| OSCIN2 | Crystal-2, External Clock Input (455 KHz) |

| Output Signals | |
|---|---|
| A1–A11 | Address Bus bits I through 11 |
| RAS | Row Address Strobe, for DRAM Control and Refresh |
| CAS | Column Address Strobe, for DRAM Control and Refresh |
| DWE | DRAM Write/Read control |
| CRD | CODEC Read Control |
| CWR | CODEC Write Control |
| CFS | CODEC Frame Synchronization. 8 KHz Clock for the CODEC |
| CCLK | CODEC Master Clock - 1.28 MHz |
| PWM | Output from the PWM Generator |
| OSCOUT1 | Crystal-1 Clock Output (40.96 MHZ) |
| OSCOUT2 | Crystal-2 Clock Output (455 KHz) |
| PC0/A12 | Output Port C bit 0 / External ROM address line A12 |
| PC1/A13 | Output Port C bit 1 / External ROM address line A13 |
| PC2/A14 | Output Port C bit 2 / External ROM address line A14 |
| PC3/A15 | Output Port C bit 3 / External ROM address line A15 |
| PC4/A16 | Output Port C bit 4 / External ROM address line A16 |
| PC5/MRD | Output Port C bit 5 / External ROM Output Enable Signal |
| PC6/IOWR/MODE0 | Output Port C bit 6 / External 10 Write Control Mode Control bit 0 |
| PC7/IORD/MODE1 | Output Port C bit 7 / External 10 Read Control Mode Control bit 1 |

The values of MODE0 and MODE1 are sampled upon reset to determine the mode of operation. These pins must be either pulled up or pulled down with 10-Kohm resistors to Vcc or Vss, respectively. In the Internal ROM mode, both the MODE0 and MODE1 pins should be pulled up via a resistor to Vcc. In the External ROM mode, the MODE0 pin should be pulled up via a resistor to Vcc and the MODE1 pin should be pulled down via a resistor to Vss. In the Development mode, the MODE0 pin should be pulled down via a resistor to Vss and the MODE1 pin should be pulled up via a resistor to Vcc.

| Input/Output Signals | |
|---|---|
| D0–D1 | Data Bus bits 0 through 1 |
| D2/RA12 | Data Bus bit 2 / DRAM row address bus bit 12 in Internal ROM mode |
| D3–D7 | Data Bus bits 3 through 7 |
| PA0/MWR0 | Port A bit 0 / External RAM write enable signal to even byte |
| PA1/MWR1 | Port A bit 1 / External RAM write enable signal to odd byte |
| PA2/CTTL | Port A bit 2 / CPU Clock |
| PA3/NSF | Port A bit 3 / Non-sequential Fetch Status |
| PA4/T1 | Port A bit 4 / First Clock of a Bus Cycle (T1) |
| PA5/DDIN | Port A bit 5 / Data Direction |
| PA6/A17 | Port A bit 6 / Address line A17 |
| PA7/A18 | Port A bit 7 / Address line A18 |
| PB0/D8 | Port B bit 0 / Extended Data Bus bit 8 |

-continued

| Input/Output Signals | |
|---|---|
| PB1/D9 | Port B bit 1 / Extended Data Bus bit 9 |
| PB2/D10 | Port B bit 2 Extended Data Bus bit 10 |
| PB3/D11 | Port B bit 3 / Extended Data Bus bit 11 |
| PB4/D12 | Port B bit 4 / Extended Data Bus bit 12 |
| PB5/D13 | Port B bit 5 / Extended Data Bus bit 13 |
| PB6/D14 | Port B bit 6 / Extended Data Bus bit 14 |
| PB7/D15 | Port B bit 7 / Extended Data Bus bit 15 |

IV. System Internal Architecture

Referring back to FIG. 1, the illustrated system 10 includes ten modules: DSPM 12, CPU core 14, ROM 16, Interrupt Control Unit (ICU) 18, Bus Interface Unit (BIU) and Dram controller 20, Pulse Width Modulation (PWM) Generator 22, Clock Generator 24, System RAM 26, DSPM RAM 28, and a Watch Dog (WD) timer 30.

The Core CPU 14 is a National Semiconductor 32FX16 embedded processor with direct exception support. All the DSP arithmetic is done within the DSPM 12. Programs and data are stored in the ROM 16 and RAM modules 26, 28. The ICU 18 handles three interrupts, as described below. The BIU and DRAMC module 20 controls all the accesses to on- and off-chip peripherals. The PWM generator 22 is used in an external successive approximation A/D circuit. The clock generator 24 provides clocks for the different on-chip modules and selects between two crystal oscillators. The Watch Dog timer 30 is used for generating a non-maskable interrupt in the event that the system 10 is running out of control. In the low power mode, the Watch Dog interrupt is used to keep track of the time.

The address map of the system memory is provided in Table I below for reference in conjunction with the discussion that follows:

TABLE I

| First Address | Last Address | Purpose |
|---|---|---|
| 0x00000000 | 0x000063FF | Internal ROM mode internal ROM (25(Kbytes) |
| 0x000000 0 | 0x0001FFFF | External ROM mode external memory |
| 0x00000000 | 0x0007FFFF | Development mode external memory |
| 0x02000000 | 0x027FFFFF | External DRAM |
| 0xFFFDFC10 | 0xFFFDFFFF | System on-chip RAM (1008 bytes) |
| 0xFFFE0000 | 0xFFFE045F | DSPM Internal RAM (1120 bytes) |
| 0xFFFF8000 | 0XFFFF8027 | DSPM Dedicated Registers |
| 0XFFFF9000 | 0XFFFF9013 | DSPM Control/Status Registers |
| 0XFFFFA000 | 0XFFFFA047 | On-Chip Modules Registers |
| 0XFFFFFE00 | 0XFFFFFFFF | ICU and NMI Control |

All other address ranges are reserved. The address map of the DSPM dedicated registers and DSPM control/status registers will be provided below in conjunction with a detailed description of the DSPM module 12. Address maps of the registers of all other modules are provided in the following Table II:

TABLE II

| Mode | Register | Size | Address | Access Type |
|---|---|---|---|---|
| ICU | IVCT | byte | 0xFFFFFE00 | Read Only |
| | IMASK | byte | 0xFFFFFE04 | Read/Write |
| | IPEND | byte | 0xFFFFFE08 | Read Only |
| | IECLR | byte | 0xFFFFFE0C | Write Only |
| I/O | DIRA | byte | 0xFFFFA101 | Write Only |
| | DIRB | byte | 0xFFFFA201 | Write Only |
| | PORTA | byte | 0xFFFFA401 | Read/Write |
| | PORTB | byte | 0xFFFFA501 | Read/Write |
| | PORTC | byte | 0xFFFFA601 | Write Only |
| Clock Generator | CLKCTL | byte | 0xFFFFA010 | Read/Write |
| Watch Dog | WDCTL | byte | 0xFFFFA000 | Write Only |
| PWM | PWMCTL | byte | 0xFFFFA020 | Read/Write |
| CODEC | CDATA | byte | 0xFFFFA040 | Read/Write |
| | CSTAT | byte | 0xFFFFA044 | Read/Write |

V. CPU Core

The CPU core 14 is fully compatible with the core of the National Semiconductor Corporation NS32FX16 processor with three exceptions. The CPU core 14 has reduced interrupt latency via direct exception mode, no support for some instructions and addressing modes and no support for clock scaling.

A. Direct Exception Mode

The CPU core 14 supports only the direct exception mode. The SETCFG instruction must be used to set the CFG.DE bit to "1". While in this mode, the CPU core 14 does not save the MOD register on the stack, nor does it refer to the module table on exception processing.

B. Instruction-Set and Addressing Modes

The CPU core 14 does not support the following 32FX16 instructions: CXP, RXP, CXPD, EXTBLT, MOVif, LFSR, MOVLF, MOVFL, ROUND, TRUNC, SFSR, FLOOR<ADDf, MOVf, CMPf, SUBf, NEGf, DIVf, MULf, ABSf, POLYf, DOTf, SCALBf, LOGBf, CBITIi, and SBITIi. The external addressing mode and the MOD register are also not supported. Whenever the CFG register is written, a value of '0' must be specified in CFG.F bit.

C. Clock Scaling

The CPU core 14 does not support clock scaling. On accesses to the CFG, '0' must be written into bits C and M.

VI. Interrupt Controller Unit

A. General Description

The Interrupt Control Unit (ICU) 18 monitors the internal and external interrupt sources and generates a vectored interrupt to the CPU core 14 when required. Priority is resolved on a fixed scheme. Each interrupt source can be masked by a mask register. Pending interrupts can be polled using the interrupt pending register.

As shown in Table III below, the ICU 18 handles four sources of interrupts: three are internal and one is external. The external interrupt is triggered by a falling edge on the $\overline{INT3}$ input pin. The $\overline{INT3}$ input includes a Schmitt trigger input buffer to produce jitter-free interrupt requests from slowly changing input signals. An on-chip circuit synchronizes the $\overline{INT3}$ input signal to the system clock. For proper interrupt detection, $\overline{INT3}$ must be pulled low for at least 3 clock cycles.

Another interrupt, INT2, is level sensitive. It is triggered by the DSPM 12 upon completion of a command-list execution and when both DSPINT.HALT and DSPMASK.

HALT are "1". Interrupt INT2 is used to synchronize between command-list execution and a CPU core program. This can reduce the total CPU utilization of applications which require asynchronous operation of the DSPM 12.

The other two interrupts, INT4 and INT1, are edge sensitive. They are triggered by the falling edge of 8 KHz and 500 Hz clocks, respectively. These clocks are generated by the clock generator 24.

All of the interrupts are latched by the interrupt pending register (IPEND). An edge sensitive pending interrupt is cleared by writing to the edge interrupt clear register (IECLR). The INT4 pending bit is also reset when the CODEC is accessed.

INT4 is used in the application for timing the accesses to the CODEC. The same clock that triggers the interrupt is also connected to the $\overline{CFS}$ input of the CODEC device.

There is no hardware limitation on nesting of interrupts. Interrupt nesting is controlled by writing into the mask register (IMASK). When an interrupt is acknowledged by the CPU core 14, the PSR.I bit is cleared to "0", thus disabling interrupts. While an interrupt is in service, other interrupts may be allowed to occur by setting the PSR.I bit to "1". The IMASK register can be used to control which of the other interrupts is allowed. Clearing bits in the IMASK register should be done while the PSR.I bit is "0". Setting bits in the IMASK register may be done regardless of the PSR.I bit state.

Clearing an interrupt request before it is serviced may cause a false interrupt, where the system 10 may detect an interrupt not reflected by the IVCT. Interrupt requests should be cleared only when interrupts are disabled.

During the low power mode (CLKCTL.LPM="1"), the ICU 18 is disabled. The PSR.I bit must be cleared to "0" before entering the low power mode, and reads or writes into the registers of the ICU 18 should not be attempted while in this mode.

B. ICU Registers

IVCT

Interrupt vector register. Byte wide. Read only. IVCT holds the encoded number of the highest priority unmasked pending interrupt request. Interrupt vector numbers are always positive, in the range 0×11 to 0×14.

| 7 | 6 | 5 | 4 | 3 | 2 |   | 0 |
|---|---|---|---|---|---|---|---|
| 0 | 0 | 0 | 1 | 0 | VECTOR | | |

IMASK

Mask register. Byte wide. A value of "0" in bit position i disables the corresponding interrupt source. IMASK bits 0 and 5 through 7 are reserved. The non-reserved bits of IMASK register are set to "0" upon reset and when CLKCTL.LPM is "1".

| 7 |   | 5 | 4 | 3 | 2 | 1 | 0 |
|---|---|---|---|---|---|---|---|
| (reserved) | | | M4 | M3 | M2 | M1 | (reserved) |

IPEND

Interrupt pending register. Byte wide. Read only. Reading a value of "1" in bit position i indicates that the relevant interrupt source is active. IPEND bits 0 and 5 through 7 are reserved. The non-reserved bits of IPEND are cleared to "0" upon reset and when CLKCTL.LPM is "1".

| 7 |   | 5 | 4 | 3 | 2 | 1 | 0 |
|---|---|---|---|---|---|---|---|
| (reserved) | | | P4 | P3 | P2 | P1 | (reserved) |

IECLR

Edge interrupt clear register. Write only. A pending edge triggered interrupt is cleared by writing "1" to the relevant bit position in the IECLR. Writing "0" has no effect. Note that INT9 does not have a corresponding clear bit in IECLR. INT2 is a level sensitive interrupt and it is cleared by writing directly to the DSPINT register. IECLR bits 0 and 5 through 7 are reserved.

| 7 |   | 5 | 4 | 3 | 2 | 1 | 0 |
|---|---|---|---|---|---|---|---|
| (reserved) | | | CLR4 | CLR3 | 0 | CLR1 | (reserved) |

TABLE III

3. INTERRUPT SOURCES

| Name | Type | Source | Vector | Priority |
|---|---|---|---|---|
| INT1 | 2-msec | Clock Generator | 0x11 | Lowest Priority |
| INT2 | DSPM | DSPM | 0x12 | |
| INT3 | 60 Hz | External | 0x13 | |
| INT4 | CODEC | Clock Generator | 0x14 | Highest Priority |

VII. BIU and DRAM Controller

A. General Description

The BIU and DRAM controller 20 controls all the internal and external accesses. It provides control signals for the internal cycles to the other on-chip modules. It also provides control signals to the different external devices. There are four types of external devices: DRAM, ROM/RAM, CODEC and I/O ports. Different types of accesses are done to each of the different devices.

The BIU provides four types of accesses to the external DRAM: read, write, and refresh cycles during normal operation, and special refresh cycles during low power mode (CLKCTL.LPM="1"). No reads and writes to the DRAM are allowed during low power mode.

The BIU provides two types of accesses to the ROM/RAM devices: read and write cycles. These cycles can also be done while in low power mode.

The BIU provides two types of accesses to the CODEC: read and write cycles. These cycles are not allowed while in low power mode.

The BIU provides two types of accesses to I/O devices in both the External ROM and Development modes: read and write cycles. These cycles also can be done while in low power mode.

All control signals of external devices are inactive while reset.

B. DRAM Access

The DRAM Controller (DRAMC) 20 supports transactions between the system 10 and external DRAM and performs refresh cycles. The DRAMC 20 supports one or two TMS44400 (1M×4) DRAM devices or one or two TMS416400 (4M×4) DRAM devices with the same AC/DC specifications. There is no special support for any other devices. The TMS44400 and TMS416400 devices supported are with special AC/DC characteristics. These devices require at least 500-nsec cycle time and at least 350-nsec access $\overline{\text{RAS}}$ time and a short refresh period.

The external data bus used for all DRAM accesses is 8 bits wide. The user can connect either one or two DRAM devices. When only one device is connected, its data pins are connected to pins D0–3. When another DRAM is added, it is connected to pins D4–7. There is no hardware support for nibble or byte gathering. The user can handle the nibble gathering with software. CPU accesses are only to an aligned word in the DRAM (no byte or double word accesses are allowed).

The DRAMC waveforms are designed for a 24.32-MHz system. The refresh rate is designed for a 20.48-MHz operation. This allows running with the same DRAMC at any frequency between 20.48 MHz and 24.32 MHz. Note, however, that the clock generator module 24 is designed only for 20.48 MHz and Internal ROM tests are done only for this frequency.

During read cycles, the DRAMC 20 provides the $\overline{\text{RAS}}$ and $\overline{\text{CAS}}$ signals. The DRAMC 20 does not use fast page mode accesses. The user must connect the $\overline{\text{OE}}$ pin of the DRAM to GND. On write cycles, the DRAMC 20 provides the $\overline{\text{RAS}}$, $\overline{\text{CAS}}$ and $\overline{\text{WE}}$ signals to perform early writes according to the DRAM specifications.

When the system 10 enters the low power mode, the DRAMC 20 continues to refresh the DRAM array. The low frequency clock generates $\overline{\text{RAS}}$ and $\overline{\text{CAS}}$ signals. During this mode, no reads and writes to the DRAM are allowed. Note also that the user must make sure that the instruction that sets the CLKCTL.LPM bit does not directly follow an access to the DRAM.

The DRAM address range is 0x02000000 to 0x027FFFFF and its size is 8 Mbytes. To fully utilize this address range, four 4M×4-DRAM devices are needed. In a typical system, where only a single 1M×4-DRAM device is used, only 2-Mbytes are accessible and only one nibble out of four can actually store data.

During reads and writes to the DRAM in the Internal ROM mode, the DRAMC 20 provides the row and column address on pins A1–A11 and RA12. The row address is bits A11–A22 of the data item's address. It is provided on pins A1–A11 and A12, respectively. The column address is bits A1–A10 of the data item's address. It is provided on pins A1–A10, respectively.

During reads and writes to the DRAM in the External ROM or Development modes, the DRAMC 20 provides the row and column address on pins A1–A12. The row address is bits A11–A22 of the data item's address. It is provided on pins A1–A12, respectively. The column address is bits A1–A10 of the data item's address. It is provided on pins A1–A10, respectively.

DRAM accesses can be divided into two parts: During the first part (11 cycles), the external data bus is used by DRAMC 20. During the following two cycles, the external data bus can be used by any bus user except for DRAM (to ensure enough DRAM precharge time).

In normal operation (CLKCTL.LPM="0"), DRAM refresh is done at a rate of 160000 cycles/second. The refresh clock is generated by the clock generator 24. Any bus transaction, except for DRAM accesses, can be performed in parallel with a refresh cycle.

In the low power mode (CLKCTL.LPM="1"), DRAM refresh is done at a ¼ of the low speed crystal oscillator frequency (If Crystal-2 is 455 KHz, the refresh rate is 113750 cycles/second). The $\overline{\text{RAS}}$ and $\overline{\text{CAS}}$ signals are activated for half a DRAM refresh cycle.

In both modes, the DRAM provides control signals to execute automatic before refresh cycles according to the specification of the TMS44400 and TMS416400 DRAMs.

C. CODEC Interface

CODEC accesses are performed as regular memory accesses to the addresses of CSTAT and CDATA registers. The CPU core 14 provides the control signals to the TP5512 CODEC to perform read and write sequences. The signals used for these accesses are CWR, CRD, A2 and D0–7.

The system 10 also provides two clocks to the CODEC: CCLK, the basic 1.28 MHz CODEC clock, and $\overline{\text{CFS}}$, an 8 KHz signal used for frame synchronization. Whenever $\overline{\text{C}}$ $\overline{\text{FS}}$ is asserted (low), the IPEND.P3 signal is asserted (high) and an interrupt request is issued if IMASK.M3 is "0". In order to meet the CODEC timing, its registers should be accessed only following an interrupt request. Note, however, that the user can monitor the IPEND.P3 signal and decide whether the access to the CODEC is allowed.

During the low power mode, CCLK is always inactive (low) and $\overline{\text{CFS}}$ is always active (low). Upon reset CCLK is always active (high) and $\overline{\text{CFS}}$ is always inactive (high).

While in the Internal ROM mode, during the low power mode, A2 is forced to a low level and D0–7 are in input mode (high impedance). This allows the user to switch off the power of the CODEC when the system 10 enters a low power mode in Internal ROM mode (accesses to the CODEC are not allowed while in the low power mode).

D. Accesses To Off-Chip Memory Devices

While in the External ROM mode, the CPU core 14 performs read accesses from external memory for all the addresses between 0x00000000 and 0x0001FFFF. While in the Development mode, the CPU core 14 performs read or write accesses to external memory for all the addresses between 0x00000000 and 0x0007FFFF.

On the first cycle (T1) of a read access, the CPU core 14 asserts A1–16 in the External ROM mode, or A1–A18 in the Development mode. The address remains active for four clock cycles (T1 through T4). In the following cycle (T2), the CPU core 14 activates the $\overline{\text{MRD}}$ signal. $\overline{\text{MRD}}$ remains active until the fourth cycle (T4). Data is sampled at the end of the third cycle (T3).

On the first cycle (T1) of a write access, the CPU core 14 in the Development mode asserts A1–A18. The address remains active for four clock cycles (T1 through T4). In the following cycle (T2), D0–15 are activated and $\overline{\text{MWR0}}$ and $\overline{\text{MWR1}}$ are asserted (depending on the byte needed to be written into). D0–15 remains active until the next T1. $\overline{\text{M}}$ $\overline{\text{WR0}}$ and $\overline{\text{MWR1}}$ remain active until the fourth cycle (T4).

E. I/O Ports

Three 8-bit I/O ports are provided in the Internal ROM mode: PA, PB and PC. Each of the bits in Ports A and B can be programmed individually as either an input or as an output. Programming the direction of the bits in ports PA and PB is done by writing to registers DIRA and DIRB, respectively. Writing "1" to one of the bits in a DIR register configures the corresponding bit in the port as an output port. Writing "0" to one of the bits in a DIR register configures the corresponding bit in the port as an input port. Port PC serves as an output only, and does not have a direction register. On reset, DIA and DIRB are cleared to "0" and ports PA and PB are initiated as input ports.

The bits in ports PA and PB that are programmed as outputs can also be read by the CPU core 14 by accessing the port. The values of the output bits in ports PA, PB and PC can be set by writing to the port.

In the External ROM and Development modes, the pins of ports PB and PC are used for different functions. In order to use these ports, external logic can be added. An external latch can be connected to the D8–15 and $\overline{\text{IOWR}}$ signals to provide the functionality of PC. An external buffer can be connected to the D8–15 and $\overline{\text{IORD}}$ signals to provide part of the functionality of PB. Note that, in this mode, PB can serve as an input only.

In the Development mode, PA pins are also used. The implementation of the evaluation board provides all the I/O ports with their full functionality, but at a different address range.

Accesses to the external latch and external buffer are similar to the accesses to off-chip memory devices, except for the pins that control the actual reads and writes. On reads, $\overline{\text{IORD}}$ is asserted and on writes, $\overline{\text{IOWR}}$ is asserted. The timings of these signals are exactly the same as the timings of $\overline{\text{MRD}}$ and $\overline{\text{MWR1}}$.

VIII. Pulse Width Modulator

The Pulse Width Modulator 22 provides one output signal with a fixed frequency and a variable duty cycle. The frequency of the PWM output is 80 KHz. The duty cycle can be programmed by writing a value from 0 to 0xFF to the PWMCTL register. The PWM output is active (high) for the number of 20.48-MHz cycles specified in PWMCTL register. It is not active (low) for the rest of the 20.48-MHz cycles in the 80-KHz PWM cycle. During low power mode, and upon reset, PWMCTL register is cleared to "0" and the PWM output signal is not active (low).

The Pulse Width Modulator 22 is utilized for parallel disconnect. A mixed hardware/software algorithm is provided for analog-to-digital (A/D) conversion.

The DA has an op-amp for detecting the voltage across tip and ring. The output voltage of this op-amp is proportional to the voltage across tip and ring. To measure this voltage, an A/D conversion using a PWM D/A converter is utilized.

Figure 22:
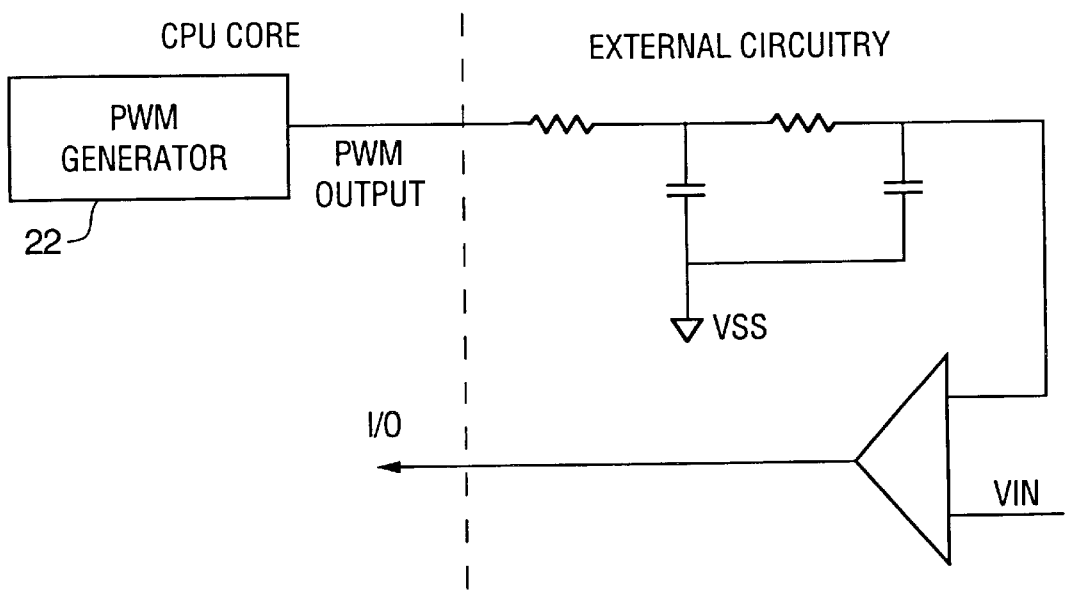
FIG. 22 is a schematic diagram illustrating the interface between a PWM generator and external feedback circuitry.

As stated above, the 8-bit PWM generator 22 will generate a square-wave. The cycle time of this square-wave is 20.48 Mhz/8 =2.56 Mhz. The duty cycle is programmable with 256 values. As shown in FIG. 22, an external RC network is connected to the PWM generator 22. The voltage at the output of the RC network is proportional to the duty cycle. This voltage is compared with the output voltage of the current sense op-amp.

During the first seconds of the connection, a full A/D conversion is done. This can be achieved by doing a successive approximation on the PWM bits P0-7 (where bit 7 is the msb). The algorithm for this conversion is:

```
for (K=7, K>=0, K--) do
    set PWM(K) = 1
    wait for a fixed time (until the RC network is stable)
    if I/O bit is high PWM(K) = 0
```

The steps of the algorithm can be done in 10 ms time intervals. The full algorithm will give 8 bit accuracy in 8 steps. Note that the output of this A/D is relative to VOH of the PWM generator which is relative to VCC, and dependent on temperatures. Note also that due to the successive approximation algorithm, there may be errors in the conversion if the input changes within the conversion.

During the phone conversation, there is no need for a full A/D conversion each 100 ms. The user only needs to know whether the line current is much higher or much lower then it value at the beginning of the conversation. Only two measurements are needed: the upper and the lower limits. Thus, if the value at the beginning of the conversation is A, and the threshold is T, only two steps are needed:

a) set PWM=A+T
b) if I/O bit is high then another phone in the house is off-hook.
c) set PWM=AT
d) if I/O bit is low then another phone in the house is off-hook.

IX. Clock Generator

The clock generator 24 provides all the clocks needed for the various modules of the system 10. Two crystal clock oscillators, 24a and 24b provide the basic frequencies needed. The high-speed crystal oscillator 24a is designed to operate with an 40.96 MHz crystal. The low-speed oscillator 24b is designed to operate with a ceramic resonator at a frequency of 455 KHz. The system 10 can be operated in either normal operation or low power modes. In low power mode, most of the on-chip modules are running from a very low frequency clock or are totally disabled. While in low power mode, the high speed crystal oscillator 24a can be turned off to further reduce the power.

The clock generator 24 provides two clocks to the CODEC: a 1.28-MHz clock, and an 8-KHz clock. The 8-KHz clock also generates INT4.

The clock generator 24 provides a 2-msec (0.5 KHz) time base for the system software. This time base signal generates INT1.

The clock generator 24 provides a refresh request signal at a rate of 160 KHz during normal operation mode, and a ¼ of Crystal-2 frequency at low power mode.

The clock generator control register (CLKCTL) has two control bits: LPM and DHFO. The DHFO controls the high-frequency oscillator. When "0", the high-frequency oscillator 24a is operating. When CLKCTL.DHFO is "1", the high-frequency oscillator 24a is disabled. The LPM bit changes the mode of operation. When CLKCTL.LPM is "0", the system 10 is in normal operation mode, where all the modules operate from the high-frequency oscillator 24a. When CLKCTL.LPM is "1", the system is in low power mode, where some of the modules are not operating, and others operate from the low-frequency oscillator 24b. In the low power mode, DRAM refresh cycles are done at a rate of a ¼ of Crystal-2 frequency, and the core operates from a clock whose frequency is a ⅛ of Crystal-2.

Accesses to the following modules are not allowed during low power mode:
ICU
CODEC
PWM generator
DRAM read and write cycles While in the low power mode, the user's program executes only a WAIT instruction and a NMI interrupt handler.

When changing from the normal operation mode to the low power mode, CLKCNTL.LPM must be set to "1", and only then CLKCNTL.DHFO must be set to "1". When changing from the low power mode to the normal operation mode, CLKCNTL.DHFO must be cleared to "0", and only then clear CLKCNTL.LPM cleared.

The transition between normal operation mode to the low power mode occurs after the a new value is written into CLKCTL.LPM. The CPU core 14 may delay this transition if a DRAM refresh cycle is in process. The CLKCTL.LPM bit will change its value only when the transition is completed. Note, however, that it is usually not needed to wait until the transition is completed, since it is guaranteed that the system 10 will change its mode when the DRAM refresh cycle is over.

The structure of CLKCNTL is as follows:

| 7 | 2 | 1 | 0 |
|---|---|---|---|
| (reserved) | | DHRO | LPM |

The non-reserved bits of CLKCNTL register are cleared to "0" upon reset.

A. High-Speed Clock Oscillator

The system 10 provides an internal oscillator that interacts with an external High-Speed clock source through two signals: OSCiN1 and OSCOUT1.

TABLE IV

High-Frequency Oscillator Circuit

| Component | Value | | Tolerance | Units |
|---|---|---|---|---|
| XTAL | Resonance | 40.96 | | MHZ |
| | Third Overtone | (parallel) | | |
| | Type | AT-Cut | | |
| | Maximum Series Resistance | 50 | | Ω |
| | Maximum Series Capacitance | 7 | | pF |
| R1 | | 150K | 10% | Ω |
| R2 | | 51 | 5% | Ω |
| C1 | | 20 | 10% | pF |
| C2 | | 20 | 10% | pF |
| C3 | | 1000 | 20% | pF |
| L | | 1.8 | 10% | μH |

Either an external single-phase clock signal or a crystal can be used as the clock source. If a single phase clock source is used, only the connection on OSCIN1 required; OSCOUT1 should be left unconnected or loaded with no more then 5 pF of stray capacitance.

Figure 20:
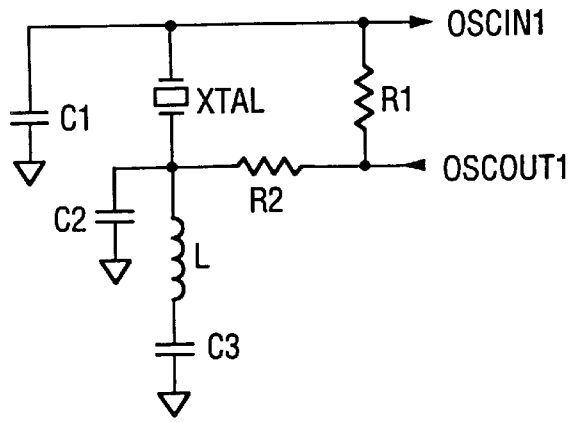
FIG. 20 is a schematic diagram illustrating a high frequency clock oscillator utilizable in an integrated data processing system in accordance with the present invention.

When operation with a crystal is desired, special care should be taken to minimize stray capacitances and inductance. The crystal, as well as the external components, should be placed in close proximity to OSCIN1 and OSCOUT1 pins to keep the printed circuit trace lengths to an absolute minimum. FIG. 20 show the external crystal interconnections. Table IV provides the crystal characteristics and the values of R, C, and L components, including stray capacitance.

B. Low-Frequency Clock Oscillator

The system 10 provides an internal oscillator that interacts with an external clock Low-Frequency source through two signals. OSCIN2 and OSCOUT2.

Either an external single-phase clock signal or a crystal can be used as the clock source. If a single-phase clock source is used, only the connection on OSCIN2 is required; OSCOUT2 should be left unconnected or loaded with no more then 5 pF of stray capacitance.

Figure 21:
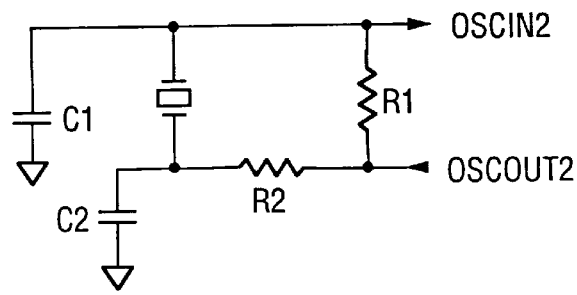
FIG. 21 is a schematic diagram illustrating a low frequency clock oscillator utilizable in an integrated data processing system in accordance with the present invention.

When operation with a crystal is desired, special care should be taken to minimize stray capacitances and inductance. The crystal, as well as the external components, should be placed in close proximity to OSCIN2 and OSCOUT2 pins to keep the printed circuit trace lengths to an absolute minimum. FIG. 21 show the external crystal interconnections. Table V provides the crystal characteristics and the values of R, and C components, including stray capacitance.

TABLE V

Low-Frequency Oscillator Circuit

| Component | Value | Tolerance | Units |
|---|---|---|---|
| RES | Ceramic Resonator 455K | | Hz |
| R1 | 1M | 10% | Ω |
| R2 | 4.7K | 10% | Ω |
| C1 | 100 | 20% | pF |
| C2 | 100 | 20% | pF |

X. Watch Dog Counter

The Watch Dog (WD) counter 30 is used to activate a non-maskable interrupt (NMI) whenever the system 10 is running out of control. The WD module 30 is a 10 Hz timer with a reset mechanism During the normal operation mode, the user clears the WD 30 at a rate higher than 10 Hz by writing 0x0E into the WDCTL register. These write accesses ensure that the Watch Dog 30 will not issue an NMI for a full 0.1 second. Failing to clear the WD 30 before 0.15 of a second has passed, will cause an NMI. If the user does not clear the Watch Dog 30, an NMI occurs exactly ten times a second. This NMI can be used to track the time. Upon reset, the Watch Dog 30 is disabled until the first write access to the WDCTL register.

XI. Internal ROM

The internal ROM 16 is up to 32 Kbytes large. The ROM 16 is organized as a 16-bit wide memory array with a zero wait-state access time. The ROM's starting address is 0x00000000. When the system 10 is in either External ROM 16 or Development modes, the lower 128 Kbytes are mapped for external accesses instead of accesses to the on-chip ROM 16.

XII. Internal RAM Arrays

The system provides two zero wait-state on-chip RAM arrays: an 1008 byte system RAM array 26 and an 1120 byte DSPM RAM array 28. The data bus between the CPU core 14 and both the RAM arrays is 16 bits wide. The data bus between the DSPM 12 and the DSPM RAM 28 is 32 bits wide to allow high throughput during DSP operations. While the DSPM 12 is active, the CPU core 14 is not allowed to access the DSPM RAM 28.

XIII. DSPM

The DSPM 12 is a complete processing unit, capable of autonomous operation parallel to the operation of the CPU core 14. The DSPM 12 executes command-list programs stored in the internal on-chip RAM 28 and manipulates data stored either in the internal RAM 28 or in an external off-chip memory. To maximize utilization of hardware resources, the DSPM 12 contains a pipelined DSP-oriented datapath and control logic that implements a set of DSP vector commands.

A. Programming Model

Internal RAM 28 is used by the DSPM 12 for fetching commands to be executed and for reading or writing data that is needed in the course of program execution. DSPM programs are encoded as command lists and are interpreted by the command-list execution unit.

Computations are performed by commands selected from the command list code instruction set, which is described in greater detail below. These commands employ the DSP-oriented datapath in a pipelined manner, thus maximizing the utilization of on-chip hardware resources. A set of dedicated registers is used to specify operands and options for subsequent vector commands. These dedicated registers can be loaded and stored by appropriate commands in between initiations of vector commands. Additional commands are available for controlling the flow of execution of the command list, as needed for programming loops and branches.

The CPU core interface specifies the mapping of the DSPM internal RAM 28 as a contiguous block within the CPU core's address space, thus making it possible for normal CPU core instructions to access and manipulate data and commands in the DSPM internal RAM 28, as described below. In addition, the CPU core interface contains control and status registers that are needed to synchronize the execution of CPU core instructions concurrently with execution of the DSPM command lists, also as described below.

B. RAM Organization and Data Types

The DSPM internal RAM 28 is organized as word or double-word addressable, uniform, linear address space. Memory locations are numbered sequentially, starting at 0 for the first location and incremented by 1 for each successive location. The content of each memory location is a 16-bit word. Double-words must be aligned to an even address. Valid RAM addresses for access by the command-list execution unit are 0 through 0×22F. Accesses to memory locations out of the DSMP RAM boundary are not allowed.

The organization of the DSPM internal RAM 28 is as follows:

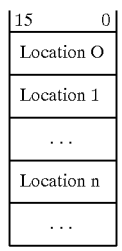

The RAM array 28 is not restricted to use by the DSPM 12; it can also be accessed by the CPU core 14 with any type of memory access (e.g., byte, word, or double-word accesses aligned to any byte address).

The internal RAM 28 stores command lists to be executed and data to be manipulated during program execution. As described below, command lists consist of 16-bit commands so that each individual command occupies one memory location. Each data item is represented as having either a 16-bit or a 32-bit value, as follows:

Integer values (16-bit)
Aligned-integer values (32-bit)
Real values (16-bit)
Aligned-real values (32-bit)
Extended-precision real values (32-bit)
Complex values (32-bit)
Integer Values Integer values are represented as signed 16-bit binary numbers in 2's complement format. The range of integer values is from $-2^{15}$ (-32768) through $2^{15}-1$ (32767). Bit 0 is the Least Significant Bit (LSB), and bit 15 is the Most Significant Bit (MSB).

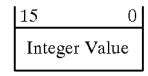

Integer values are typically used for addressing vector operands and for look-up table index manipulations.

Aligned-Integer Values

Aligned-integer values are represented as pairs of integer values and must be aligned on a double-word boundary. The less significant half represents one integer vector element and must be contained in an even-numbered memory location. The more significant half represents the next vector element and must be contained in the next (odd-numbered) memory location.

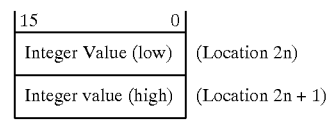

Aligned-integer values are used for higher throughput in operations where two sequential integer vector elements can be used in a single iteration. Both elements of an aligned-integer value have the same range and accuracy as specified for integer values above.

Real Values

Real values are represented as 16-bit signed fixed-point fractional numbers, in 2's complement format. Bit 15 (MSB) is the sign bit. Bits 0 (LSB) through 14 represent the fractional part. The binary digit is assumed to lie between bits 14 and 15.

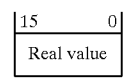

Real values are used to represent samples of analog signals, coefficients of filters, energy levels, and similar continuous quantities that can be represented using 16-bit accuracy. The range of real values is from -1.0 (represented as 0×8000) through $1.0-2^{-15}$ (represented as 0×7FFF).

Aligned-Real Values

Aligned-real values are represented as pairs of real values, and they must be aligned on a double-word boundary. The less significant half represents one real vector element, and must be contained in an even-numbered memory location. The more significant half represents the next vector element, and must be contained in the next (odd-numbered) memory location.

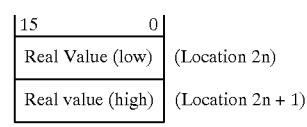

Aligned-real values are used for higher throughput in operations where two sequential real vector elements can be used in a single iteration. Both elements of an aligned-real value have the same range and accuracy as specified for real values above.

Extended-Precision Real Values

Extended-precision real values are represented as 32-bit signed fixed-point fractional numbers, in 2's complement format. Extended-precision real values must be aligned on a double-word boundary, so that the less significant half is contained in an even-numbered memory location, and the more significant half is contained in the next (odd-numbered) memory location. Bit 15 (MSB) of the more significant part is the sign bit. Bits from 0 (LSB) of the less significant part, through 14 of the more significant part, are used to represent the fractional part. The binary digit is assumed to lie between bits 14 and 15 of the more significant part. When extended-precision values are loaded or stored in the accumulator, bits 1 through 31 of the extended-precision argument are loaded or stored in bits 0 through 30 of the accumulator. Bit 0 of the extended-precision argument is not used during calculations. This bit is always set to "0" when stored back in the internal memory.

| 15 | 0 | |
|---|---|---|
| Less significant part | | (Location 2n) |
| More significant part | | (Location 2n + 1) |

Extended-precision real values are used to represent various continuous quantities that require high accuracy. The range of extended-precision real values is from −1.0 (represented as 0x80000000) through $1.0-2^{-30}$ (represented as 0x7FFFFFFE).

Complex Values

Complex values are represented as pairs of real values, and must be aligned on a double-word boundary. The less significant half represents the real part, and must be contained in an even-numbered memory location. The more significant half represents the imaginary part, and must be contained in the next (odd-numbered) memory location.

| 15 | 0 | |
|---|---|---|
| Real Value | | (Location 2n) |
| Imaginary part | | (Location 2n + 1) |

Complex values are used to represent samples of complex baseband signals, constellation points in the complex plane, coefficients of complex filters, and rotation angles as points on the unit circle, etc. Both the real and imaginary parts have the same range and accuracy as specified for real values above.

C. DSPM Dedicated Registers

The DSPM 12 contains nine dedicated registers that are used to transfer operands and options between command lists and vector instructions and to control the flow of execution of the command list. Some of the dedicated registers can be loaded from or stored in the DSPM internal RAM 28 by executing appropriate commands between initiations of vector instructions.

There are seven groups of dedicated registers:

Accumulator

Vector address registers

External address base register

Command-list pointer

Overflow register

Vector parameter register

Command-list repeat register

Accumulator

| Register | Function |
|---|---|
| A | Complex accumulator |

The structure of the accumulator is as follows:

| 33 | 0 | 33 | 0 |
|---|---|---|---|
| Imaginary | | Real | |

The A register is a complex accumulator. It has two 34-bit fields: a real part, and an imaginary part. Bits 15 through 30 of the real, and the imaginary parts of the accumulator can be read or written by the core in one double-word access. The 16-bit real part is mapped to the operand's bits 0 through 15, and the 16-bit imaginary part is mapped to the operand's bits 16 through 31. The accumulator can also be read and written by the command-list execution unit using the SA, SEA, LA and LEA instructions.

When a value is stored in the accumulator by the CPU core 14, the value of PARAM.RND bit is copied into bit position 14 of both real and imaginary parts of the accumulator. This technique allows rounding of the accumulator's value in the following DSPM instructions, as described in greater detail below. Bits 0 to 13 of real and imaginary accumulators are cleared to "0". The value of both the real and imaginary parts are sign extended (e.g. bit −30, the sign bit, is copied to bits 31 through 33).

Vector Pointer Registers

| Register | Function |
|---|---|
| X | X register |
| Y | Y register |
| Z | Z register |

The format of the X, Y, and Z registers is as follows:

| 31 | 16 | 15 | 8 | 7 | 4 | 3 | 0 |
|---|---|---|---|---|---|---|---|
| address | | (reserved) | | wrap-around | | increment | |

The X, Y, and Z dedicated registers are used for addressing up to three vector operands. They are 32-bit registers with three fields: address, increment, and wrap-around. The value in the address field specifies the address of a word in the on-chip memory. This field has 16 bits and can address up to 64 Kwords of internal memory. The address fields are initialized with the vector operands' start-addresses by commands in the command list. At the beginning of each vector operation, the contents of the address field are copied to incrementors. Increments can be used by vector instructions to step through the corresponding vector operands while executing the appropriate calculations. There is address wrap-around for those vector instructions that require some of their operands to be located in cyclic buffers. The allowed values for the increment field are 0 through 15. The actual increment will be $2^{increment}$ words. The allowed values for the wrap-around field are 0 through 15. The actual wrap-around will be $2^{wrap-around}$ words. The wrap-around must be greater than or equal to the increment.

The X, Y, and Z registers can be read and written by the CPU core 14. These registers can be read and written by the command-list execution unit, as well as by the core 14, when using SX, SXL, SXH, SY, SZ, LX, LY, and LZ instructions.

External Address Base Register

| Register | Function |
|----------|----------|
| EABR | External address base register |

The structure of the external address base register is as follows:

| 31 17 | 16 0 |
|-------|------|
| address | 0 |

The EABR register is used together with a 16-bit address field to form a 32-bit external address. External addresses are specified as the sum of the value in EABR and two times the value of the 16-bit address field. The only value allowed to be written into bits 0 through 16 of EABR is "0". The EABR register can be read and written by the core 14. It can also be written by the command-list execution unit by using the LEABR instruction.

EABR can hold any value except for 0xFFFE0000. Accessing external memory with an 0xFFFE0000 in the EABR will cause unpredictable results.

Command List Pointer

| Register | Function |
|----------|----------|
| CLPTR | Command list pointer |

The CLPTR is a 16-bit register that holds the address of the current command in the internal RAM 28. Writing into the CLPTR causes the DSPM command-list execution unit to begin executing commands, starting from the address in CLPTR. The CLPTR can be read and written by the core while the command-list execution is idle.

Whenever the DSPM command-list execution unit reads a command from the DSPM RAM 28, the value of the (CLPTR) is updated to contain the address of the next command to be executed. This implies, for example, that if the last command in a list is in address N, then the CLPTR will hold a value of N+1 following the end of command list execution.

Overflow Register

| Register | Function |
|----------|----------|
| OVF | Overflow register |

The structure of the overflow register is as follows:

| 15 2 | 1 | 0 |
|------|---|---|
| (reserved) | OVF | SAT |

The OVF register holds the current status of the DSPM arithmetic unit. It has two fields: OVF and SAT. The OVF bit is set to "1" whenever an overflow is detected in the DSPM 34-bit ALU (e.g., bits 32 and 33 of the addition or subtraction result are not equal). No overflow detection is provided for integers. The SAT bit is set to in1fl whenever a value read from the accumulator cannot be represented within the limits of its data type (e.g., 16 bits for real and integer, and 32 bits for extended real). In this case, the value read from the accumulator will either be the maximum allowed value or the minimal allowed value for this data type, depending on the sign of the accumulator value. Note that in some cases when the OVF is set, the SAT will not be set. The reason is that if an OVF occurred, the value in the accumulator can no longer be used for proper SAT detection. Upon reset, and whenever the ABORT register is written, the OVF register is cleared to "0".

The OVF is a read only register. It can be read by the core 14. It can also be read by the command-list execution unit using the SOVF instruction. Reading the OVF by either the core or the conmanad-list execution unit clears it to "0".

Vector Parameter Registers

| Register | Function |
|----------|----------|
| PARAM | Vector parameters |

The format of the PARAM register is as follows:

| 15 26 | 25 | 24 19 | 18 | 17 | 16 | 15 0 |
|-------|----|----|----|----|----|------|
| (reserved) | RND | OP | SUB | CLR | COJ | length |

The PARAM register is used to specify the number of iterations and special options for the various instructions. The options are: RND, OP, SUB, CLR, and COJ. The effect of each of the bits of the PARAM register is discussed in greater detail below.

The PARAM register can be read and written by the core 14. It can also be written by command-list execution unit, by using the LPARAM instruction. The contents of the PARAM register are not affected any of the command list instructions except for LPARAM. The value written into PARAM-.LENGTH must be greater then 0.

Command-List Repeat Register

| Register | Function |
|----------|----------|
| REPEAT | Repeat register |

The structure of the repeat register is as follows:

| 31 16 | 15 0 |
|-------|------|
| count | target |

The REPEAT register is used, together with appropriate commands, to implement loops and branches in the command list. The count is used to specify the number of times a loop in the command list is to be repeated. The target is used to specify a jump address within the command list.

The REPEAT register can be read and written by the core 14. It can also be read and written by the command-list execution unit by using SREPEAT and LREPEAT instructions, respectively. The value of REPEAT.COUNT changes during the execution of the DJNZ command.

D. CPU Core Interface Control and Status Registers

The CPU core interface control and status registers are used for synchronization between the DSPM 12 and the CPU core 14. Values stored in dedicated registers may change as a result of executing vector instructions, as described in greater detail below.

Abort Register

| Register | Function |
|---|---|
| ABORT | Abort register |

The ABORT register is used to force execution of the command list to halt. Writing any value into this register stops execution and clears the contents of OVF, EXT, DSPINT and DSPMASK. The ABORT register can only be written and only by the core 14.

External Memory Reference Control Register

| Register | Function |
|---|---|
| EXT | External memory control register |

The structure of the external memory reference control register is as follows:

| 15 | 1 | 0 |
|---|---|---|
| (reserved) | | HOLD |

The EXT register controls external references. The command-list execution unit checks the value of EXT.HOLD before each external memory reference. When EXT.HOLD is "0", external memory references are allowed. When EXT.HOLD "1", and external memory references are requested, the execution of the command list will be halted. The execution will be resumed as soon as EXT.HOLD is "0". Upon reset, and whenever the ABORT register is written, EXT.HOLD is cleared to "0". The EXT register can be read or written by the core.

Command-List Execution Status Register

| Register | Function |
|---|---|
| CLSTAT | Command-list execution status register |

The structure of the command-list status register is as follows:

| 15 | 1 | 0 |
|---|---|---|
| (reserved) | | RUN |

The CLSTAT register displays the current status of the execution of the command list. When the command-list execution is idle, CLSTAT.RUN is "0", and when it is active, CLSTAT.RUN is −1". Upon reset, the CLSTAT register is cleared to "0". It can be only be read, and only by the core 14.

Interrupt Control Registers

| Register | Function |
|---|---|
| DSPINT | Interrupt register |
| DSPMASK | Mask register |
| NMISTAT | Non maskable interrupt status register |

The structure of the interrupt and the mask registers is as follows:

| 15 | 1 | 0 |
|---|---|---|
| (reserved) | | HALT |

The DSPINT register holds the current status of interrupt requests. Whenever execution of the command list is stopped, the DSPINT.HALT bit is set to "1". The DSPINT is a read only register. It is cleared to "0" whenever it is read, whenever the ABORT register is written, and upon reset.

The DSPMASK register is used to mask the DSPINT.HALT flag. An interrupt request is transferred to the interrupt logic whenever the DSPINT.HALT bit is set to "1", and the DSPMASK.HALT bit is unmasked (set to "1"). DSPMASK can be read and written by the core 14. Upon reset, and whenever the ABORT register is written, all the bits in DSPMASK are cleared to "0".

The structure of the NMISTAT register is as follows:

| 31 | 4 | 3 | 2 | 1 | 0 |
|---|---|---|---|---|---|
| (reserved) | | WD | ERR | UND | (reserved) |

The NMISTAT holds the status of the current pending Non-Maskable Interrupt (NMI) requests.

Whenever the core 14 attempts to access the DSPM address space while the CLSTAT.RUN bit is "1" (except for accesses to the CLSTAT, EXT, DSPINT, NMISTAT DSPMASI4, and ABORT registers) NMISTAT.ERR is set to "1".

Whenever there is an attempt to execute a DBPT instruction, a reserved DSPM instruction, the NMISTAT.UND bit is set to "1".

When the Watch Dog is not cleared on time, the NMISTAT.WD bit is set to "1".

When one of the bits in NMISTAT is set to "1", an NMI request to the core is issued.

NMISTAT is a read only register. It is cleared each time its contents are read. This allows the NMI handler to decide which of the NMI sources requested the NMI. Note that more than one of the bits of NMISTAT can be set to "1" (one example is a DSPM error and a WD timeout at the same time). Note also that if a second NMI occurs while an NMI is in process, it is possible that the second NMI will read the NMISTAT and clear it; thus, the first NMI will read a value of '0' from the NMISTAT. For proper operation, the NMI handler must read the NMISTAT and if with more than one bit set to "1", must take care of the two sources. The NMISTAT register is cleared to '0' upon reset.

E. Command List Format

All commands have the same fixed format, consisting of a 5-bit opcode field and a 11-bit arg field, as shown below:

| 31 | 11 | 10 | 0 |
|---|---|---|---|
| opcode | | arg | |

The opcode field specifies an operation to be performed. The arg field interpretation is determined by the class to which the command belongs. There are several classes of commands, as follows:

Load Register Instructions
Store Register Instructions
Adjust Register Instructions Flow Control Instructions
Internal Memory Move Instructions
External Memory Move Instructions
Arithmetic/Logical Instructions
Multiply-and-Accumulate Instructions
Multiply-and-Add Instructions
Clipping and Min/Max Instructions
Special Instructions The formal description below of the DSPM command-list code instruction set is based on the "C" programming language, using the following conventions:

| | |
|---|---|
| low | Bits 0 through 15 of a 32-bits entity. |
| high | Bits 16 through 31 of a 32-bits entity. |
| LENG | value of PARAM.LENGTH. |
| A | Accumulator. |
| aligned_addr | An even number in the range $[0, 2^{16})$, used for specifying a double word-aligned address in internal memory. |
| mem[k] | A value in internal memory whose first word address is k, where $0 \leq k < 2^{16}$. |
| ext_mem[k] | A value in external memory whose first byte address is k, where $0 \leq k < 2^{32}$. |
| X | Vector in internal memory whose first address is pointed to by X.ADDR. |
| Y | Vector in internal memory whose first address is pointed to by Y.ADDR. |
| Z | Vector in internal memory whose first address is pointed to by Z.ADDR. |
| X[n] | A value in internal memory whose address is formed by adding an offset to a cyclic buffer base address. The base address is formed by clearing the (X.WRAP-1) less-significant bits of X.ADDR. The offset within the buffer is calculated by: (X.ADDR + n × $2^{X.INCR}$) modulo $2^{X.WRAP}$. |
| Y[n] | A value in internal memory whose address is formed by adding an offset to a cyclic buffer base address. The base address is formed by clearing the (Y.WRAP-1) less-significant bits of Y.ADDR. The offset within the buffer is calculated by: (Y.ADDR + n × $2^{Y.INCR}$) modulo $2^{Y.WRAP}$. |
| Z[n] | A value in internal memory whose address is formed by adding an offset to a cyclic buffer base address. The base address is formed by clearing the (Z.WRAP-1) less-significant bits of Z.ADDR. The offset within the buffer is calculated by: (Z.ADDR + n × $2^{Z.INCR}$) modulo $2^{Z.WRAP}$. |
| &X[n] | The word address of X[n]. |
| &Y[n] | The word address of Y[n]. |
| &X[n] | The word address of Z[n]. |

The following data type definitions are used in the DSPM command-list code instruction set description:

| | |
|---|---|
| integer | An integer value. |
| aligned_integer | An aligned integer value. |
| real | A real value. |
| aligned_real | An aligned real value. |
| extend | An extended-precision real value. |
| complex | A complex value. |
| ext-address | A 32-bit value used for external memory access. |
| vector_prt | A valid value for X, Y, and Z registers. |
| repeat_reg | A valid value for REPEAT register. |
| ovf_reg | A valid value for OVI register. |
| param_reg | A valid value for PRAM register. |
| eabr_reg | A valid value for EABR register. |
| real_acc | A 34-bit value inside either the real part or the imaginary part of the accumulator. |
| complex_acc | A 68-bit value inside the complex accumulator. |

General Remarks

The values of EABR, PARAM, X, Y, and Z registers are not changed by execution of the command list.

Some instructions use the accumulator as a temporary register and therefore destroy its contents. In general, it should be assumed that the contents of the accumulator is unpredictable after an instruction terminates, unless stated otherwise in the notes section following that instruction's formal specification.

Non-complex instructions that use the accumulator, can use either the real or the imaginary parts, or both. In general, when an integer or real data type is to be read, it is taken from the real part. An extended-precision real data type is taken from the imaginary part. When a non-complex data type is loaded in the accumulator (by the LEA instruction or within other instructions prior to saving it into memory), it is written to both real and imaginary parts.

Rounding of real, aligned real, and complex results is implemented by copying PARAM.RND into bit position 14 of both real and imaginary part of the accumulator, performing the requested operation, and truncating the contents of the accumulator upon storing results to memory. In Multiply-and-Add instructions and some of the special instructions this is done transparently on each vector element iteration. In Multiply-and-Accumulate instructions, when PARAM.CLR is "0", the previous content of the accumulator is used, so that rounding control is actually performed when the accumulator is first loaded and not when the multiply operations is executed. On the other hand, if PARAM.CLR is "1", the PARAM.RND value is copied into the bit 14 of the cleared accumulator, so that rounding control is done at the same time that the multiply operation is executed.

In operations on complex operands, the order of accumulation is as follows: the result of the multiplication with the real part of the X operand is added first to the accumulator, and only then the result of the multiplication with the imaginary part of the X operand is added.

In general, the X, Y and Z vectors can overlap. However, because of the pipelined structure of the DSPM datapath, the user must verify that a value written into the DSPM internal memory will not be used in the same vector instruction as a source operand for the next 8 iterations.

The description below specifies the encoding of each DSPM instruction. All other values are reserved for future use. Any attempt to execute any reserved instructions will terminate execution of the command list, issue an NMI request, and set NMISTAT.UND to "1". In this case the contents of the EXT, and DSPMASK remains unchanged, but the contents of the OVF, and Accumulator may change.

Load Register Instructions

LX—Load X Vector Pointer

The LX instruction loads the double-word at aligned.addr into the X register.

PATENT

-36-

Syntax:

LX aligned_addr

| 15 11 | 10 0 |
|---|---|
| 00010 | aligned_addr |

Operation:
{
    X = (vector_ptr) mem[aligned_addr];
}

Notes:

The value of mem[aligned_addr] should conform to vector pointer specification format.

Accumulator is not affected.

LY - Load Y Vector Pointer

The LY instruction loads the double word at aligned_addr into the Y register.

Syntax:

LY aligned_addr

| 15 11 | 10 0 |
|---|---|
| 00011 | aligned_addr |

Operation:
{
    Y = (vector_ptr) mem[aligned_addr];
}

Notes:

The value of mem[aligned_addr] should conform to vector pointer specification format.

Accumulator is not affected.

LZ - Load Z Vector Pointer

The LZ instruction loads the double word at aligned_addr into the Z register.

Syntax:

LZ aligned_addr

| 15 11 | 10 0 |
|---|---|
| 00100 | aligned_addr |

Operation:
{
    Z = (vector_ptr) mem[aligned_addr];
}

PATENT

-37-

Notes:

The value of mem[aligned_addr] should conform to vector pointer specification format.
Accumulator is not affected.

Load Accumulator

The LA instruction loads the complex value at aligned_addr into the A accumulator as a complex value.

Syntax:

LA aligned_addr

| 15    11 | 10          0 |
|----------|---------------|
| 00101    | aligned_addr  |

Operation:

{
    (complex) A = (complex) mem[aligned_addr];
}

Notes:

The real and imaginary parts are placed in bits 15 through 30 of the real and imaginary parts of the accumulator. The value of both the real and imaginary parts are sign extended (e.g., bit 30, the sign bit, is copied to bits 31 through 33). Bits 0 to 13 of real and imaginary accumulators are cleared to "0".

When PARAM.RND is set to "1", bit 14 of the real and imaginary parts is set to "1", in order to implement rounding upon subsequent additions into the accumulator. Otherwise, it is cleared to "0".

LEA - Load Extended Accumulator

The LEA instruction loads the contents of the accumulator with the extended value specified by X[0].

Syntax:

EXEC LEA

| 15    11 | 10              0 |
|----------|-------------------|
| 10000    | 101 0011 0011     |

Operation:

{
    extended X;
    A = (extended) X[0];
}

Notes:

PATENT
-38-

Bits 1 through 31 of the memory location are read into bit positions 0 through 30 of the accumulator. The value of both the real and imaginary parts are sign extended (e.g., bit 30, the sign bit, is copied to bits 31 through 33).

LPARAM - Load Parameters Register

The LPARAM instruction loads the double-word

Syntax:

LPARAM aligned_addr

| 15    11 | 10          0 |
|----------|---------------|
| 00000    | aligned_addr  |

Operation:
{
    PARAM = (param_reg) mem[aligned_addr];
}

Notes:

The a value at mem[aligned_addr] should conform to this register format. The value written in PARAM.LENGTH must be greater than 0.

Accumulator is not affected.

LREPEAT - Load Repeat Register

The LREPEAT instruction loads the double-word at aligned_addr into the REPEAT register.

Syntax:

LREPEAT aligned_addr

| 15    11 | 10          0 |
|----------|---------------|
| 00110    | aligned_addr  |

Operation:
{
    REPEAT = (repeat_reg) mem[aligned_addr];
}

Notes:

The value at mem[aligned_addr] should conform to the REPEAT register format.

Accumulator is not affected.

LEABR - Load External Address Base Register

The LEABR instruction loads the double-word at mem[aligned_addr] into the EABR register.

PATENT
-39-

Syntax:

LEABR aligned_addr

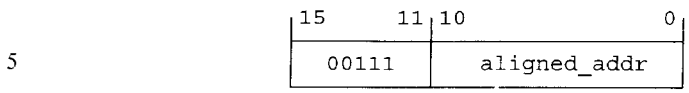

Operation:

```
{
        EABR = (eabr_reg) mem[aligned_addr];
}
```

Notes:

The value at mem[aligned_addr] should conform to vector pointer specification format, that is, bit positions 0 through 16 must be specified as "0".

Accumulator is not affected.

STORE REGISTER INSTRUCTIONS

SX - Store X Vector Pointer

The SX instruction stores the contents of the X register into the double-word at aligned_addr.

Syntax:

SX aligned_addr

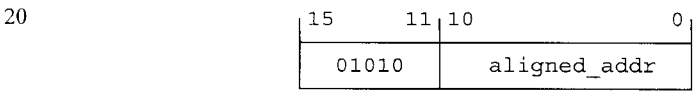

Operation:

```
{
        (vector_ptr) mem[aligned_addr] = X;
}
```

Notes:

Accumulator is not affected.

SXL - Store X Vector Pointer Lower Half

The SXL instruction stores the contents of the lower-half of the X register into the word at mem[addr].

Syntax:

SXL addr

PATENT
-40-

```
 15      11 10           0
┌──────────┬──────────────┐
│  11100   │     addr     │
└──────────┴──────────────┘
```

Operation:
{
    (complex) A = (complex) mem[aligned_addr];
}

Notes:

Accumulator is not affected.

SXH - Store X Vector Pointer Higher Half

The SXH instruction stores the contents of the higher-half of the X register into the word at med[addr].

Syntax:

SXH addr

```
 15      11 10           0
┌──────────┬──────────────┐
│  11101   │     addr     │
└──────────┴──────────────┘
```

Operation:
{
    mem[aligned_addr] = X.high;
}

Notes:

Accumulator is not affected.

SY - Store Y Vector Pointer

The SY instruction stores the contents of the Y register into the double-word at aligned_addr.

Syntax:

SY aligned_addr

```
 15      11 10           0
┌──────────┬──────────────┐
│  01011   │ aligned_addr │
└──────────┴──────────────┘
```

Operation:
{
    (vector_ptr) mem[aligned_addr] = Y;
}

Notes:

Accumulator is not affected.

PATENT
-41-

SZ - Store Z Vector Pointer

The SZ instruction stores the contents of the Z register into the double-word at aligned_addr.

Syntax:

SZ aligned_addr

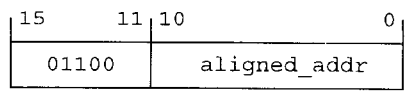

Operation:

{
    (vector_pointer) mem[aligned_addr] = Z;
}

Notes:

Accumulator is not affected.

SA - Store Accumulator

The SA instruction stores the contents of the A accumulator as a complex value into mem[aligned_addr].

Syntax:

SA aligned_addr

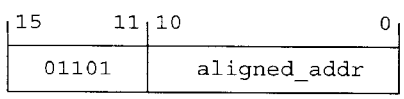

Operation:

{
    (complex) mem[aligned_addr] = (complex) A;
}

Notes:

Bits 15 through 30 of the real and imaginary parts of the accumulator are placed in the real and imaginary parts of the complex value at mem[aligned_addr].

Accumulator is not affected.

SEA - Store Extended Accumulator

The SEA stores the contents of the imaginary accumulator bits 0 to 30 as an extended value into a DSPM memory location specified by Z[0]. Bit zero of this location is cleared to '0'.

Syntax:

EXEC SEA

PATENT
-42-

```
 15        11 10              0
|  10000    | 101 0011 0110  |
```

5   Operation:
    {
        extended Z;
        Z[0] = (extended) A;
    }
10  Notes:
    Accumulator is not affected.

SREPEAT - Store Repeat Register
    The SREPEAT instruction stores the contents of the REPEAT register in the double-word at mem[aligned_addr].
15  Syntax:
        SREPEAT aligned_addr

```
 15        11 10              0
|  01110    |   aligned_addr |
```
20  Operation:
    {
        (ovf_reg) mem[aligned_addr] = OVF;
    }
25  Notes:
    Accumulator is not affected.

ADJUST REGISTER INSTRUCTIONS

INCX - Increment X Vector Pointer
    The INCX instruction increments the X vector pointer by one element, according to the
30  increment and the wrap.
    Syntax:
        EXEC INCX

```
 15        11 10              0
|  10000    | 100 0101 1001  |
```
35
    Operation:
    {
        X.ADDR = &X[1];
40  }

PATENT
-43-

Notes:

Accumulator is not affected.

INCY - Increment Y Vector Pointer

The INCY instruction increments the Y vector pointer by one element, according to the increment and the wrap.

Syntax:

EXEC INCY

| 15    11 | 10           0 |
|----------|----------------|
| 10000    | 100 0101 1011  |

Operation:
{
    Y.ADDR = &Y[1];
}

Notes:

Accumulator is not affected.

INCZ - Store Z Vector Pointer

The INCZ instruction increments the Z vector pointer by one element, according to the increment and the wrap.

Syntax:

EXEC INCZ

| 15    11 | 10           0 |
|----------|----------------|
| 10000    | 100 0101 1101  |

Operation:
{
    Z.ADDR = &Z[1];
}

Notes:

Accumulator is not affected.

DECX - Decrement X Vector Pointer

The DECX instruction decrements the X vector pointer by one element, according to the increment and the wrap.

Syntax:

EXEC DECX

PATENT
-44-

```
 15      11 10              0
| 10000   | 101 0010 1101  |
```

Operation:
{
    X.ADDR = &X[-1];
}
Notes:
    Accumulator is not affected.

DECY - Decrement Y Vector Pointer

The DECY instruction decrements the Y vector pointer by one element, according to the increment and the wrap.

Syntax:
    EXEC DECY

```
 15      11 10              0
| 10000   | 101 0010 1111  |
```

Operation:
DECY
{
    Y.ADDR = &Y[-1];
}
Notes:
    Accumulator is not affected.

DECZ - Decrement Z Vector Pointer

The DECZ instruction decrements the Z vector pointer by one element, according to the increment and the wrap.

Syntax:
    EXEC DECZ

```
 15      11 10              0
| 10000   | 101 0011 0001  |
```

Operation:
{
    Z.ADDR = &Z[-1];
}
Notes:
    Accumulator is not affected.

PATENT

-45-

FLOW CONTROL INSTRUCTIONS

NOPR - No Operation

The NOPR command passes control to the next command in the command list. No operation is performed.

Syntax:

NOPR

| 15      11 | 10              0 |
|------------|-------------------|
| 11010      | 00000000000       |

Notes:

Accumulator is not affected.

HALT - Terminate Command-List Execution

The HALT command terminates execution of the command list. No further commands are executed. This event is made visible to the CPU core, as specified in Sec. 3.6.

Syntax:

HALT

| 15      11 | 10              0 |
|------------|-------------------|
| 11001      | 00000000000       |

Notes:

Accumulator is not affected.

DJNZ - Decrement and Jump If Not Zero

The DJNZ command is used to implement loops and branches in the in the command list. The value of the REPEAT.COUNT field is decremented by 1 and compared to 0. If it is not equal to 0, then execution of the command list continues with the command located in the RAM address specified by the REPEAT.TARGET field. When the REPEAT.COUNT field is equal to 0, then execution continues with the next command in the command list.

The DSPM has only one REPEAT register. To next loops, user must save the contents of the REPEAT register before starting an inner loop, and restore it at the end of the inner loop.

Syntax:

EXEC DJNZ

PATENT
-46-

```
 15      11 10              0
┌──────────┬────────────────┐
│  10-00   │  101 0110 1100 │
└──────────┴────────────────┘
```

Notes:

Accumulator is not affected.

DBPT - Debug Breakpoint

The DBPT instruction is used for implementing software debug breakpoint in the DSPM command-list. Whenever there is an attempt to execute a DBPT instruction, the NMIS-TAT.UND bit is set to "1", (See Sec. 3.4.4).

Syntax:

EXEC DBPT

```
 15      11 10              0
┌──────────┬────────────────┐
│  10000   │  111 1111 1110 │
└──────────┴────────────────┘
```

Notes:

Accumulator is not affected.

INTERNAL MEMORY MOVE INSTRUCTIONS

VRMOV - Vector Real Move

The VRMOV instruction copies the real X vector to the real Z vector.

Syntax:

EXEC VRMOV

```
 15      11 10              0
┌──────────┬────────────────┐
│  10000   │  101 0010 1011 │
└──────────┴────────────────┘
```

Operation:

```
{
    real X,Z ;
    for (n=0; n < LENG; n++)
    {
        Z[n] = X[n] ;
    }
}
```

VRMOV - Vector Aligned Real Move

The VARMOV instruction copies the aligned real X vector to the aligned real Z vector.

Syntax:

PATENT

-47-

```
               EXEC VARMOV
                            15      11 10              0
                            ┌──────────┬──────────────┐
                            │  10000   │ 100 0011 1000│
                            └──────────┴──────────────┘
       Operation:
       {
               aligned_real X,Z ;
               for (n=0; n < LENG; n++)
               {
                       X[n].low  = X[n].low  ;
                       Z[n].high = X[n].high ;
               }
       }
```

VRGATH - Vector Real Gather

The VRGATH instruction gathers non-contiguous elements of the X real vector, as specified by the Y integer vector, and places them in contiguous locations in the Z real vector.

Syntax:

```
               EXEC VRGATH
                            15      11 10              0
                            ┌──────────┬──────────────┐
                            │  10000   │ 100 0011 1010│
                            └──────────┴──────────────┘
       Operation:
       {
               real X,Z ;
               integer X.ADDR, Y ;
               for (n=0; n < LENG; n++)
               {
                       Z[n] = mem[X.ADDR+Y[n]) & 0xFFFF] ;
               }
       }
```

VRSCAT - Vector Real Scatter

The VRSCAT instruction scatters contiguous elements of the X real vector, and places them in non-contiguous locations in the Z real vector, as specified by the Y integer vector.

Syntax:

```
               EXEC VRSCAT
                            15      11 10              0
                            ┌──────────┬──────────────┐
                            │  10000   │ 100 0100 0000│
                            └──────────┴──────────────┘
       Operation:
       {
               real X, Z ;
               integer Z.ADDR, Y ;
               for (n=0; n < LENG; n++)
```

PATENT
-48-

```
    {
        mem[Z.ADDR+Y[n]) & 0xFFFF] = X[n];
    }
}
```

EXTERNAL MEMORY MOVE INSTRUCTIONS

The VXLOAD instruction loads a vector from external memory into the Z vector. The external memory address is specified in the EABR and X registers.

VXLOAD - Vector External Load

The DECX instruction decrements the X vector pointer by one element, according to the increment and the wrap.

Syntax:

EXEC VXLOAD

| 15    11 | 10           0 |
|----------|----------------|
| 10000    | 100 0100 1111  |

Operation:

```
VXLOAD
{
    real X,Z ;
    ext_address EABR ;
    for (n=0; n < LENG; n++)
    {
        Z[n] = ext_mem[ EABR + (ext_address) 2*&X[n] ]
    }
}
```

VXSTORE - Vector External Store

The VXSTORE instruction stores the Z vector into an external memory vector. The external memory address is specified in the EABR and X registers.

Syntax:

EXEC VXSTORE

| 15    11 | 10           0 |
|----------|----------------|
| 10000    | 100 0101 0101  |

Operation:

```
{
    real X,Z ;
    ext_address EABR ;
    for (n=0; n < LENG; n++)
    {
        ext_mem[ EABR + (ext_address) 2*&Z[n] ] = X[n] ;
```

PATENT
-49-

}
}

VXGATH - Vector External Gather

The VXGATH instruction gathers non-contiguous elements of the external memory vector, as specified by the Y integer vector, and places them in contiguous locations in the Z real vector. The external memory address is specified in the EABR and X registers.

Syntax:

EXEC VXGATH

| 15      11 | 10                   0 |
|---|---|
| 10000 | 100 0100 0110 |

Operation:

```
{
        real X,Z ;
        integer Y, X.ADDR ;
        ext_address EABR ;
        for (n=0; n < LENG; n++)
        {
          Z[n] = ext_mem [ EABR + (ext_address) 2*
              ( (X.ADDR + (integer) Y[n] & 0xFFFF ) ] ;
        }
}
```

ARITHMETIC/LOGICAL INSTRUCTIONS

VROP - Vector Real Op

The VROP instruction performs one of 7 operations between corresponding elements of the X and Y real vectors, and writes the result in the corresponding place in the Z output vector. The operation to be performed is specified in PARAM.OP field.

Syntax:

EXEC VROP

| 15      11 | 10                   0 |
|---|---|
| 10000 | 101 0110 1000 |

Operation:

```
{
        real X,Y,Z ;
        for (n=0; n < LENG; n++)
        {
          Z[n] = (real) (X[n] <op> Y[n]) ;
        }
```

PATENT
-50-

}

The allowed values in PARAM.OP are:

| <op>   | Operation |           |
|--------|-----------|-----------|
| 011010 | ADD       | Z = X+Y   |
| 100111 | SUB       | Z = X-Y   |
| 001000 | BIC       | Z = X&~Y  |
| 100000 | AND       | Z = X&Y   |
| 111000 | OR        | Z = X\|Y  |
| 011000 | XOR       | Z = X^Y   |
| 001100 | INV       | Z = ~Y    |

VAROP - Vector Aligned Real Op

The VAROP instruction performs one of 7 operations between corresponding elements of the X and Y aligned vectors, and writes the result in the corresponding place in the Z output vector. The operation to be performed is specified in PARAM.OP field.

Syntax:

EXEC VAROP

| 15    11 | 10            0 |
|----------|-----------------|
| 10000    | 100 0001 1010   |

Operation:
```
{
    aligned_real X,Y,Z ;
    for (n=0; n < LENG; n++)
    {
        Z[n].low  = (real) (X[r].low  <op> Y[n].low) ;
        Z[n].high = (real) (X[n].high <op> Y[n].high) ;
    }
}
```
Notes:

The allowed values in PARAM.OP are the same as those in VROP.

MULTIPLY-AND-ACCUMULATE INSTRUCTIONS

VRMAC - Vector Real Multiply and Accumulate

The VRMAC instruction performs a convolution sum of the X and Y real vectors. The previous value of the accumulator is used and the result stored in Z[0].

Syntax:

EXEC VXSTORE

PATENT
-51-

```
 15      11 10              0
|  10000   | 100 0000 0111 |
```

Operation:
```
{
    real X,Y,Z ;
    real_acc A;
    for (n=0; n < LENG; n++)
    {
        A = A + X[n] * Y[n] ;
    }
    Z[0] = (real) A ;
}
```

Notes:

When PARAM.CLR is set to "1", A is cleared to "0" prior to the first addition. When PARAM.SUB is set to "1", the "+" sign is replaced by a "-" sign.

VCMAC - Vector Complex Multiply and Accumulate

The VCMAC instruction performs a convolution sum of the X and Y complex vectors. The previous value of the accumulator is used, and the result is stored in Z[0].

Syntax:

EXEC VCMAC

```
 15      11 10              0
|  10000   | 100 0111 0101 |
```

Operation:
```
{
    complex X,Y,Z ;
    complex_acc A ;

for (n=0; n < LENG; n++)
    {
        A = A + X[n] * Y[n] ;
    }
    Z[0] = (complex) A;
}
```

Notes:

When PARAM.COJ is set to "1", X[n] is multiplied by the conjugate of Y[n]. When PARAM.CLR is set to "1", A cleared to "0" prior to first addition. When PARAM.SUB is set to "1", the "+" sign is replaced by a "-" sign.

VRLATP - Vector Real Lattice Propagate

PATENT

-52-

The VRLATP instruction is used for implementing lattice and inverse lattice filter operations. This instruction is used to update the propagating values of vector Z.

Syntax:

EXEC VRLATP

| 15     11 | 10                0 |
|---|---|
| 10000 | 100 0010 1100 |

Operation:

```
{
    real X,Y,Z ;
    real_acc A ;

A = (real_acc) Z[0] ;

for (n=1; n < LENG; n++)
    {
        A = A + X[n-1] * Y[n-1] ;
        Z[n] = (real) A ;
        A = (real_acc) Z[n] ;
    }
}
```

Note:

When PARAM.SUB is set to "1", the "+" sign is replaced by a "-" sign. The LENG parameter for this operation must be greater than 1.

VCLATP - Vector Complex Lattice Propagate

The VCLATP instruction is used for implementing lattice and inverse lattice filter operations. This instruction is used to update the propagating values of vector Z.

Syntax:

EXEC VCLATP

| 15     11 | 10                0 |
|---|---|
| 10000 | 100 1110 1000 |

Operation:

```
{
    complex X,Y,Z ;
    complex_acc A ;

A = (complex_acc) Z[0] ;

for (n=1; n < LENG; n++)
    {
        A = A + X[n-1] * Y[n-1] ;
        Z[n] = (complex) A ;
```

PATENT
-53-

}
}

Note:

When PARAM.COJ is set to "1", X[n] is multiplied by the conjugate of Y[n]. When PARAM.SUB is set to "1", the "+" sign is replaced by a "-" sign. The LENG parameter for this operation must be greater than 1.

MULTIPLY-AND-ADD INSTRUCTION

VAIMAD - Vector Aligned Integer Multiply and Add

The VAIMAD instruction multiplies corresponding elements of the X and Y integer vectors, and adds or subtracts the result, as an integer value, to the integer vector Z. This result is placed in the Z output vector.

Syntax:

EXEC VAIMAD

| 15    11 | 10              0 |
|----------|-------------------|
| 10000    | 100 0001 0100     |

Operation:

```
{
    aligned_integer X,Y, ;
    integer Z ;

for (n=0; n < LENG; n++)
    {
        Z[2n]   = (integer) (Z[2n]   + X[n].low  * Y[n].low) ;
        Z[2n+1] = (integer) (Z[2n+1] + X[n].high * Y[n].high) ;
    }
}
```

VRMAD - Vector Real Multiply and Add

The VRMAD instruction multiplies corresponding elements of the X and Y real vectors and adds or subtracts the result to the real vector Z. This result is placed in the Z output vector.

Syntax:

EXEC VRMAD

| 15    11 | 10              0 |
|----------|-------------------|
| 10000    | 100 0011 0011     |

Operation:

```
{
    real X,Y,Z ;
```

PATENT
-54-

```
        for (n=0; n < LENG; n++)
        {
            Z[n] = (real) ( Z[n] + X[n] * Y[n] ) ;
        }
    }
```

Notes:

When PARAM.CLR is set to "1", only multiplication is performed, without addition. When PARAM.SUB is set to "1", the "+" sign is replaced by a "-" sign.

VARMAD - Vector Aligned Real Multiply and Add

The VARMAD instruction multiplies corresponding elements of the X and Y real vectors and adds or subtracts the result to the real vector Z. This result is placed in the Z output vector.

Syntax:

EXEC VARMAD

| 15    11 | 10              0 |
|----------|-------------------|
| 10000    | 100 0000 1110     |

Operation:

```
    {
        aligned_real X,Y ;
        extended Z ;

for (n=0; n < LENG; n++)
        {
            Z[2n] = (extended) (Z[2n] + X[n].low * Y[n].low) ;
            Z[2n] = (extended) (Z[2n+1] + X[n].high * Y[n].high) ;
        }
    }
```

Notes:

When PARAM.CLR is set to "1", only multiplication is performed, without addition. When PRAM.SUB is set to "1",, the "+" sign is replaced by a "-" sign.

VCMAD - Vector Complex Multiply and Add

The VCMAD instruction multiplies the corresponding elements of the X and Y complex vectors and adds or subtracts the result to the complex vector Z. This result is placed in the Z output vector.

Syntax:

EXEC VCMAD

| 15    11 | 10              0 |
|----------|-------------------|
| 10000    | 100 1110 0000     |

Operation:

```
{
        complex X,Y,Z ;

for (n=0 n < LENG; n++)
        {
                Z[n] = (complex) ( Z[n] + X[n] * Y[n] ) ;
        }
}
```

Notes:

When PARAM.COJ is set to "1", X[n] is multiplied by the conjugate of Y[n]. When PARAM.CLR is set to "1", only multiplication is performed, without addition. When PARAM.SUB is set to "1", the "+" sign is replaced by a "-" sign.

CLIPPING AND MIN/MAX INSTRUCTIONS

VARABS - Vector Aligned Real Absolute Value

The VARABS instruction computes the absolute value of each element in the real vector X and places the result in the corresponding place in the Y output vector.

Syntax:

EXEC VARABS

| 15    11 | 10              0 |
|----------|-------------------|
| 10000    | 100 0001 1111     |

Operation:

```
{
        aligned_real X,Z ;

for (n=0; n < LENG; n++)
        {
                Z[n].low = abs (X[n].low) ;
                Z[n].high = abs (X[n].high) ;
        }
}
```

Notes:

There is no representation for the absolute value of 0x8000. Whenever an absolute value of 0x8000 is needed, OVF.SAT is set to "1", and the maximum positive number 0x7FFF is returned.

VARMIN - Vector Aligned Real Minimum

The VARMIN instruction compares corresponding elements of the X and Y real vectors, and writes the smaller of the two in the corresponding place in the Z integer vector.

Syntax:

PATENT

-56-

EXEC VARMIN

| 15 11 | 10 0 |
|---|---|
| 10000 | 100 0101 1111 |

Operation:
{
    aligned_real X,Y,Z ;

for (n=0; n < LENG; n++)
    {
       Z[n].low = min (X[n].low, Y[n].low);
       Z[n].high = min (X[n].high, Y[n].high);
    }
}

VARMAX - Vector Aligned Real Maximum

The VARMAX instruction compares corresponding elements of the X and Y real vectors, and writes the larger of the two in the corresponding place in the Z integer vector.

Syntax:
EXEC VARMAX

| 15 11 | 10 0 |
|---|---|
| 10000 | 100 0110 0110 |

Operation:
{
    aligned_real X,Y,Z ;

for (n=0; n < LENG; n++)
    {
       Z[n].low = max (X[n].low, Y[n].low);
       Z[n].high = max (X[n].high, Y[n].high);
    }
}

VRFMIN - Vector Real Find Minimum

The VRFMIN instruction scans the X real vector and returns the address of the element with the smallest value. The resulting address is placed in Z[0].

Syntax:
EXEC VRFMIN

| 15 11 | 10 0 |
|---|---|
| 10000 | 100 0110 1101 |

Operation:

PATENT

-57-

```
    {
        real X ;
        integer Z ;
        real tempX ;
5       integer tempA ;

tempX = X[0] ;
        tempA = &X[0] ;

for (n=1; n < LENG; n++)
        {
10         if (X[n] < tempX)
           {
               tempX = X[n] ;
               tempA = &X[n] ;
           }
15      }
        Z[0] = tempA ;
    }
```

Notes:

The LENG parameter for this operation must be greater than 1.

VRFMAX - Vector Real Find Maximum

The VRFMAX instruction scans the X real vector and returns the address of the element with maximum value. The resulting address is placed in Z[0].

Syntax:

EXEC VRFMAX

| 15    11 | 10              0 |
|----------|-------------------|
| 10000    | 100 0010 0100     |

Operation:

```
    {
        real X ;
        integer Z ;
        real tempX ;
        integer tempA ;

35      tempX = X[0] ;
        tempA = &X[0] ;

for (n=1; n < LENG; n++)
        {
           if (X[n] > tempX)
40         {
               tempX = X[n] ;
               tempA = &X[n] ;
           }
        }
```

PATENT
-58-

```
        Z[0] = tempA ;
    }
```

Notes:

The LENG parameter for this operation must be greater than 1.

5     EFMAX - Extended Find Maximum

The EFMAX instruction implements a single iteration of maximum search loop. The extended value in the accumulator is compared with the first element of the extended Z vector. The larger value is stored back into the Z vecort. In case the larger value was the accumulator, then is stored in the second location of the Z-vector (as an integer).

10     Syntax:

EXEC EFMAX

| 15    11 | 10              0 |
|---|---|
| 10000 | 101 0100 1011 |

15     Operation:

```
    {
        integer Y, Z[1] ;
        extended temp, Z[0] ;
20      real X ;
        real_acc A ;

A = (real_acc) ( (extended) A ) ;

temp = Z[0] ;

if (A > temp)
25      {
            temp = (extended) A ;
            Z[1] = &X[0] ;
        }
        Z[0] = temp ;
30  }
```

Notes:

The Y vector must hold the following values: Y[0] must be 0x7fff, Y[1] must be 0x0001, and Y[2] must be 0x4000.

SPECIAL INSTRUCTIONS

35     ESHL - Extended Shift Left

PATENT
-59-

The ESHL instruction performs a shift-left operation on extended-precision data in the accumulator, and stores the more significant half of the result as a real value into the first element of the real Z vector.

Syntax:

EXEC ESHL

| 15    11 | 10             0 |
|----------|------------------|
| 10000    | 101 0110 0100    |

Operation:
```
{
    real_acc A ;

A = (real_acc) ( (extended) A ) ;
    if (LENG > 1) for (n=1; n < LENG; n++)
    {
        A = A + A ;
    }
    Z[0] = (real) A ;
}
```

Notes:

When LENG equals 1, only the real part of the accumulator is updated. When LENG is greater than 1, both the real and the imaginary parts of the accumulator are upda. ! to the same value.

VCPOLY - Vector Complex Polynomial

The VCPOLY instructions performs one iteration of evaluating a polynomial with real coefficients, for a vector of complex-valued arguments, including down-scaling of the coefficients to avoid overflow. In addition, the instruction accumulates the scaled-down energy, with a decay factor, of the polynomial's real coefficients.

Syntax:

EXEC VCPOLY

| 15    11 | 10             0 |
|----------|------------------|
| 10000    | 101 0001 1000    |

Operation:
```
{
    complex X,Z ;
    real Y ;
    complex temp ;

temp.re = (real) Y[0] * X[0].re ;
    temp.im = 0 ;
```

PATENT
-60-

```
        for (n=0; n < LENG; n++)
        {
            Z[n] = (complex) Z[n] * X[n+1] + temp ;
        }
        Z[LENG].re = (real) (Z[LENG].re * X[LENG+1].re + Y[0] * temp.re) ;

Y.ADDR = &Y[1] ;
    }
```

Notes:

The LENG parameter for this operation must be greater than 1.

VDECIDE - Vector Nearest Neighbor Decision Logic

The VDECIDE instruction is used to implement nearest neighbor decision in Quadrature Amplitude Modulation (QAM) modem applications. The input is the X complex vector. The output is placed in the Z integer vector, which can be used as an index vector to extract information from lookup tables. The indicated constant values are taken from the Y vector.

Syntax:

EXEC VDECIDE

| 15    11 | 10             0 |
|----------|------------------|
| 10000    | 100 1111 0000    |

Operation:

```
    {
        complex X ;
        aligned_real Y ;
        real Z ;
        complex temp ;

for (n=0; n < LENG; n++)
        {
            temp.re = min (X[n].re, Y[0].low) :
            temp.im = min (X[n].im, Y[0].high) :
            temp.re = max (temp.re, Y[1].low) :
            temp.im = max (temp.im, Y[1].high) :

X[n] = temp ;

Z[n] = (real) ((temp.re * Y[2].low) & (extended) Y[3].low) |
                   ((temp.im * Y[2].high) & (extended) Y[3].high) ;
        }
    }
```

Notes:

The Y.INCR must be specified as 1, and Y.WRAP must be specified as 3.

PATENT

-61-

VDIST - Vector Euclidean Distance

The VDIST instruction calculates the square of the Euclidean distance between corresponding elements of the X and Y complex vectors, and places the result in the Z real vector.

Syntax:

5         EXEC VDIST

| 15      11 | 10           0 |
|------------|----------------|
| 10000      | 100 1111 1110  |

10   Operation:

```
{
        complex X,Y ;
        real Z ;

for (n=0; n < LENG; n++)
15      {
            Z[n] = (real) (X[n].re - Y[n].re) ** 2 +
                        (X[n].im - Y[in].im) ** 2 ;
        }
}
```

20         VFFT - Vector Fast Fourier Transform

The VFFT instruction implements one pass of in-place FFT vector update, according to the radix-2 FFT method.

Syntax:

EXEC VFFT

25

| 15      11 | 10           0 |
|------------|----------------|
| 10000      | 101 0000 0110  |

Operation:

```
30  {
        complex X,Y,Z ;
        complex temp ;

for (n=0; n < LENG; n++)
        {
35         temp = (complex) (Z[n] + X[n] * Y[n]) ;
           Y[n] = (complex) (Z[n] - Z[n] * Y[n]) ;
           Z[n] = temp ;
        }
    }
```

40     ~~VESHR - Vector Extended Single-Pole IIR~~

VESIIR—Vector Extended Single Pole IIR

The VESIIR instruction performs a special form of an Infinite-Inpules Response (IIR) filter. The samples and coefficient are given as real values, as well as the output result. However, the accumulation is performed using extended-precision arithmetic.

EXEC VESIIR

| 15 11 | 10 0 |
|---|---|
| 10000 | 101 0011 0111 |

Operation:
{
    real X,Y,Z;
    real_acc A;
    for (n=0; n < LENG; n++)
    {
        A = (real_acc) ( (extended) A );
        A = ( (real_acc) (A * X[n]) ) + Y[n+2];
        Z[n] = (real) A;
    }
}
Notes:
The term (A * X[n]) is a 32bit by 16bit multiplication.During the conversion of this product to a real_accumulator data type, rounding is done if PARAM.RND is '1'. During the converison of A to a real data type, the result is rounded if Y[0]=0x0080, or truncated if Y[0]=0x0. The result with other values of Y[0] are unpredictable. Y[1] must be specified as 0x7fff.

F. CPU Core Interface

The interface between the DSPM 12 and the CPU core 14 consists of the following elements:
    Parallel operation synchronization
    CPU core address space map
    External memory references
    Synchronization of Parallel Operation Since the DSPM 12 is capable of autonomous operation parallel to the operation of the CPU core 14, a mechanism is needed to synchronize the two threads of execution. The parallel synchronization mechanism consists of several control and status registers, which are used to synchronize the following activities:
    Initiation of the command list execution
    Termination of the command list execution
    Check of the DSPM status
    Access to DSPM internal RAM 28 and registers by CPU core instructions
    Access to external memory by DSPM commands The following CPU core interface control and status registers listed in Table VI, are available:

TABLE VI

| Register | Function |
|---|---|
| CLPTR | Command-list pointer |
| CLSTAT | Command-list status register |
| ABORT | Abort register |
| OVF | Overflow register |
| EXT | Disable external memory references |
| DSPINT | Interrupt register |
| DSPMASK | Mask register |
| NMISTAT | NMI status register |

Execution of the command list begins when the CPU core 14 writes a value into the CLPTR control register. This causes the DSPM command-list execution unit to begin executing commands, starting at the address written to the CLPTR register. If the written value is outside the range of valid RAM addresses, then the result is unpredictable.

Once started, execution of the command list continues until one of the following occurs: a HALT command is executed, the CPU core 14 writes any value into the ABORT control register, an attempt to execute a reserved command, an attempt to access the DSPM address space while the CLSTAT.RUN bit is "1" (except for accesses to the CLSTAT, EXT, DSPINT, DSPMASK, NMISTAT, and ABORT registers), or reset occurs. In the last case, the contents of the DSPM internal RAM, REPEAT, and CLPTR registers are unpredictable when execution terminates.

The CLSTAT status register can be read by CPU core instructions to check whether execution of the DSPM command list is active or idle. A "0" value read from the CLSTAT.RUN bit indicates that execution is idle and a "1" value indicates that it is active.

Whenever the execution of the command list terminates, CLSTAT.RUN changes its value from "1" to "0", and DSPINT.HALT is set to "1". The value of the DSPINT.HALT status bit can be used to generate interrupts.

The DSPM internal RAM 28 and the dedicated registers, as well as the interface control and status registers, are mapped into certain areas of the CPU core address space, as described below. Whenever execution of the DSPM command list is idle, CPU core instructions may access these memory areas for any purpose, exactly as they would access external off-chip memory locations. However, when the DSPM command list execution unit is active, any attempt to read or write a location within the above memory areas, except for accessing the CLSTAT, EXT, DSPMASK, DSPINT, NMISTAT, or ABORT control registers, described below, will be ignored by the DSPM 12. All read data will have unpredictable values and any attempt to write data will not change the DSPM RAM 28 and registers. Whenever such an access occurs, NMISTAT.ERR bit is set to "1", an NMI request to the core is issued, and the command list execution terminates. In this case, as the command-list execution terminates asyncronously, the currently executed command may be aborted. The DSPM RAM 28 and the A, X, Y, Z, and REPEAT registers may hold temporary values created in this aborted instruction.

Some of the vector instructions executable by the DSPM 12 can access external off-chip memory to transfer data in or out of the internal RAM 28, or to reference large lookup tables. Normally, external memory references initiated by the DSPM 12 and CPU core 14 are interleaved by the CPU core bus-arbitration logic. As a result, it is the user's responsibility, to make sure that whenever a write operation is involved, the DSPM 12 and CPU core 14 should not reference the same external memory locations, since the order of these transactions is unpredictable.

In order to ensure fast response for time-critical interrupt requests, the DSPM external referencing mechanism will relinquish the core bus for one clock cycle after each memory transaction. This allows the core 14 to use the bus for one memory transaction. To further enhance the core speed on critical interrupt routines, the EXT.HOLD control Bag is provided.

Whenever the core sets EXT.HOLD to "1", the DSPM 2 stops its external memory references. When the DSPM 12 needs to perform an external memory reference but is disabled, it is placed in a HOLD state until a value of "0", is written to the EXT.HOLD control register.

DSPM Address Space Map and Memory Organization

DSPM internal RAM locations are mapped to 32-bit words. The mapping of these locations to CPU core address space is shown below, where base corresponds to the start of the mapped area (address 0xFFFE0000):

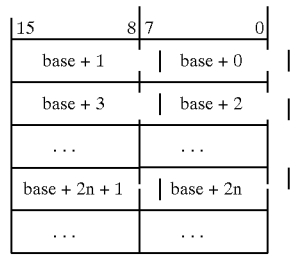

As stated above, the RAM array 28 is not restricted to use by the DSPM 12, but can also be used by the CPU core 14 as a fast, zero wait-state, on-chip memory for instructions and data storage. The CPU core 14 can access the RAM 28 with byte, word, and double-word access types, on any byte boundary.

DSPM dedicated registers are mapped to memory locations as shown in the following Table VII:

TABLE VII

| Register | Size | Address | Access Type |
| --- | --- | --- | --- |
| PARAM | double-word | 0xFFFF8000 | Read/Write |
| OVF | word | 0XFFFF8004 | Read/Only |
| X | double-word | 0xFFFF8008 | Read/Write |
| Y | double-word | 0XFFFF800C | Read/Write |
| Z | double-word | 0xFFFF8010 | Read/Write |
| A | double-word | 0XFFFF8014 | Read/Write |
| REPEAT | double-word | 0XFFFF8018 | Read/Write |
| CLPTR | word | 0xFFFF8020 | Read/Write |
| EABR | double-word | 0xFFFF8024 | Read/Write |

CPU core interface control and status registers are mapped to memory locations as shown in the following Table VIII:

TABLE VIII

| Register | Size | Address | Access Type |
| --- | --- | --- | --- |
| CLSTAT | word | 0xFFFF9000 | Read Only |
| ABORT | word | 0xFFFF9004 | Write Only |
| DSPINT | word | 0xFFFF9008 | Read Only |
| DSPMASK | word | 0xFFFF900C | Read/Write |
| EXT | word | 0xFFFF9010 | Read/Write |
| NMISTAT | word | 0xFFFF9014 | Read Only |

Read and write operations by CPU core instructions to the DSPM registers must be done using operands of the same size as the registers' size.

G. Decision Algorithm

As stated above, the DSPM 12 implements a decision algorithm for a QAM/TCM software modem using "vector-deciote" and "vector-distance" vector DSP instructions.

The decision algorithm itself is a step within another algorithm which implements a QAM modem receiver entirely in software. The modem algorithm includes several other steps before and after the decision algorithm step that prepare input for it and use its output.

The modem algorithm, of which the decision algorithm is a part, is implemented as a subroutine that is called periodically at the appropriate baud rate. In this way, each activation of the modem routine corresponds to a single data symbol. On each activation, the modem routine obtains several digitized samples of the analog signal being carried by the phone line and performs filtering, demodulation, equalization and decoding operations according to the relevant protocol in order to extract the corresponding data bits that were sent. The decision algorithm is part of that decoding operations.

In a QAM modem, the data bits (after encoding in some protocols) are separated into groups called symbols. Each symbol is represented by a point in the complex plane out of a set of points called the constellation points. In the appropriate part of the modem receiver, the decision algorithm will get a complex point as an input and will decide which of the constellation points is the one that corresponds to it. This decided point will be the output.

In a Trellis Coded Modulation (TCM) modem the problem is more complicated. The constellation points are divided into subsets. As part of the TCM receiver, the decision algorithm should make a separate decision for every subset; that is, for each subset the corresponding constellation point will be found and the output will be a set of decided points corresponding to the subsets. Typically, the number of constellation points in TCM constellations is greater then that of non-TCM QAM modems.

One conventional way to reach the decision is to divide the plane into a grid of small squares. In each square, the decision will be the constellation point that most of the square is closest to. Then the decision can be made by entering a decision table with the input point and coming out with the decided point. The problem is that for constellations like V.29, the decision is not optimal, meaning there are points on the plane for which one will make the wrong decision. It will happen in every square that one part of it is closer to one constellation point and another part is closer to another constellation point. In order to make these error zones smaller, one would have to use big decision tables that consume large memory space.

Another way to reach the decision is to look at the input complex point as a vector from the origin to the point in the complex plane, then calculate which of the constellation points is the decided one according to its phase and length relative to some boundaries. The problem with this approach is that for constellations like V.29, one will have the same problem of error zones.

The constellation points of TCM modems are typically on a cortesic grid. Therefore, the table decision algorithm described above is usually used. However, the table needed is very big and the fact that for each point there are several decisions to be made causes each entry of the table to contain several decided points. It is obvious that this method will require a lot of memory. One can use several smaller tables for each of the subsets, but still the memory consumption will be large.

Using the DSPM 12, better algorithms have been developed for the decision problem. The strength of the DSPM 12, its special vector instructions and its parallizm to the core, enable implementation of more optimal solutions for the decision algorithms.

1. Non TCM

For the non-TCM constellations, e.g. V./27—4800, 2400, v.29–9600, 7200, where the number of the constellation points is relatively small, the DSPM 12 calculates the square euclidian distance from the input point to all the constellation points and determines the minimal one. This is the optimal decision, but usually is considered to hard to implement. The DSPM powerful vector instructions enable it to be done.

Figure 23:
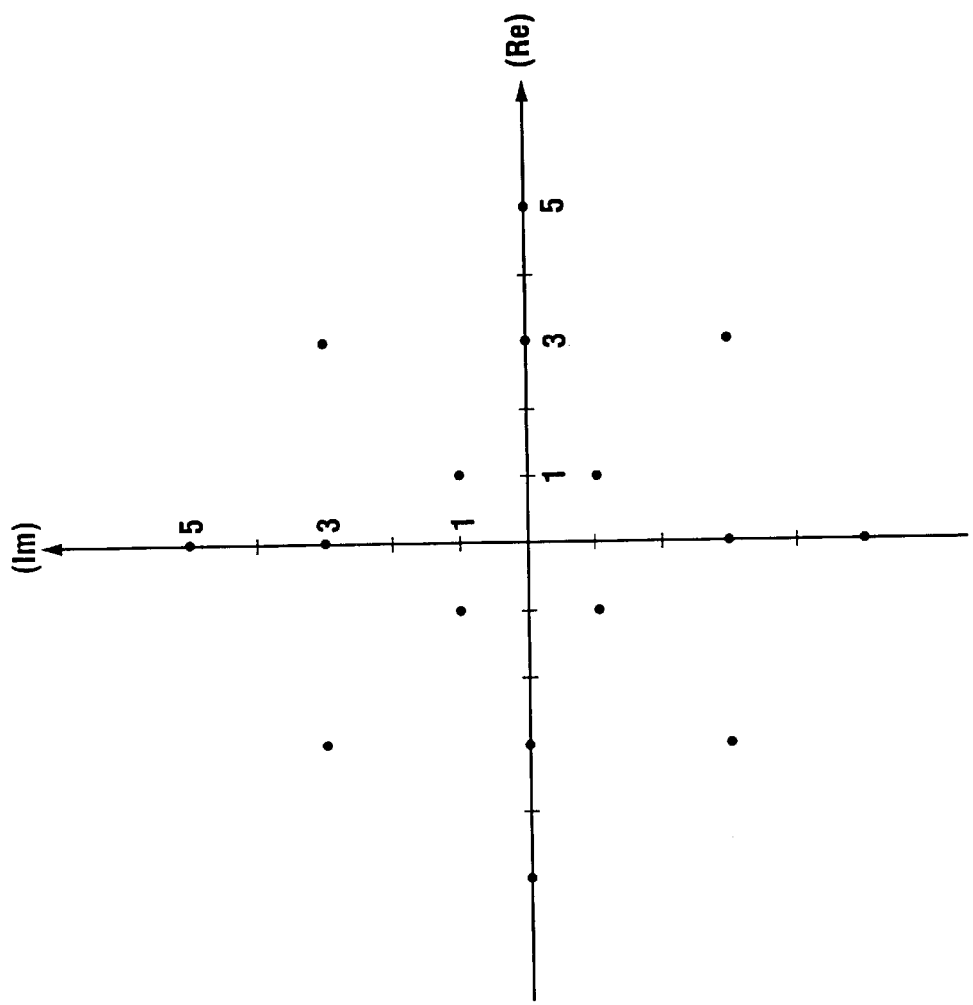
FIG. 23 is a constellation points diagram for a V.29 modem operating at 9600 bps.

The implementation for V.29—9600 bps is illustrated in the following example. Its constellation points diagram is given in FIG. 23.

Inputs

The input point—1 complex number

Table of constellation points 16 complex numbers

Output

Decided constellation point—1 complex number

Calculating the distances between the input point and all the constellation points will be done with ONE vector command—VDIST X pointer—table of constellation points, incr=2

Y pointer—input point, wrap=1

Z pointer×distances to 16 constellation points, incr=1

PARAMETERS–LENG=16

VDIST

Finding the minimal distance will be done with ONE vector command—VRFMIN:

X pointer—distances to 16 constellation points, incr=1

Z pointer—minimal distance pointer

PARAMETERS–leng=16

VRFMIN

Getting the decided point will be done in two steps. First, calculating the offset of the decided point in the constellation points table using the VROP command:

X pointer—minimal distance pointer

Y pointer—address of the vector distances to 16 constellation points

Z pointer—offset of the decided point in the constellation points table

PARAMETERS–leng=1·op=SUB

VROP

Second, getting the decided point from the table using the VRGATH command.

X pointer—table of constellation points

Y pointer—offset of the decided point in the constellation points table

Z pointer—decided point (the outtut1)

PARAMETERS–leng=2

2. TCM

Figure 24A:
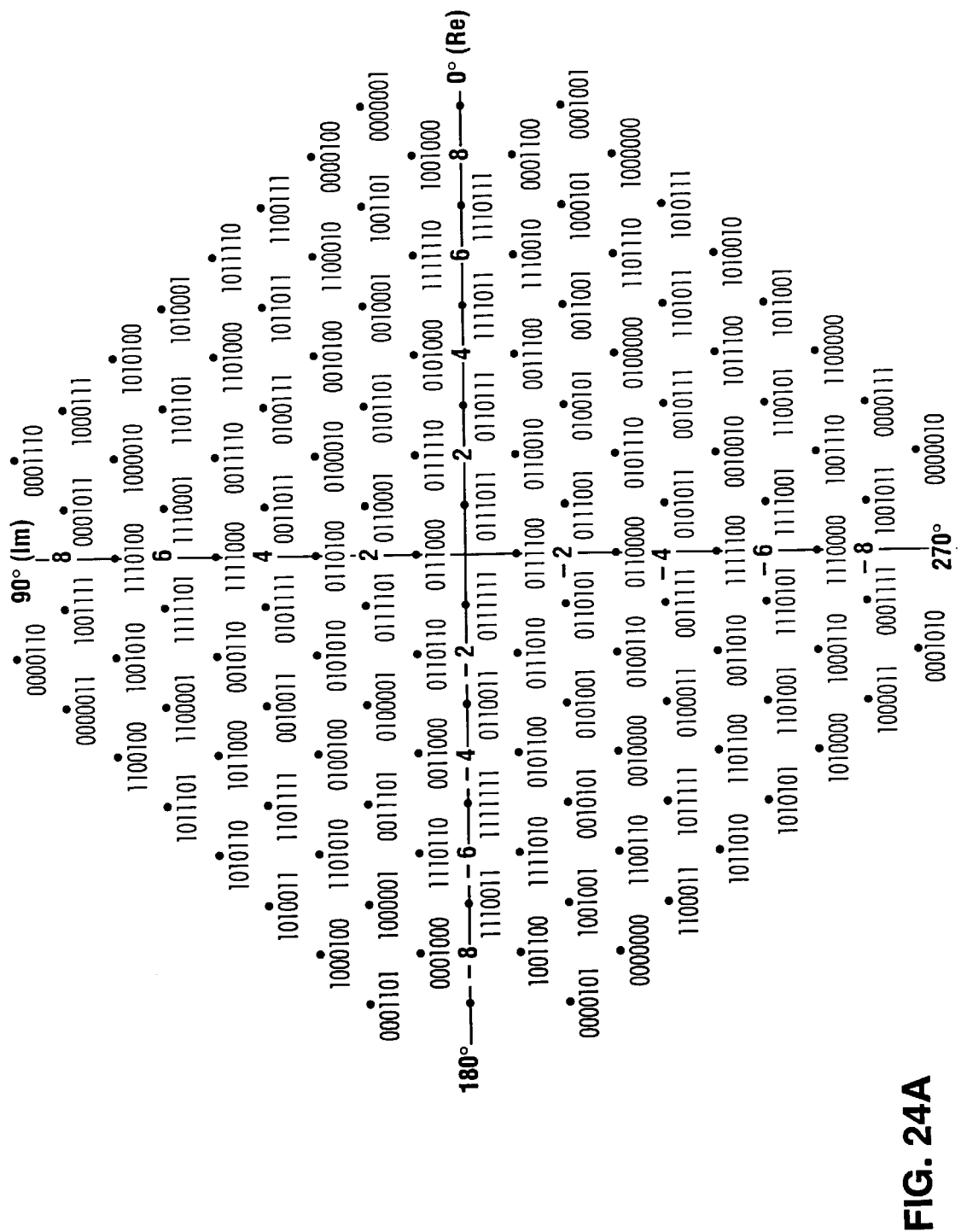
FIG. 24A is a constellation points diagram for a V.17 modem operating at 14400 bps.
Figure 24B:
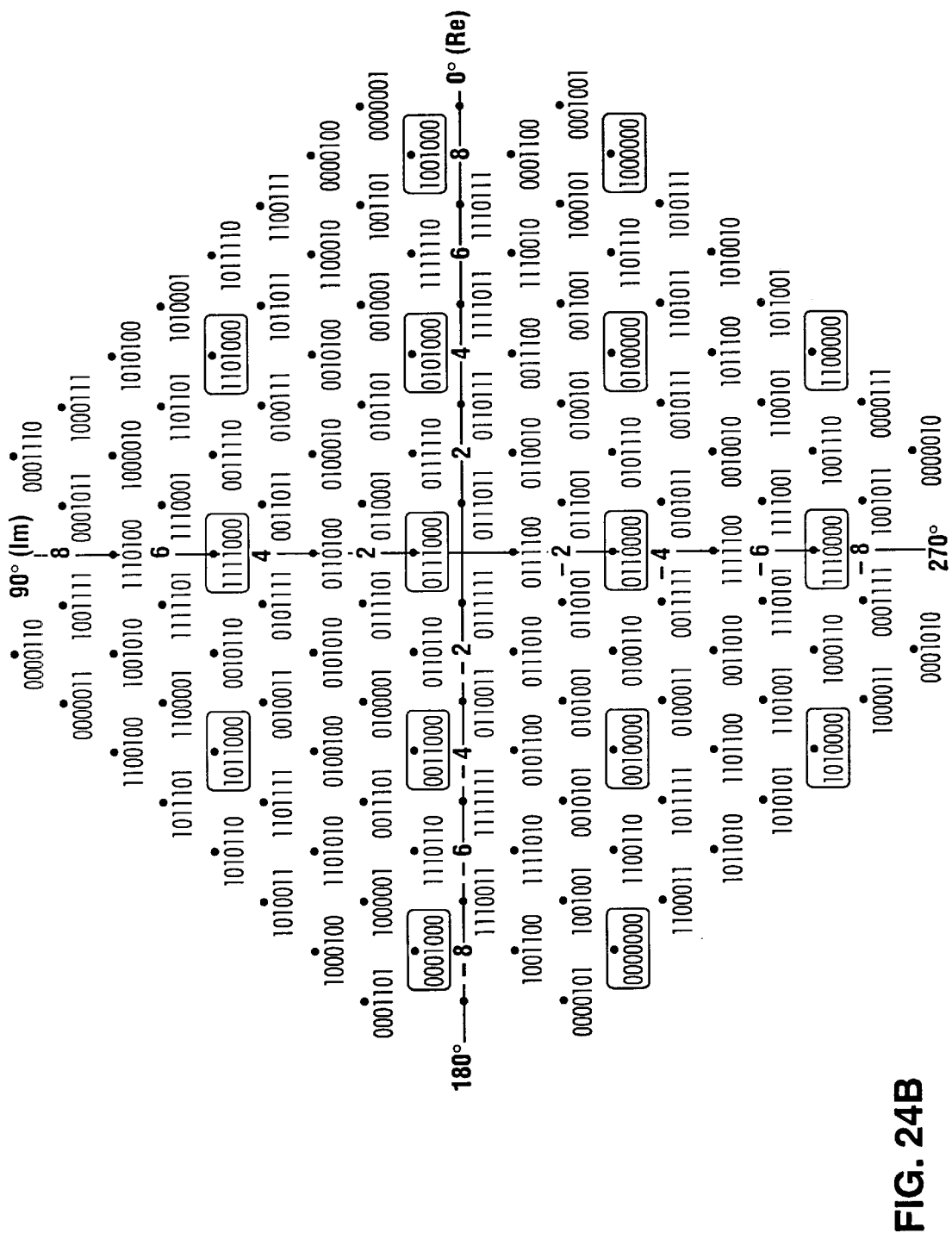
FIG. 24B is a constellation points diagram illustrating subset Na 000 of a V.17 14400 bps modem constellation.
Figure 24C:
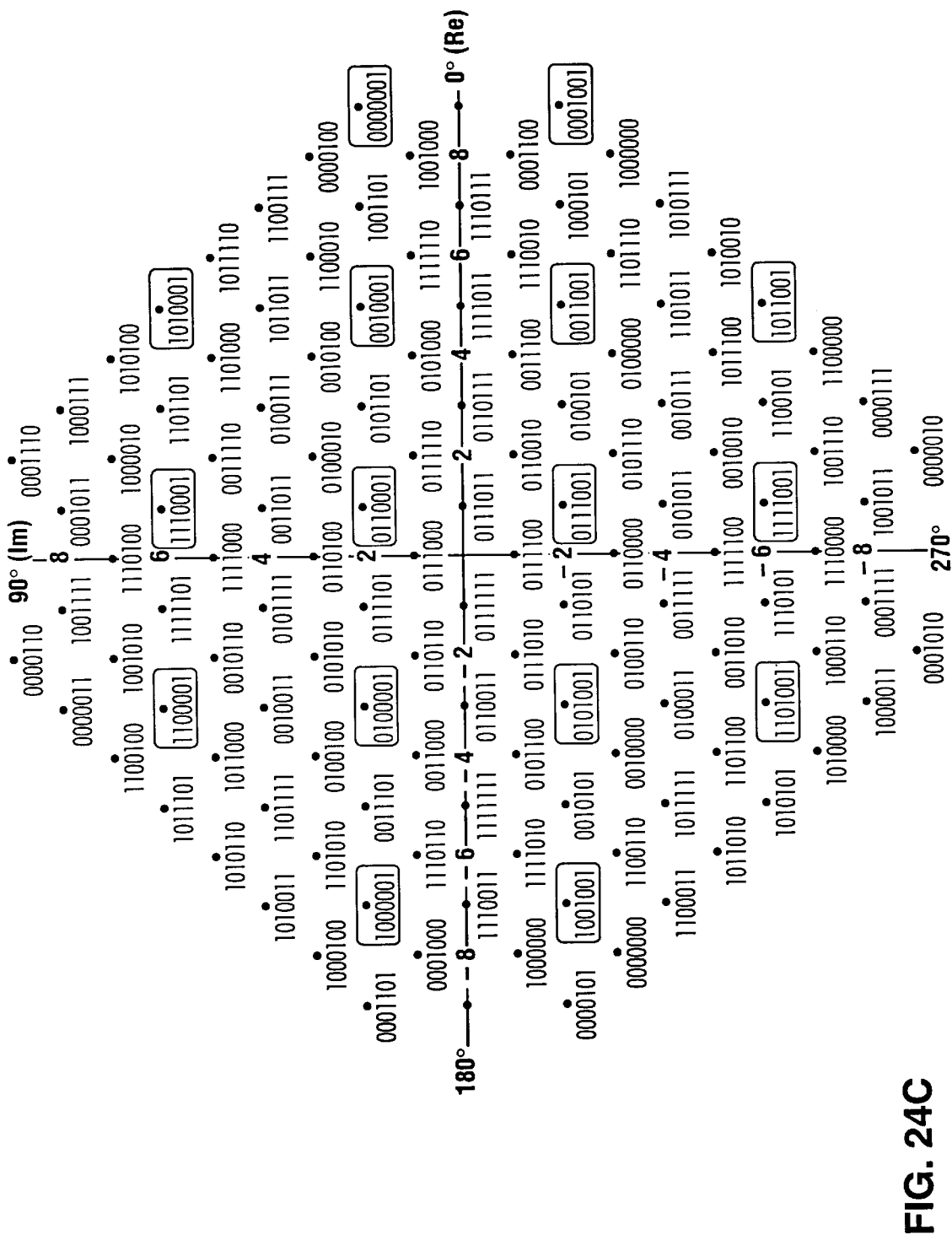
FIG. 24C is a constellation points diagram illustrating subset Na 001 of a V.17—14400 bps modem constellation.
Figure 24D:
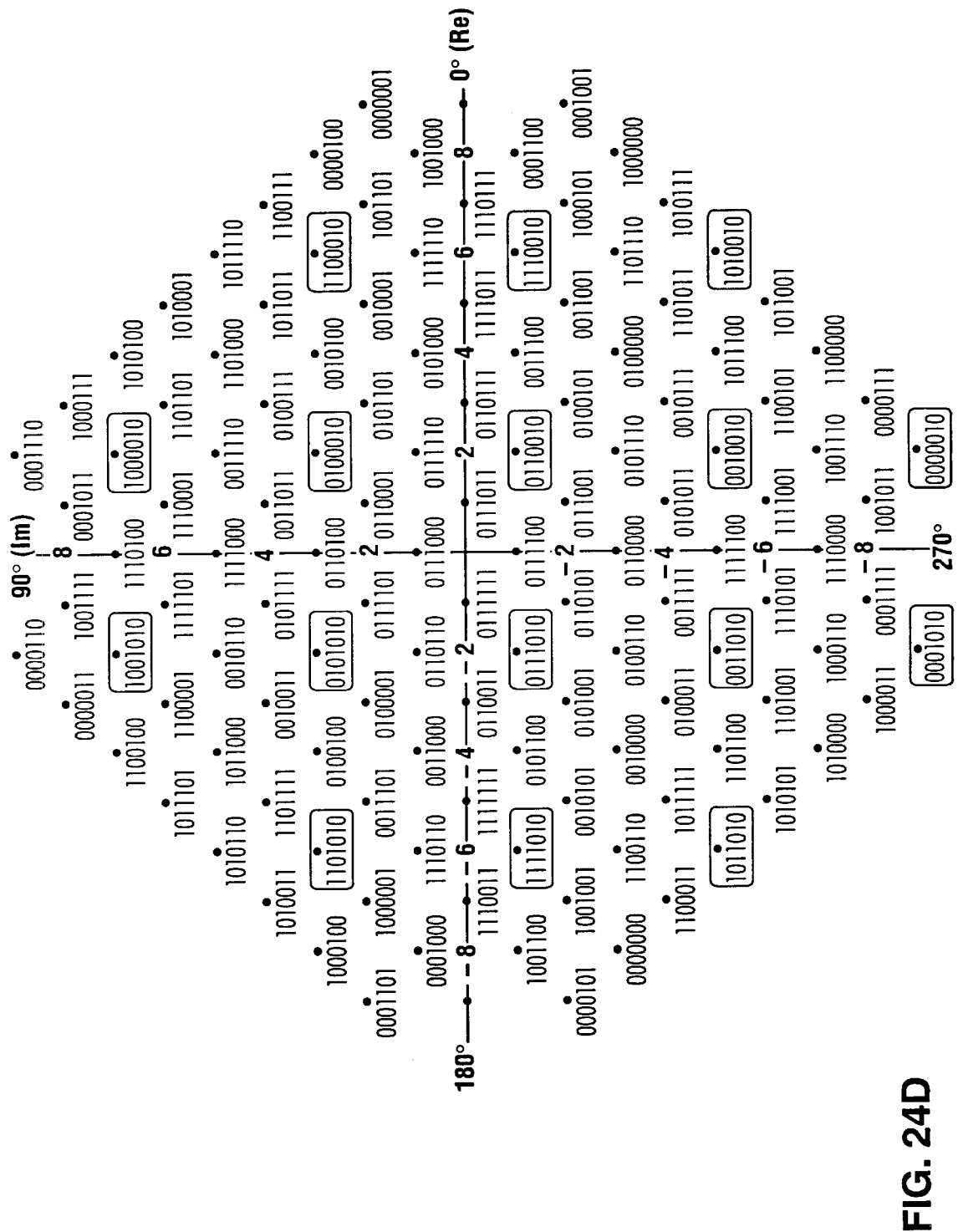
FIG. 24D is a constellation points diagram illustrating subset Na 010 of a V.17—14400 bps modem constellation.
Figure 24E:
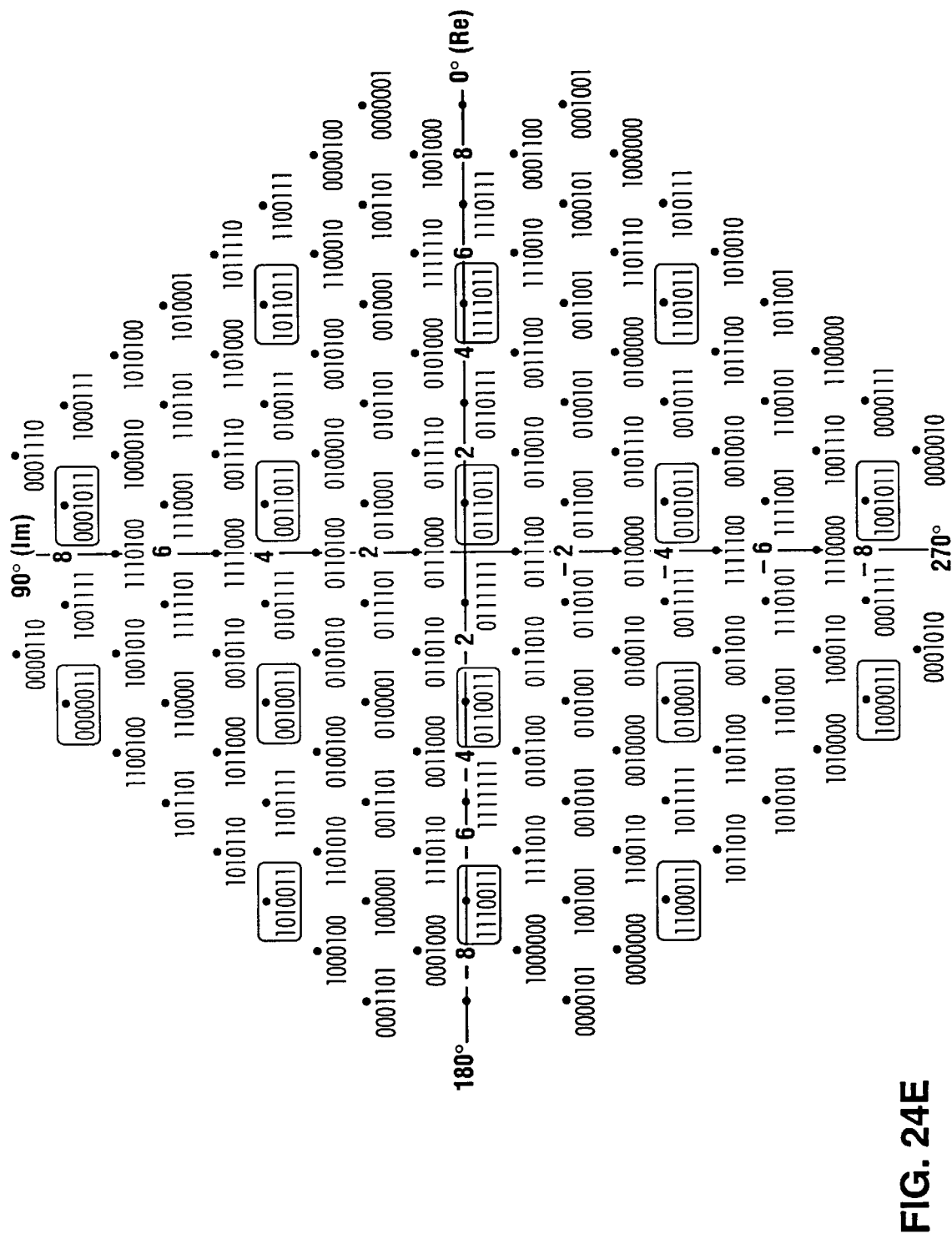
FIG. 24E is a constellation points diagram illustrating subset Na 011 of a V.17—14400 bps modem constellation.
Figure 24F:
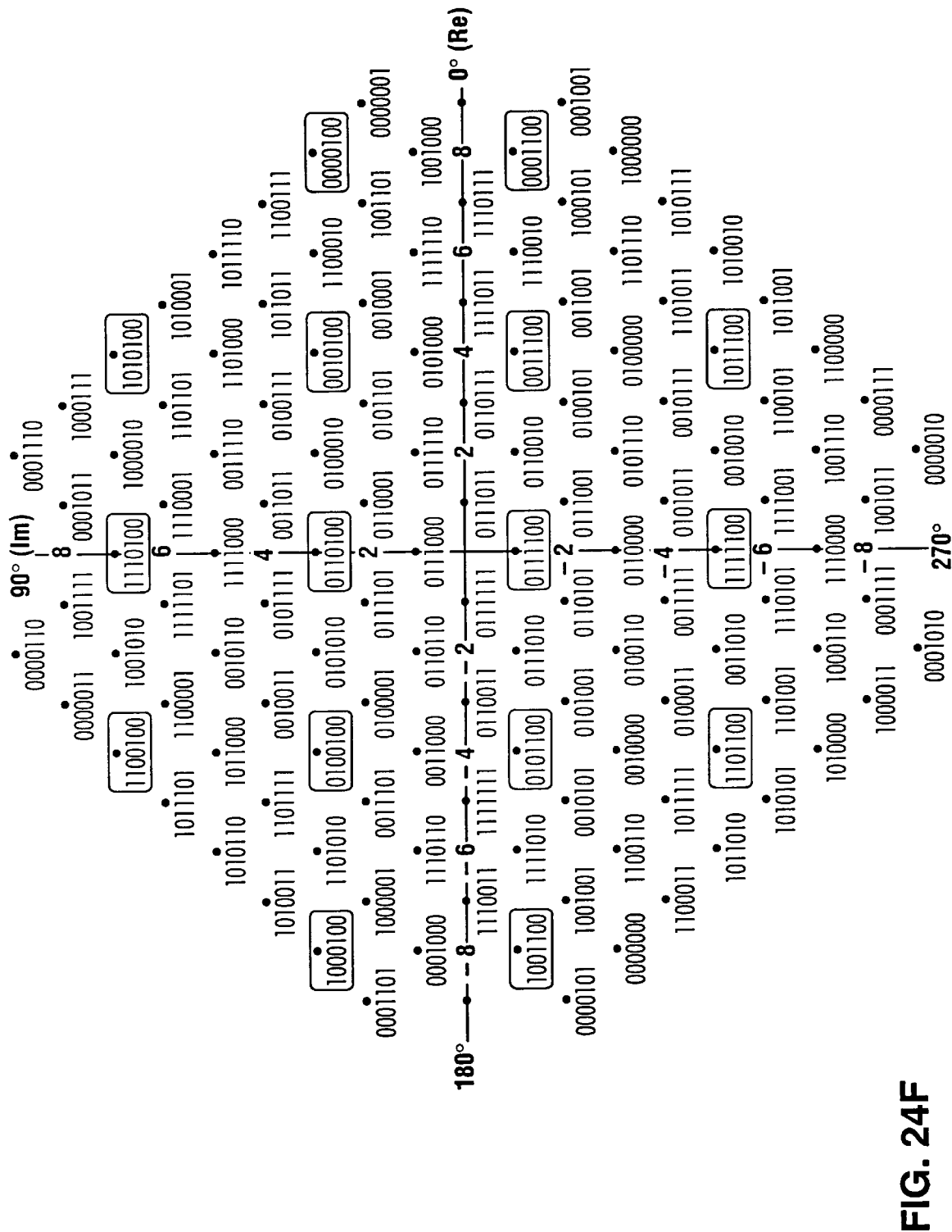
FIG. 24F is a constellation points diagram illustrating subset Na 100 of a V.17—14400 bps modem constellation.
Figure 24G:
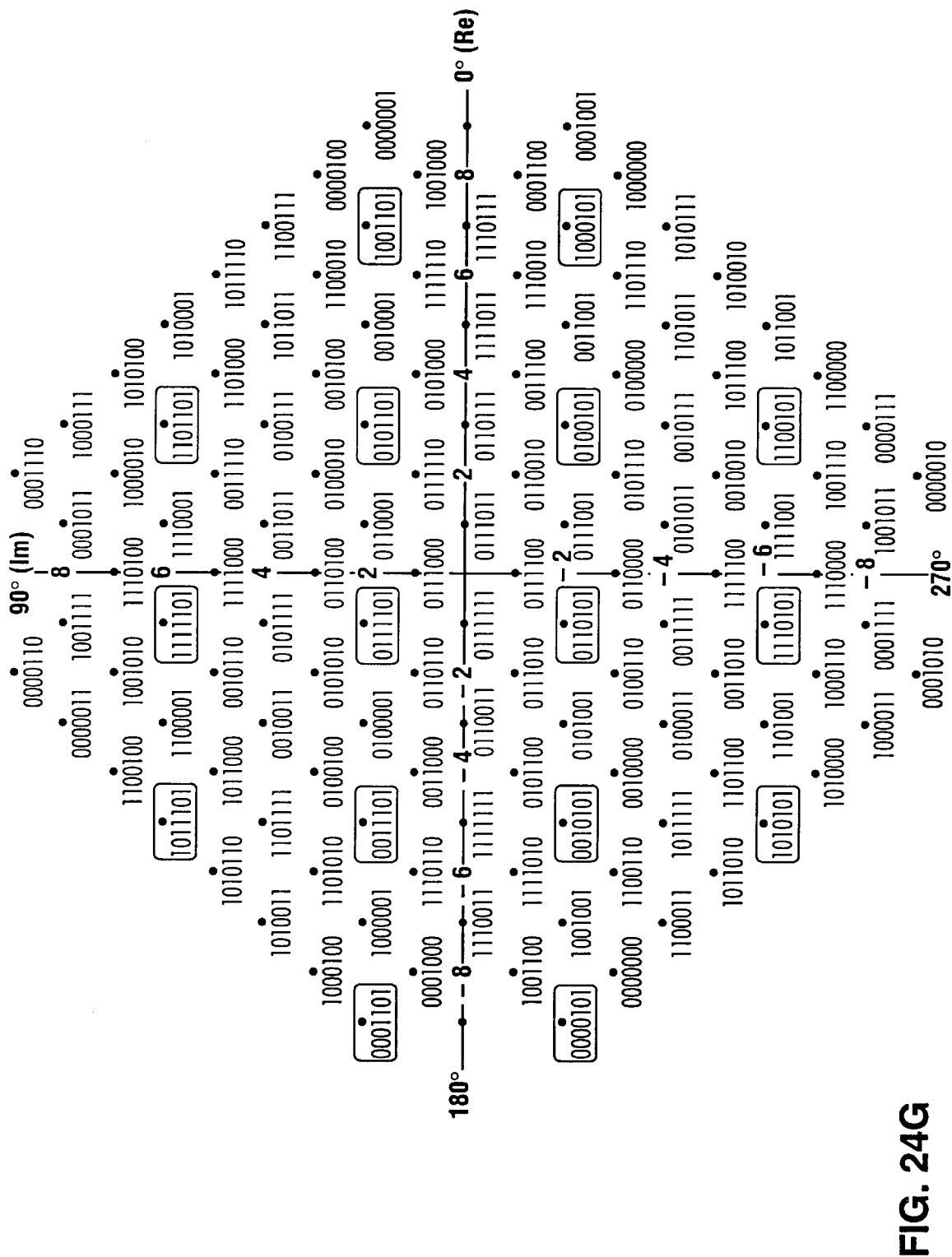
FIG. 24G is a constellation points diagram illustrating subset Na 101 of a V.17—14400 bps modem constellation.
Figure 24H:
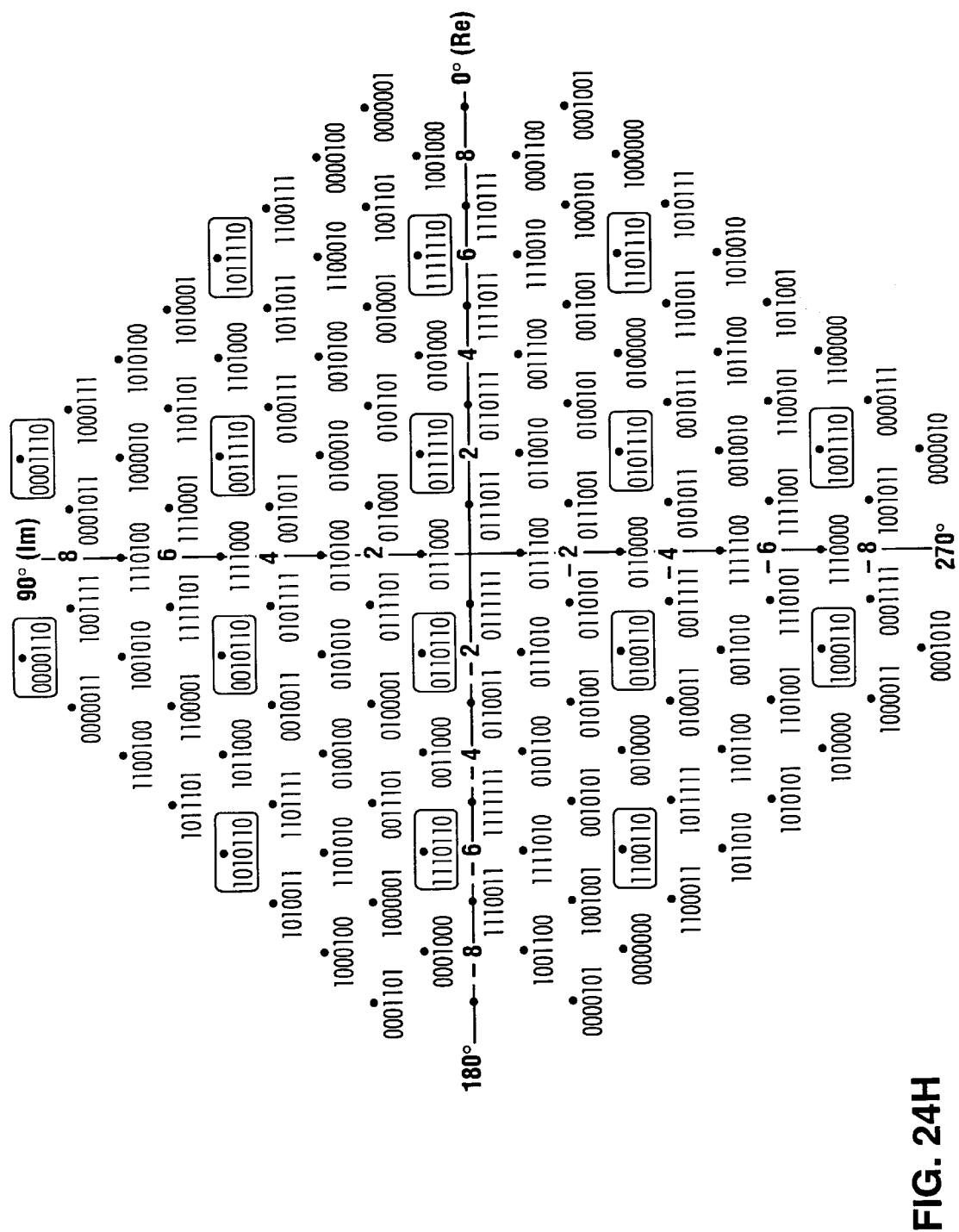
FIG. 24H is a constellation points diagram illustrating subset Na 110 of a V.17-14400 bps modem constellation.
Figure 24I:
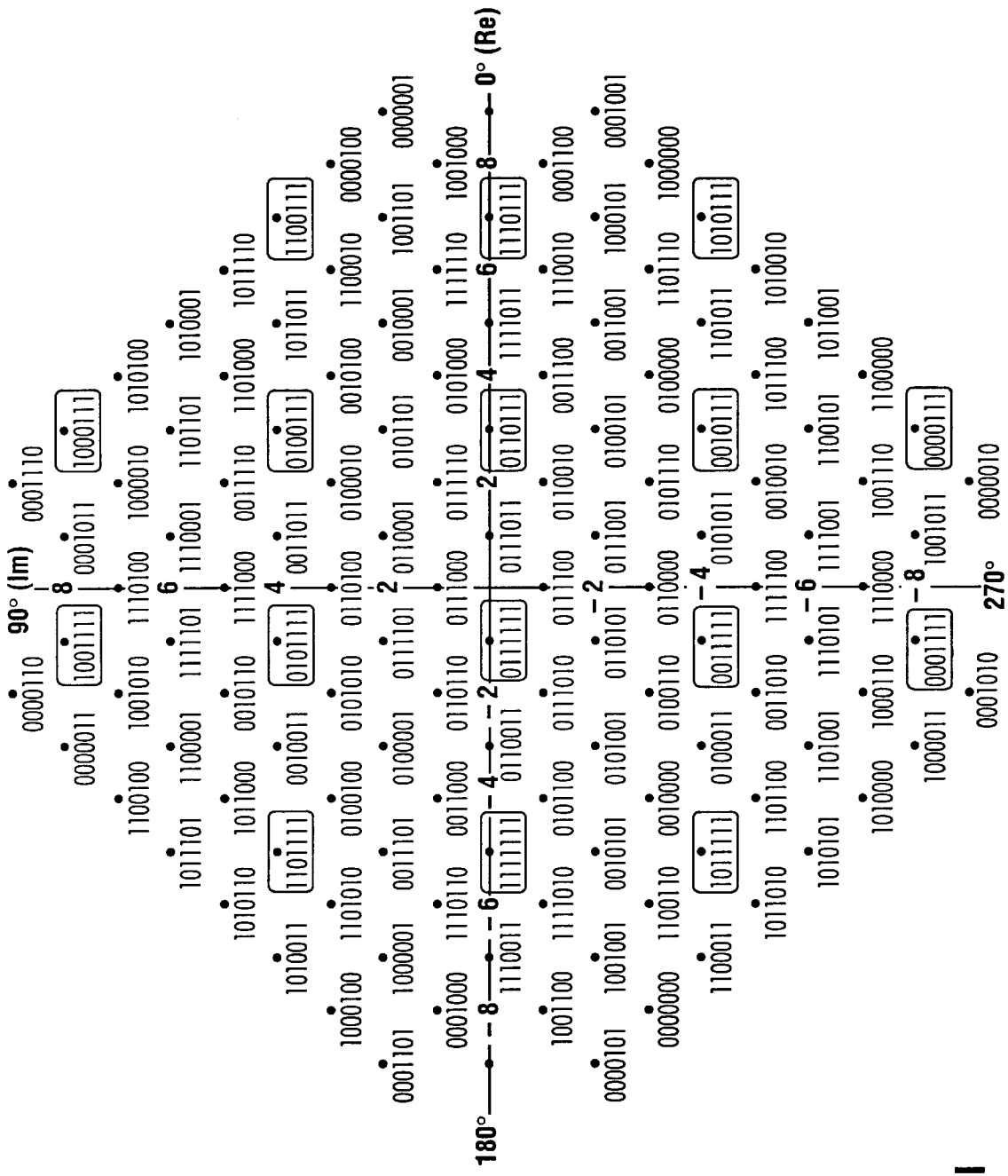
FIG. 24I is a constellation points diagram illustrating subset Na 111 of a V.17-14400 bps modem constellation.

In the proposed decision algorithm for TCM modems, the fact that the subsets have similar shapes is exploited. Actually, the subsets have identical shapes, but only translated and rotated. For example, the subset in FIG. 24B should be translated by (+1, −1) and rotated by +90 deg in order to overlap the subset in FIG. 24E. Note that there are constellations like V.17—9600 which have two types of subsets, each one having the properties mentioned above.

Figure 25:
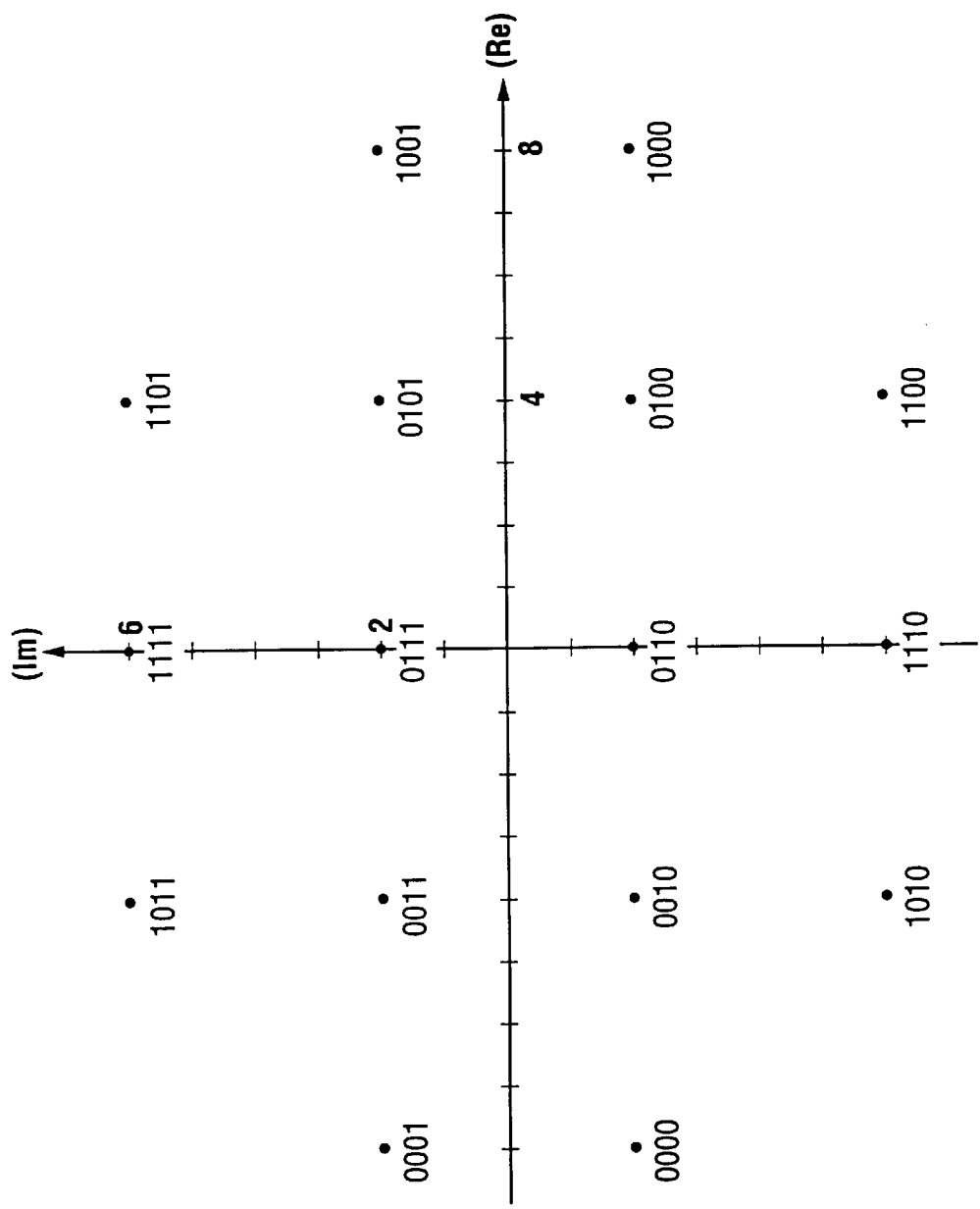
FIG. 25 is a constellation points diagram illustrating a general subset of a V.17-14400 bps modem constellation.
Figure 26:
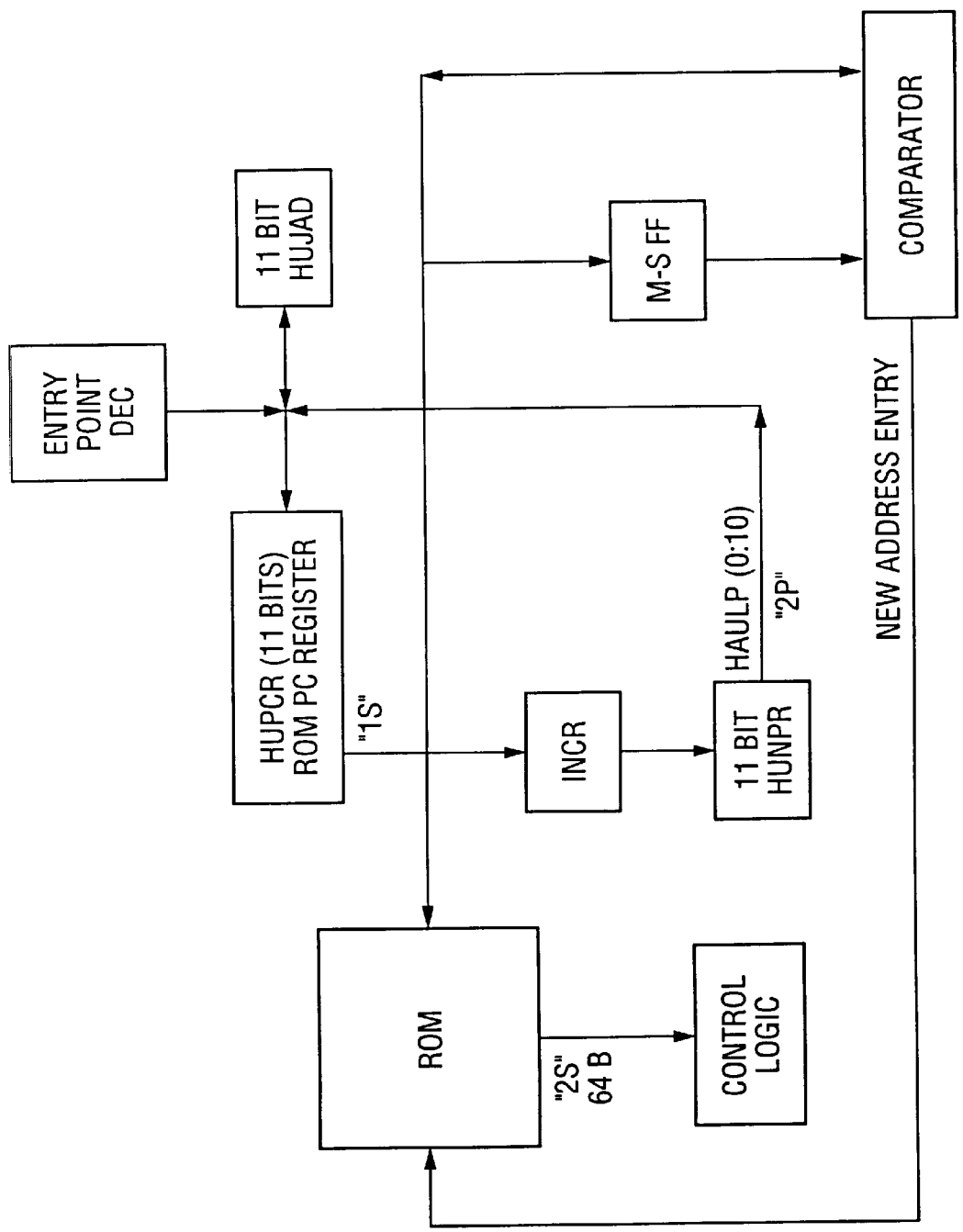
FIG. 26 is a block diagram illustrating microcode execution in the DSPM 12 of a system in accordance with the present invention.

Consider an example: V.17-14400. The constellation and subsets are shown in FIGS. 24A–24I. FIG. 25 shows a subset of that constellation that is centered at the origin and called: the general subset. For each of the subsets, there is a different translation (adding an offset) and rotation that will bring it to the general subset.

In order to make the decision for a specific subset, one should apply the same transformation to the input point; that is, add to the offset and rotate the rotation and use the general subset to make a decision using the one, small decision-table. The output would be a decided point that is one of the general subset points. This point will be translated to the final decision point for this subset by doing the inverse transformation that was done to the input point, i.e. back rotate the rotation and substract the offset.

The same can be done to all the subsets and so one would make the decision for all the subsets using one small decision table. This algorithm may seem slow and complicated, but using the DSPM 12, it becomes very simple to implement and also very fast.

The implementation for V.17—14400 bps will be shown as an example.

Inputs:
| | |
|---|---|
| The input point | 1 complex number |
| Table of general subset constellation points | 16 complex numbers |
| Table of translations for the deferent subsets | 8 complex numbers |
| Table of rotations for the deferent subsets | 8 complex numbers |

Output:
| | |
|---|---|
| Decided constellation points for all the subsets | 8 complex number |

In the modem, the output of the decision will be also the BITS that correlate to the decoded point. These bits come as natural byproduct of our decision algorithm so we will add to the inputs/outputs:

Inputs (cont):
| | |
|---|---|
| Table of the bits of the decisions | 32 real numbers |

Output (cont):
| | |
|---|---|
| Decided bits for all the subsets | 8 real numbers |

The input point is translated and rotated 8 times for the 8 deferent subsets. It will be done in 2 commands. VAROP - translation and VCMAD - rotation X pointer - input point, wrap = 1

Y pointer - table of transiations for the deferent subsets, incr = 2

Z pointer - temporary vector, incr = 2

PARAMETERS - leng = 8, op = ADD

VAROP

X pointer - temporary vector, incr = 2

Y pointer - table of rotations for th deferent subsets, incr = 2

Z pointer - temporary vector, incr = 2

PARAMETERS - leng = 8, CLR

VCMAD

For each of the 8 points a decision should be made on the same general subset. It will be done with the VDECIDE command that will give a 'pointer' for each point that will be used later.

X pointer - temporary vector, incr = 2

Y pointer - constants for the decision

Z pointer - decision indexes, incr = 1

PARAMETERS - LENG = 8

VDECIDE

Using those 'pointers' the bits that correspond to the decisions will be gathered.

X pointer - table of the bits of the decisions

Y pointer - decision indexes, incr = 1

Z pointer - decided bits, incr = 1

PARAMETERS - leng = 8

VRGATH

The decided bits are also the 'pointers' to the table of the general subset constellation points. Using the real and imaginary of the points will be gathered with 2 calls to the VRGATH command.

X pointer - table of general subset constellation points (real values)

Y pointer - decided bits, incr = 1

Z pointer - decided points, incr = 2

PARAMETERS - leng = 8

VRGATH

X pointer - table of general subset constellation points (imaginary values)

Y pointer - decided bits, incr = 1

Z pointer - decided points + 1, incr = 2

PARAMETERS - leng = 8

VRGATH

The decided points in the general subset have to be translated and rotated back for the deferent 8 subsets. It will be done in 2 commands. VAROP - translation back and VCMAD - back rotation. Note that in VAROP we use SUB and in VCMAD we use COJ.

X pointer - decided points, incr = 2

Y pointer - table of translations for the deferent subsets, incr = 2

Z pointer - decided points, incr = 2

PARAMETERS - leng = 8, op = SUB

VAROP

X pointer - decided points, incr = 2

Y pointer - table of rotations for the deferent subsets, incr = 2

Z pointer - decided points (the output!) incr = 2

PARAMETERS - leng = 8, COJ, CLR

VCMAD

H. Debug Features

The system 10 also includes debug features and a scheme for enabling breakpointing and execution resumption for the parallel DSPM 12 and CPU core 14.

Whenever either DSPINT.ILL or DSPINT.ERR are set to "1", an NMI occurs and the DSPM command-list execution is halted. This change helps define a debugger for the DSPM 12. On a debug session, when the user needs a break point, the debugger can replace the instruction in the location of the break point with an illegal instruction. When the DSPM 12 tries to execute this illegal instruction, the DSPINT.ILL is set and command-list execution is halted. The CPU core 14 then stops its execution and begins to handle the NMI. The debugger software can catch this NMI and test the DSPINT.ILL to check whether an illegal instruction caused this NMI.

DSPMASK.ILL and DSPMASK.ERR are eliminated and bits 1 and 2 of the DSPMASK register become reserved.

I. DSPM Mechanisms

The DSPM 12 provides a mechanism for a microsequencer for interpretation of the DSPM command-list and execution of vector instructions. It also provides a mechanism for implementing backward loops for vector instruction execution by marking a visited microinstruction entry.

The microcode definition for these mechanisms is provided as Appendix A to this detailed description of the invention; Appendix A is to be considered an integral part of this patent specification.

The DSPM 12 also provides a mechanism for addressing into a microcoded routine by using the entry point address as an op-code, thereby eliminating the need for an address decoder. It also provides a mechanism for protecting against invalid op-codes that are implemented as entry point addresses by a special "valid-entry" marking in each microcode line.

The DSPM 12 also provides a mechanism for implementing vector address pointer registers, including incrementation and wrap-around logic. These mechanisms will now be described in greater detail.

Figure 27:
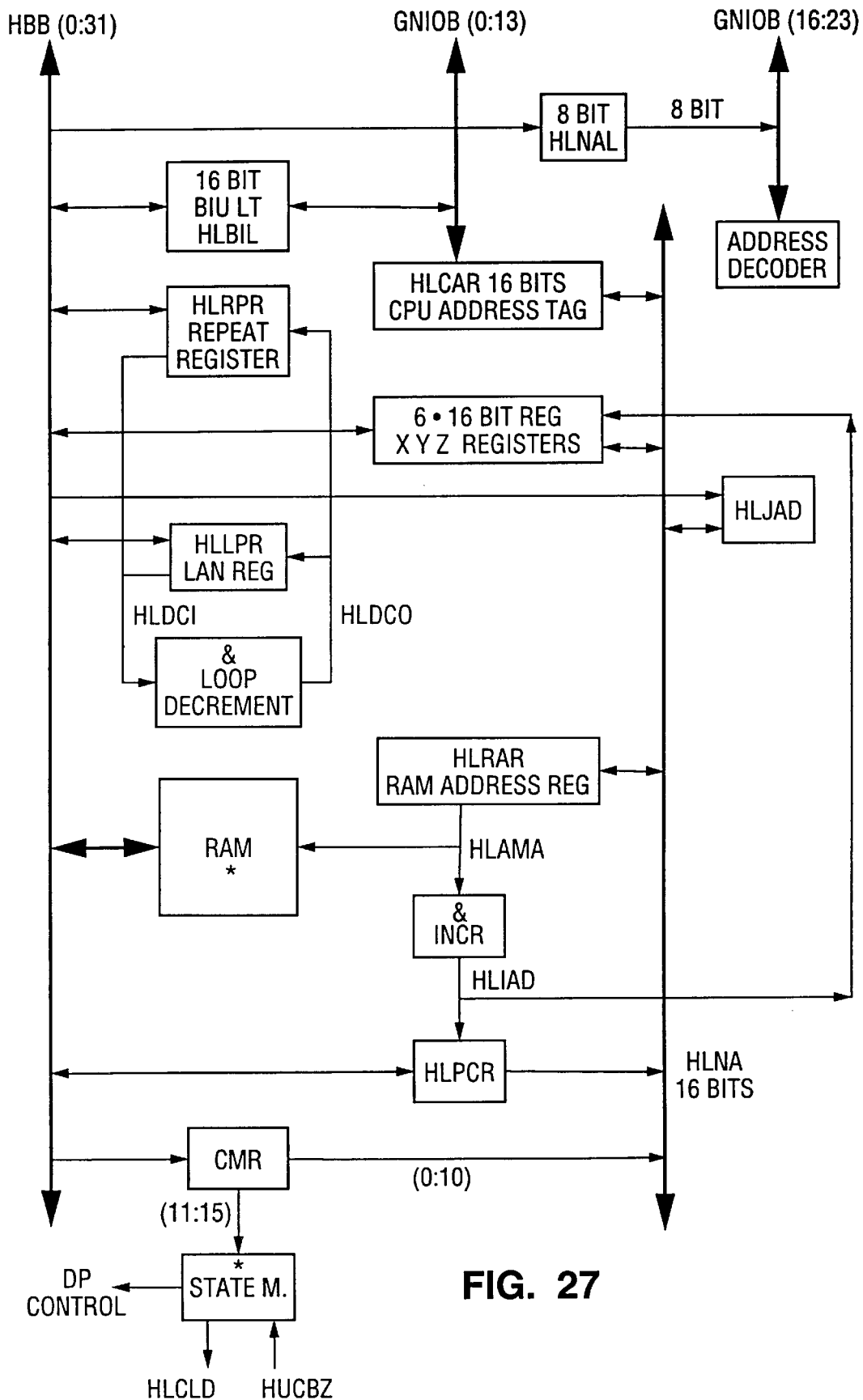
FIG. 27 is a block diagram illustrating a loader utilizable in the DSPM 12.

In the mechanism for implementing vector address pointer registers, including incrementation and wrap-around logic, a loader state machine reads an instruction from RAM (address HLPCR), decodes it and executes it. After each fetch the HLRAR register is incremented and loaded into HLPCR for the next sequential fetch. The block diagram for this operation is shown in FIG. 27.

For an EXEC command, the execution is done by loading the entry point into the microcode and waiting for ROM execution. Instruction DJNZ is executed by loading HLJAD into HLPCR as the next address if the repeat counter is not zero. Nop command is executed by incrementing HLPCR. Load & store instructions are executed by loading the elem lsb of CMR into the RAM address register and (on the next cycle) passing data between the RAM and the register.

The instruction coding for the state machine are:

| | |
|---|---|
| Load | 00XXMMM, XX is num of register (3 bits) and MMM is ram address (11 bits) |
| Store | 01XXMMM, XX is num of register (3 bits) and MMM is ram address (11 bits) |
| EXEC | 10000MM, MM is rom entry point (12 bits) |
| NOPR | 11001MM, MM is don't care |
| HALT | 11010MM, MM is don't care |
| DJNZ | 11100MM, MM is don't care |

Figure 28:
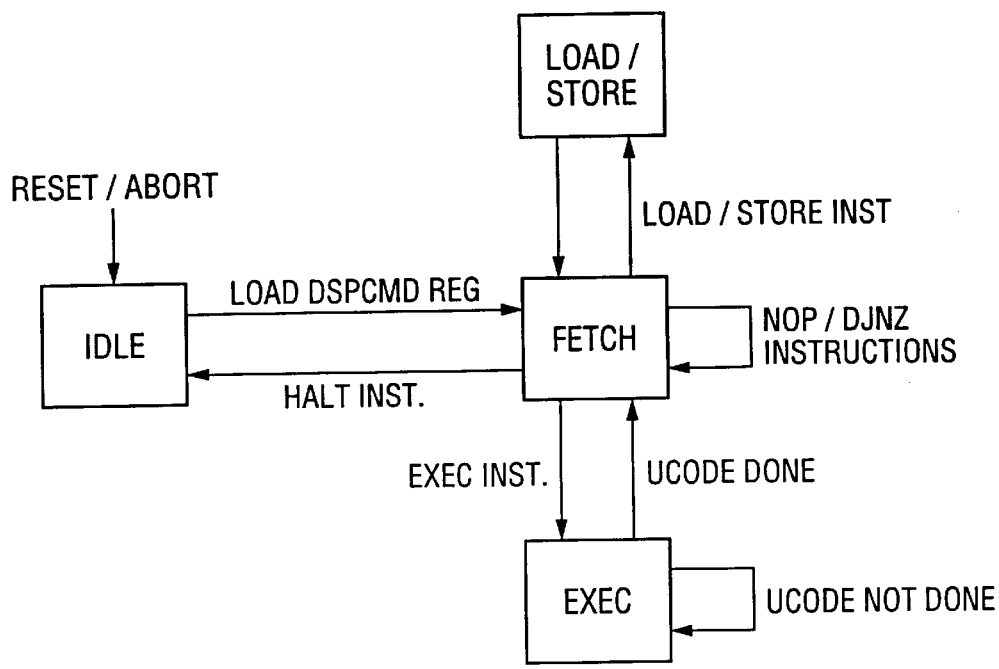
FIG. 28 is a state machine diagram for a loader utilizable in the DSPM 12.
Figure 29:
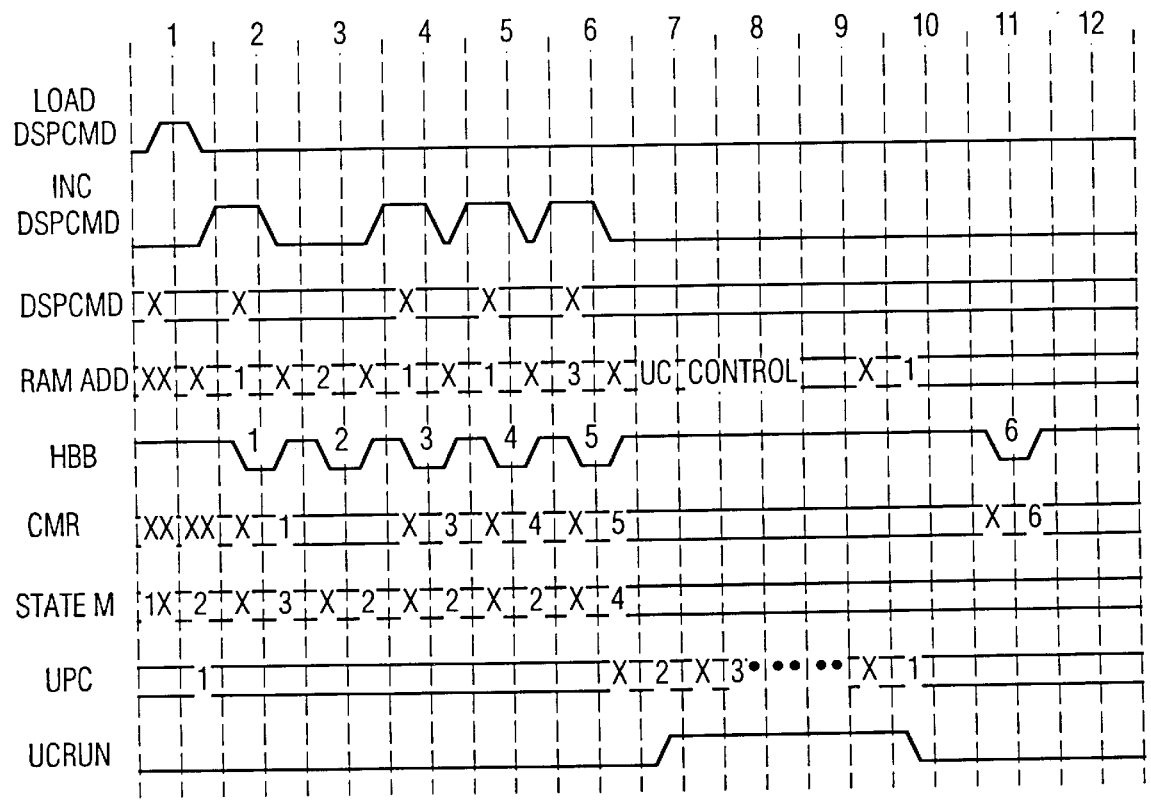
FIG. 29 is a timing diagram illustrating instruction flow in the DSPM 12.

A state machine flow diagram is shown in FIG. 28. FIG. 29 shows a timing diagram of instruction execution by the loader.

All registers and busses are 16 bits unless otherwise written.

---

\* LOADER DATAPATH FUNCTIONS

* Ram RD/WR to/from HBB. Address in HLRAR reg. Data should be:
  Aligned 32 bit
  Aligned 16 bit
  Swapped 16 bit
* Possible sources of HBB: Accumulator, X reg, Y reg, Z reg,
  LEN & OPT
  Repeat counter & Jump address reg, HLPCR,
* Possible dest. of HBB: Accumulator, X reg, Y reg, Z reg,
  LEN & OPT
  Repeat counter & Jump address reg, HLPCR,
* HLRAR loaded from: HLPCR, CMR, HLJAD
* Increment XAR by XIR masked by XWR
* Increment YAR by YIR masked by YWR
* Increment ZAR by ZIR masked by ZWR
* Decrement HLLPR (len reg.) & indicate zero
* Decrement HLRPR (repeat reg.) & indicate zero For each register group X, Y and Z, there are three registers: address, increment and wrap. Each register is 16 bits. For compaction of LOAD/STORE instructions, it would be preferred to encode this data into one 32 bit register. The 16 MSB will be the address register, for which there is no possible compaction. The wrap and increment registers are special cases and can be defined by one 16 bit vector. The coding is the following:

| | |
|---|---|
| Wrap: | 0...001........1 |
| Increment: | 0.......0010...0 |
| Encoded vector: | 0....10..010...0 |

In the event that the wrap is all 1 (no wrap), then the encoded vector will be identical to the increment vector.

The decoding will be:

W(n):=EV(n)#W(n−1)

I(n):=EV(n)*W(n)

Where EV is the encoded vector, W is wrap vector and I is increment vector. The wrap vector will be different from the original wrap vector in the lsb under the increment bit; i.e., the result in above example will be:

| | |
|---|---|
| Wrap: | 0...001...10...0 |
| Increment: | 0.......0010...0 |

Since these lsb in the address will not change in the increment, the value of these bits in the wrap vector is don't care.

\*
In the FIG. 29 instruction flow timing diagram:
Ram add - 1:DSPCMD
            2:CMR
            3:HLJAD
Instructions/data from ram (HBB & CMR) -
            1:Rd
            2:data for Rd
            3:nop
            4:DJNZ
            5:Exec (ucode)
            6:Halt
State m = 1:Idle
            2:Fetch
            3:Read/write data
            4:ucode execution

```
Ucode -   1:Stuck address
          2:CMR*O:10*=entry point
          3:routine
```

Figure 30:
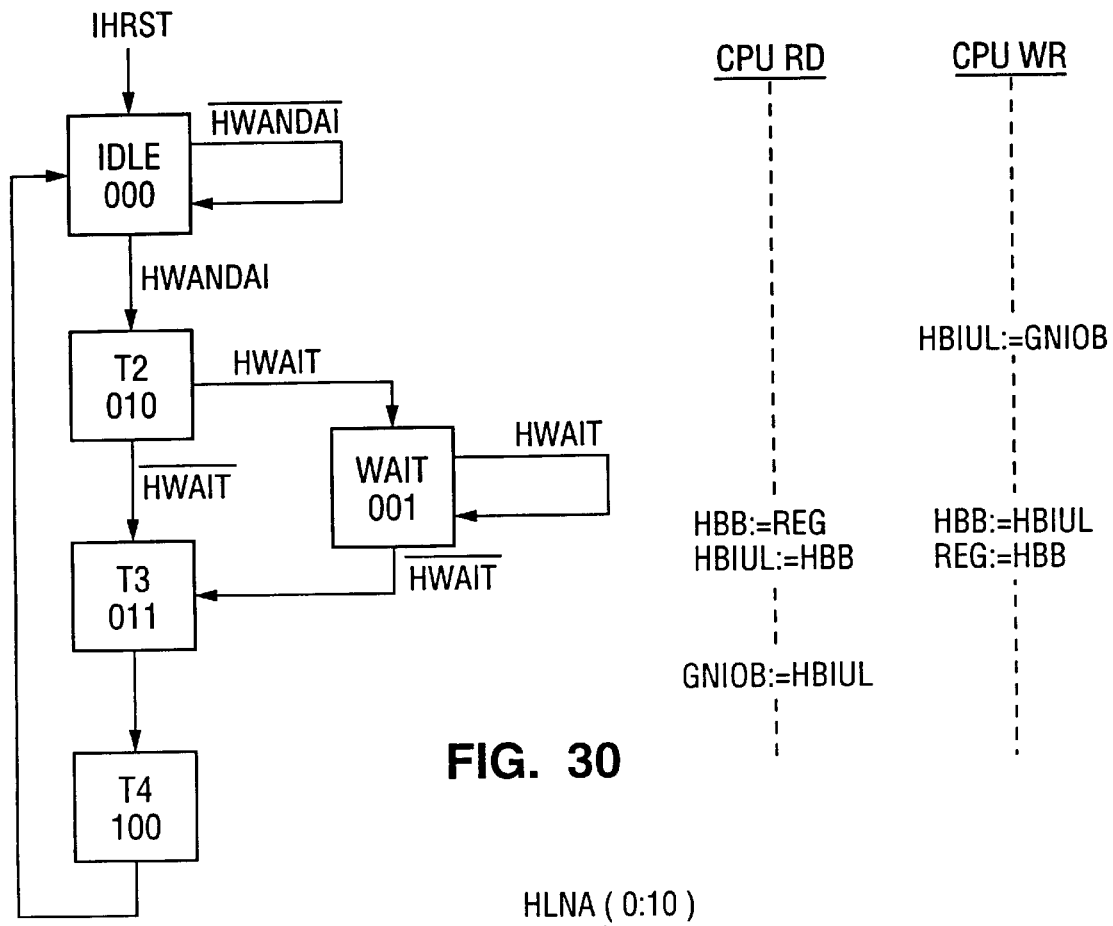
FIG. 30 is a state machine diagram for CPU read/write operations.

Read/write operations by the CPU are controlled by a state machine. The address 16 lsb will be latched in CPU address register (see FIG. 27), and 16 msc will be decoded for HWANDAI signal. If HWANDAI is active, then the state machine will start the read/write operation and move to T2 state. On T2, if the address is not DSPABT, DSPSTA or DSPEXT and loader state machine is not IDLE, then HWAIT will be active and this state machine will move from T2 to WAIT state until HWAIT will be inactive; then it moves to T3, T4 and back to IDLE. FIG. 30 shows what is executed each cycle.

The microcode has three flow controls: Loop, Wait for flag & Stuck. If none of these controls is active, then the execution is sequential.

Loop uses the HUJAD register. While executing microcode instructions, when a "label" flag is discovered, the current upc incremented by 1 is stored into the HUJAD register as a return address of loop (this means the uassembler should label the preceding line). When executing a conditional jump uinstruction, if the condition is true, then the HUPCR is loaded from HUJAD instead of HUNPR.

Wait may be used for external bus cycles. There will be an input to the control logic which will disable the load of HUNPR into HUPCR and execution of the uinstruction while it is active. This signal will be an OR of all WAIT sources. One of the sources will be microcode itself, and this will cause the STUCK condition (microcode disables itself from increment). The stuck will be used in the following cases:

Global reset

Abort by CG

End of instruction

Figure 31:
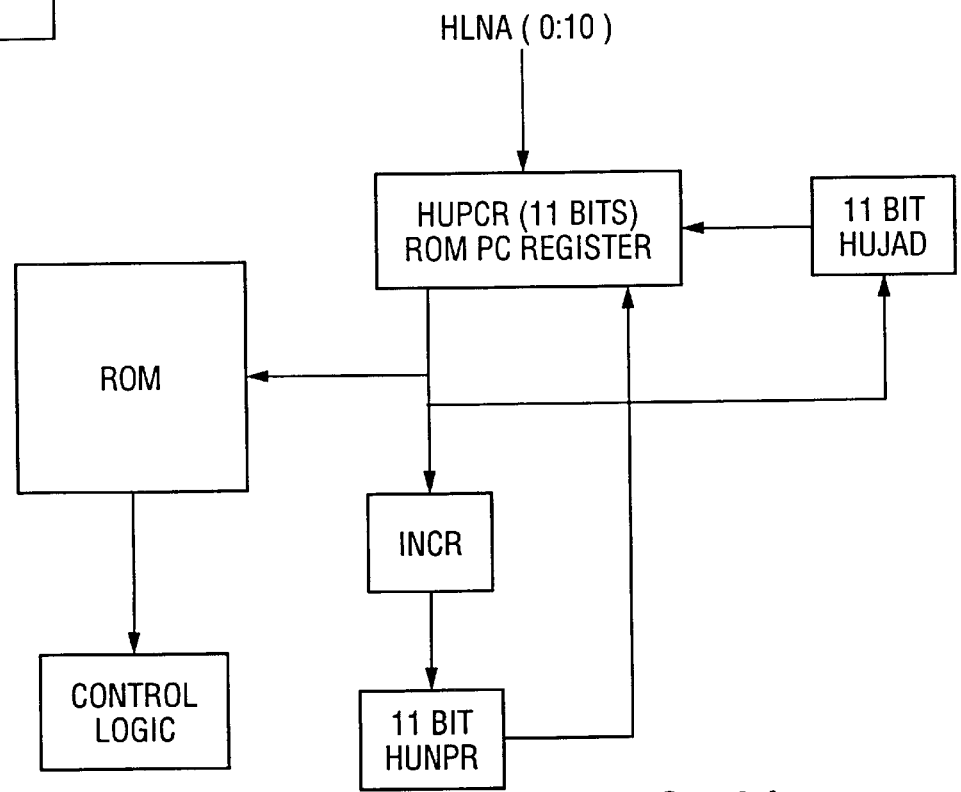
FIG. 31 is a block diagram illustrating a microcode controller utilizable in conjunction with the present invention.
Figure 32:
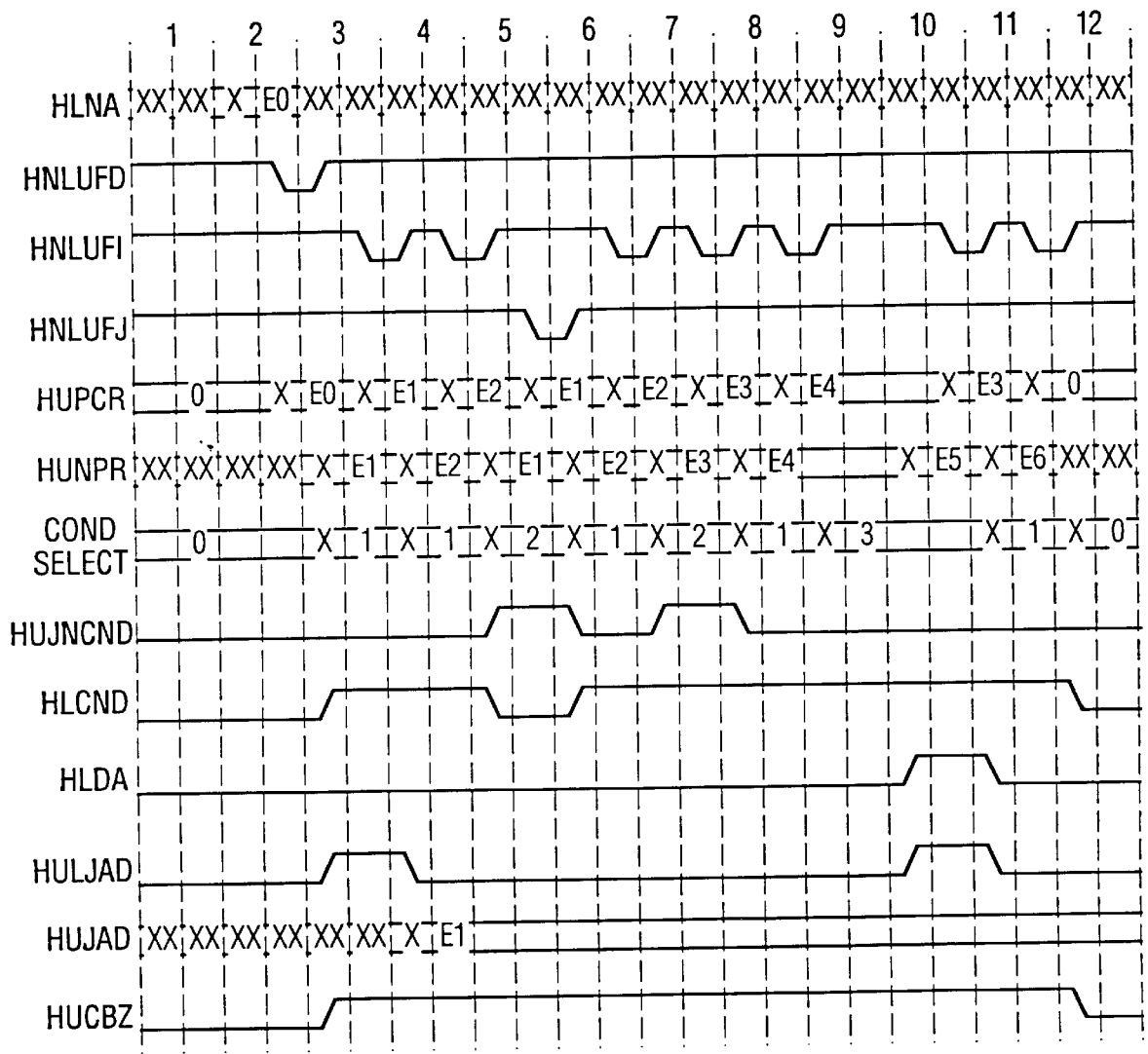
FIG. 32 is a timing diagram illustrating microcode flow.

In the first two cases the HUPCR will be set to an address which has the STUCK flag. In the third case, there will be a STUCK flag in every end of instruction. The microcode will exit the STUCK case by loading a new value to HUPCR for new instruction execution. A block diagram of the microcode controller is shown in FIG. 31.

The microcode data path functions are as follows:

Load HUPCR from HLNA (controlled by loader).

Load HUPCR from Stuck constant for reset/abort (controlled by loader).

Load HUPCR from HUJAD (controlled by ucode).

Load HUPCR from HUNPR (controlled by ucode).

Load HUJAD from HUPCR (controlled by ucode).

Increment HUPCR into HUNPR every PHI2.

Figure 33:
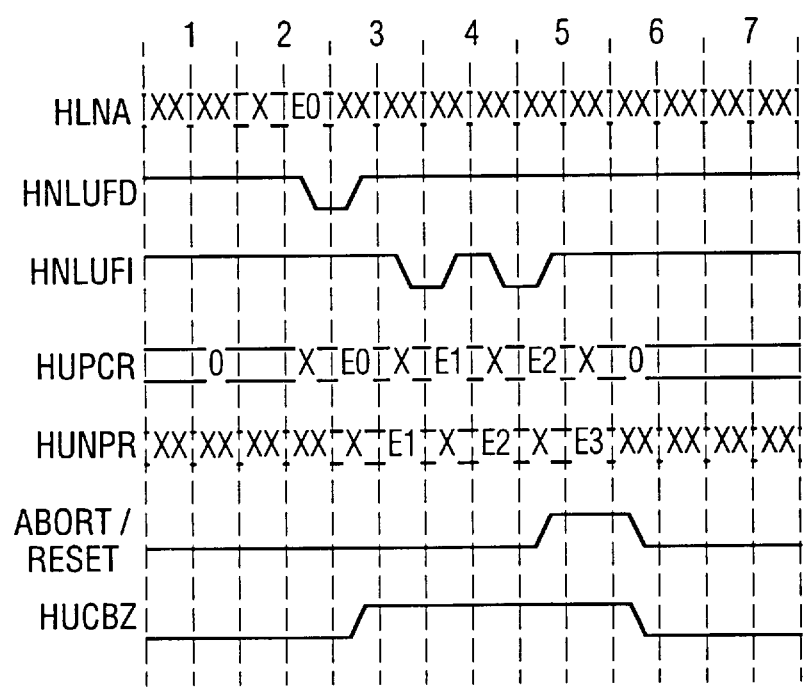
FIG. 33 is a microcode reset timing diagram.

In FIG. 33:

```
HLNA, HUPCR, HUNPR & HUJAD values:
        O : Stuck uaddress
        EO : Entry point
        En (n=1 . . . 6): Address n after entry point.
Cond select:
        0:Never (stuck)
        1:Always
        2:Len reg.=0
        3:HLDA
HNLUFD:Load ucode counter from HLNA
HNLUFI:Load ucode counter from ups incrementor
HNLUFJ:Load ucode counter from HUJAD
        The microcode fields are as follows:
        HBB read select
        HBB write select
Execution Datapath Control:
        K selector latch
        L selector latch
        HEB selector
        HFB selector
        HDB AI load
        HDB AR load
Loader Datapath Control:
        HLNA read select: HLCAR, XAR, YAR, ZAR, HLJAD, HLCMR & NOP.
        HLNA write select: HLCAR, HLRAR & NOP, HUPCR is NOT in UCODE control.
        HLIAD write to: XAR, YAR, ZAR & NOP
        HLDCI read select: HLRPR, HLLPR
        HLDCO write select: HLRPR, HLLPR & NOP
        GNIOB drive: HLBIL (biu latch), HLCAR & NOP
        GNIOB write select: HLBIL (BIU latch), HLCAR & NOP
Ucode Flow Control:
        HUJAD load
        HUPCR HUJAD if 'COND. If COND=1 then HUPCR is loaded with HUNPR always.
        Wait condition select, HLDA; WAIT, DSPEXT, Len reg.>0, Always & Never.
        Ucode buzy
        Disable flags set: Accumulator load, Ram write & None
        Disable flags reset
```

In microcode decoding control, there are 2 flags which can be set by (TBD either ucode or by entry point decoding):

Accumulator load disable flag: When set, accumulator will not be loaded from ALU, and len decrement will be disabled while this flag is set.

Ram write disable flag: When set, writing to RAM and ZAR increment, LEN decrement, and changing MIN/MAX FF will be disabled.

These two flags will be reset by ucode special control.

Odd len flag: This flag will disable write to high word of RAM. It will be set by attempt to decrement LEN register when it is zero. It will be reset by ucode when it is fetching new instruction.

The purpose of these flags is to begin loop on it's first iteration. On normal execution in pipe machine the flow is:

|  | Time Progress T1 | T2 | T3 | T4 | T5 | T6 | T7 | T8 | T9 | T10 | T11 |
|---|---|---|---|---|---|---|---|---|---|---|---|
| Device |  |  |  |  |  |  |  |  |  |  |  |
| Dev 1 | 1n1 | 2n1 | 3n1 | 4n1 | 1n2 | 2n2 | 3n2 | 4n2 | ... |  |  |
| Dev 2 |  | 1n1 | 2n1 | 3n1 | 4n1 | 1n2 | 2n2 | 3n2 | 4n2 | ... |  |
| Dev 3 |  |  | 1n1 | 2n1 | 3n1 | 4n1 | 1n2 | 2n2 | 3n2 | 4n2 | ... |
| Wr res |  |  |  | 1n1 | 2n1 | 3n1 | 4n1 | 1n2 | 2n2 | 3n2 | 4n2 ... |
| Loop |  |  |  | <----------------------> |  |  |  |  |  |  |  |

For this example, steps 1n1 to 4n1 are the first iteration, and steps 1n2 to 4n2 are a second iteration. The simple way to implement loop is to jump to T4 after executing T7. One problem is the waste of microcode. In this example iteration is 4 lines, but ucode length is 11 lines. The second and major problem is when the LEN register (loop counter) is one or two. In this case, the above sequence will execute 3 iterations.

The alternative is the following diagram:

|  | Time Progress T1 | T2 | T3 | T4 |
|---|---|---|---|---|
| Device |  |  |  |  |
| Dev 1 | 1n1 | 2n1 | 3n1 | 4n1 |
| Dev 2 | 4n1 | 1n1 | 2n1 | 3n1 |
| Dev 3 | 3n1 | 4n1 | 1n1 | 2n1 |
| Wr res | 2n1 | 3n1 | 4n1 | 1n1 |
| Loop | <>----------------------> |  |  |  |
| Write Disable | <>------------------> |  |  |  |

In this diagram, on T1, devices dev2 and dev3 execute the same as in T5, and on T2, dev3 executes the same as in T6 of the first diagram. Result write to accumulator or RAM will be disabled on first iteration, because it will be garbage. The LEN decrement and ZAR increment will be disabled as well.

The purpose of the high word disable flag is real instructions, which each iteration executes two steps, and write 2 real results into the RAM/accumulator. There is a problem if the LEN register is odd. In the last iteration, we only "half" should be executed, i.e., only the first real result is relevant. In this type of instruction, there are two "decrement len reg" uinstructions every iteration, and if LEN is odd, it will be zero after first decrement. In this case, if there is another "decrement len reg" uinstruction, and the LEN register is zero, then there is indication that last real result of loop should be ignored.

The microassembler follows two rules: The label for a jump address is placed one microinstruction prior to execution and a len decrement effects zero detection only in the next cycle, i.e., decrement on the same cycle of loop jump is effective after the jump.

The DSPM 12 also includes a mechanism for specifying parameters for a vector operation by using parts of the op code field from a parameters register. A microcode definition for this mechanism is described in greater detail in Appendix B to this detailed description of the invention; Appendix B is to be considered an integral part of this patent specification.

J. Silence Detection Algorithm

The system 10 also provides a silence detection algorithm for speech applications.

The Silence Detection Algorithm (SDA) is a scheme designed to differentiate between the cases of Speech and Speech+Noise in a speech compression system. Specifically, it is desired to compress silence with the most limited information consisting of: (i) the duration of a silent period, such as occurring between two words or sentences, and (ii) its power (RMS) level for regeneration purpose.

An SDA is usually a power detector, detecting speech+noise when the level of the received signal is larger than in the case of received noise alone. However, the level of noise is usually not constant, especially in the case of mobile radio communications, so that the thresholds of the silence and speech detection algorithms should be made adaptive.

Moreover, the beginning or end of words, or highly unvoiced speech, can have an energy level which could be equal to a silence (noise only) level. Hence, an SDA should have a mechanism which prevents low level received speech from being mistaken for silence, but at the same time preserves a maximal compression of the silence.

Another requirement is to regenerate silence as a signal which is hardly distinguishable from the original silence so that transition between speech and silence are felt natural.

An SDA which satisfies the above requirements includes the following elements:

1. Adaptive System Requirement and State Machine

A state machine controls the transition between the silent and speech period (SILENCE_STATE and SPEECH_STATE). Two adaptive thresholds for transition between the states of the state machine.

2. Differentiation Between Low Level Speech and Silence Mechanism

For this purpose, the LPC analysis is performed. In a silent period, the LPC coefficients are stationary. When speech starts, the LPC coefficients exhibit a discontinuity which allows the detection of the beginning of a speech period in spite of a low level received signal. Likewise, start of a silent period will also require such a discontinuity.

3. Silence Regeneration

Silence regeneration is based on filtered white noise. The noise level is set to the average of the received signal in the silent period. However, this level is multiplied by an attenuating factor which is a function of the level of the received signal in order to achieve the requirement of natural silence. Hence, the attenuating factor is adaptive, providing more attenuation during high level silence and less attenuation during low level silence.

K. DTMF

The system 10 also provides an algorithm for implementing DTMF detection in a manner compatible with the Mitel benchmark (i.e. the so-called Mitel tape).

The following describes how to implement a DTMF generator and DTMF detector in the architecture of the above-described system 10. The detector is based on a fast DFT algorithm which is very efficient for discrete frequencies. In-band tonal signaling is used in many telephony administrations for dialing purposes. The usage of tonal can be attractive for controlling remote instruments as well, fax machines for example. The DTMF signaling scheme, described below, is faster than the current loop PULSE dialing. All number—0 . . . 9—are transmitted in a fix rate, about $\frac{1}{10}$ sec per number.

Dual Tone Multi Frequency (DTMF) is used for dialing via the telephony network of many countries. The signaling scheme is constructed from two sine waves which are transmitted simultaneously. For each number, two tones are assigned, one from LOW GROUP and the other from HIGH GROUP. According to the following Table X, i.e., one of 4 frequencies from the LOW GROUP and one of 4 frequencies form the HIGH GROUP.

The duration of a symbol is 40 ms. And a space of 60–40 ms. is inserted between numbers.

The power level of the two groups can be programmed. Usually the LOW GROUP power level must be attenuated in order to compensate for higher attenuation in the high band.

The difference in power level can be 0–4 db.

TABLE X

| No. | Low Frequency Fl-Hz.- | High Frequency fh-Hz.- |
|---|---|---|
| 1 | 697 | 1209 |
| 2 | 697 | 1336 |
| 3 | 697 | 1477 |
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| 0 | 941 | 1336 |
| * | 941 | 1209 |
| # | 941 | 1477 |
| A | 697 | 1633 |
| B | 770 | 1633 |
| C | 852 | 1633 |
| D | 941 | 1633 |

Frequency deviation: less than 0.5%

IMPLEMENTATION
DTMF_TRANSIT_INIT(power, diff)
  Power: power level of the high group –0 . . . –15 dbm-
  Diff: relative attenuation of low group –0 . . . 4 db, 0.1 db res-
  Program AFE for Transmit attenuation according to Power.

Calculate Amplitude of the low frequency tone.

$$A1 = MAX*10 \exp (diff/20) \ 'MAX = 2 \exp 15$$

(40 entries table)
Return
DTMF-TRANSMIT (NUMBER: –0–15-)
  Get from a table with 16 (number) entries, two frequencies DFL, DFH.

---

The table is base on the frequency table above, each frequency is multiplied by ANGLE_SCALE = (2 * 16)/Fs = 6.82666667
  Fs = 9600
DFL = fl * ANGLE_SCALE
DFH = fh & ANGLE_SCALE

---

Those are the incremental angles needed to be accumulated in the SIN wave generator using 16 bit unsigned accumulation.
  Init parameters
  Init timer for ON_TIME=40 ms.
  Return

---

DTMF_ON( )
int i;
static unsigned afl,afh;
—
  * Interrupt routine every 8 samples *
  * Calculate New Angles *
  * For the two frequencies, for 8 samples *
for ( i = 1 ; i < 8 ; i++)
—
  afl += DFL;
  afh += DFH;
    * get from sin table using 9 most significant bits *
    * u_law compress the combined signal and send to fifo *
  u_signal-i-= ucompress( A1* sint-(afl >> 7 ) & 0x01ff-
        + sint-(afh >> 7) * 0x01ff-);
* sint-512- is the SIN table with 512 entries. *
return( );
—
after 40 ms stop power by DTMF_OFF. program no energy.
DTMF_OFF( )
—
* program transmit attenuator for no output  *
* disable DTMF_ON interrupts                 *
* init 40 ms. timer                          *
return( );
—

---

DTMF DETECTION SPECIFICATIONS
  accept/reject frequency range is defined as:
    Frequency deviation accept: 1.5% +/– 2 Hz.
    Frequency deviation reject: 3.5%
Sensitivity –31 dbm
Signal/Noise 12 dB
Maximal difference between the two tones (twist): 10 dB
  (The CEPT requirement is for no more than 6 dB , but this requirement is for post office exchange node. For end to and a higher twist is needed.)

---

The DTMF detector uses a DFT detector uses a DFT algorithm that calculates the energy at 18 different frequencies, 10 reject area filters and 8 accept frequencies.

The DFT algorithm implementation is more efficient than FFT implementation. Since the frequencies allocation is not on a power of two, the space between frequencies is geometric and constant. In the IIR implementation, any frequency can be calculated exactly. There is no need to select N in such a way that all frequencies will be close to k/N|k integer. In the IIR design, k can be a real number.

| accept | reject | i |
|---|---|---|
| | 662 Hz. | 1 |
| 697 Hz. | | 2 |
| | 732 Hz. | 3 |
| 770 Hz. | | 4 |
| | 808 Hz. | 5 |
| 852 Hz. | | 6 |
| | 895 Hz. | 7 |
| 941 Hz. | | 8 |
| | 988 Hz. | 9 |
| | 1149 Hz. | 10 |
| 1209 Hz. | | 11 |
| | 1269 Hz. | 12 |
| 1336 Hz. | | 13 |
| | 1409 Hz. | 14 |
| 1477 Hz. | | 15 |
| | 1551 Hz. | 16 |
| 1633 Hz. | | 17 |
| | 1715 Hz. | 18 |

DETECT_DTMF algorithm:
Every N samples:
Calculate the DFT of the 18 frequencies (use the filter parameters from DTMF filter parameters table)
ACCEPT criterion:
1) Find the MAX of E-i-,(E-i_max-)|i=1 to 9 (save E-i_max-s S=S_low, and save i_max–its index)
2) If i max is an accepted frequency then check the S/N>8 dB criterion. N=(sum of E-i-)–E-i_max- -E-i_max–1-_E-i_max+1 S/N criterion: E-i_max-*KS>N+Epsilon (Epsilon=10) (KS=1/16)
KS is the sensitivity threshold.
Epsilon is the dynamic range parameter.
3) Repeat the 1), 2) for the high group: i=10 to 18 (only if criteria 1,2 did succeed!)
4) If abs (S_low–S_high )<(S_low+S_high)*KD then we succeeded in detecting a dialed digit: return it, according to the two indexes.
KD=0.818181 for 10 db max difference between S_low to S_high
In order to change the maximum allowable difference D dB, KD can be changed according to the following formula:

$$KD = (10^{}(D/10) - 1/(10^{}(D/10) + 1)$$

5) Energy test
P=sum of -(x_n*A)*(x_n*A)- |n=1,N; total scale down power (S_low+S_high)*Kp>P
Kp=2
6) Eliminate Voice detection with duration less than 20 ms:
Accept a change in the character only if this character is equal to the previous measurement, (at least two consecutive measurements):

if $(Ch(t)==Ch(t-1))$Result_char=$Ch(t)$;

$Ch(t)=Ch(t-1)$

Ch(t) can be Idle character.
The following algorithm performs Filter Bank very efficiently. Each filter is an IIR filter with one Complex pole. The algorithm can be used for DTMF deletion and for any programmable tone detector.
DFT ALGORITHM
Spectrum analysis at a single point in the z Plane is described in—1- Rabiner & Gold. The technics can be implemented very efficiently on the NS32FX16 using one complex coefficient per frequency and scale factor for gain adjustment, preventing overflow.

The following block diagram describes the operation of one filter. The same operation is performed on Bank of filters in a complex vector operation.

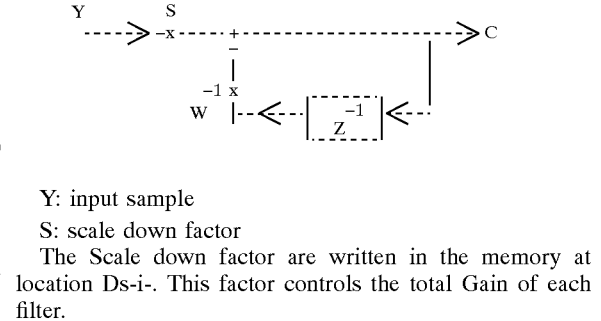

Y: input sample
S: scale down factor
The Scale down factor are written in the memory at location Ds-i-. This factor controls the total Gain of each filter.
At init all C-i-<=0.
For every sample use the following Two WANDA operations:
VCMUL: C-i-:=C-i-*D-i-
VCMAD: C-i-:=C-i-+Y*D-i-
1) Dw-i- includes 18 complex frequency coefficients W-i-
Pole calculation
f=center frequency
Fs=sampling frequency
The phase change is: Th=2*pi*f/Fs
The value of the complex Pole of the filter is $$\text{Pole} = r^* \exp(-j^* Th)$$

r=is the magnitude of the pole.
if r=1 we have a DFT transform with a minimum band-with of Fs/(2*N).
In order to increase the bandwith, we can reduce the magnitude of the pole.

BW=required band width.

The magnitude of the pole is: r=exp--pi BW/Fs-
Scale Down Calculation:
In order to reduce the Gain of the filter and to prevent overflow, a Scale Down factor A is used. For a unity gain $$A = 2^*(1-r)$$

(A is the scale factor for unlimited N
This scale down factor prevent overflow.
If N is small, A can be larger
The minimal A is 1/N.)
Perform VCMUL for 18 points.
2) Ds-i- includes 18 real scale down numbers A. Perform VCMAd operation for 18 points.
After N samples, Perform Frequency and Energy calculation for the required frequencies: C-i-:=C-i-*C-i- conj
The DTMF filter parameter are provided in the following Table XI:

| i | f-Hz- | Fs-Hz- | BW-Hz- | PR | PIm | A | N |
|---|---|---|---|---|---|---|---|
| 1 | 662 | 9600 | 50 | 29256 | 13534 | 1064 | 192 |
| 2 | 697 | 9600 | 50 | 28939 | 14200 | 1064 | 192 |
| 3 | 732 | 9600 | 50 | 28606 | 14860 | 1064 | 192 |
| 4 | 770 | 9600 | 50 | 28228 | 15566 | 1064 | 192 |
| 5 | 808 | 9600 | 50 | 27832 | 16264 | 1064 | 192 |
| 6 | 852 | 9600 | 50 | 27352 | 17058 | 1064 | 192 |
| 7 | 895 | 9600 | 50 | 26861 | 17821 | 1064 | 192 |

-continued

| i | f-Hz- | Fs-Hz- | BW-Hz- | PR | PIm | A | N |
|---|-------|--------|--------|-------|-------|------|-----|
| 8 | 941 | 9600 | 50 | 26312 | 18622 | 1064 | 192 |
| 9 | 988 | 9600 | 50 | 25727 | 19422 | 1064 | 192 |
| 10 | 1149 | 9600 | 50 | 23542 | 22020 | 1064 | 192 |
| 11 | 1209 | 9600 | 50 | 22659 | 22928 | 1064 | 192 |
| 12 | 1269 | 9600 | 50 | 21741 | 23800 | 1064 | 192 |
| 13 | 1336 | 9600 | 50 | 20677 | 24730 | 1064 | 192 |
| 14 | 1409 | 9600 | 50 | 19473 | 25689 | 1064 | 192 |
| 15 | 1477 | 9600 | 50 | 18310 | 26530 | 1064 | 192 |
| 16 | 1551 | 9600 | 50 | 17064 | 27385 | 1064 | 192 |
| 17 | 1633 | 9600 | 50 | 15511 | 28258 | 1064 | 192 |
| 18 | 1715 | 9600 | 50 | 13973 | 29049 | 1064 | 192 |

PR is the Real part of the pole
PIm is the Imaginary part of the pole
AA is the Scale Down factor To get an efficient filter bank implementation the following VCPOLY vector instruction was implemented.

The New instruction VCPOLY performs all the DTF algorithm in a single instruction on the AM-160

```
VCPOLY (X,Y,Z)
   real X
   complex Y,Z real temp
   temp = R?(z-0-) * x-0-);
   Z-1- = Z-1-+temp*temp;
   for (n=2; n<LENG; n++)

z-n- = (complex) (z-n * y-n- + temp)
```

L. Lattice Filter/Inverse Lattice Filter

The DSPM 12 utilizes a lattice filter and inverse lattice filter using the "vector-lattice-propagate" and "vector-multiply-and-add" pair of vector DSP instructions.

Lattice filter is a scheme for performing a Finite Impulse Filter (FIR). It is used mainly for adaptive filters, where the coefficients can vary from one filter iteration to the next.

Figure 34:
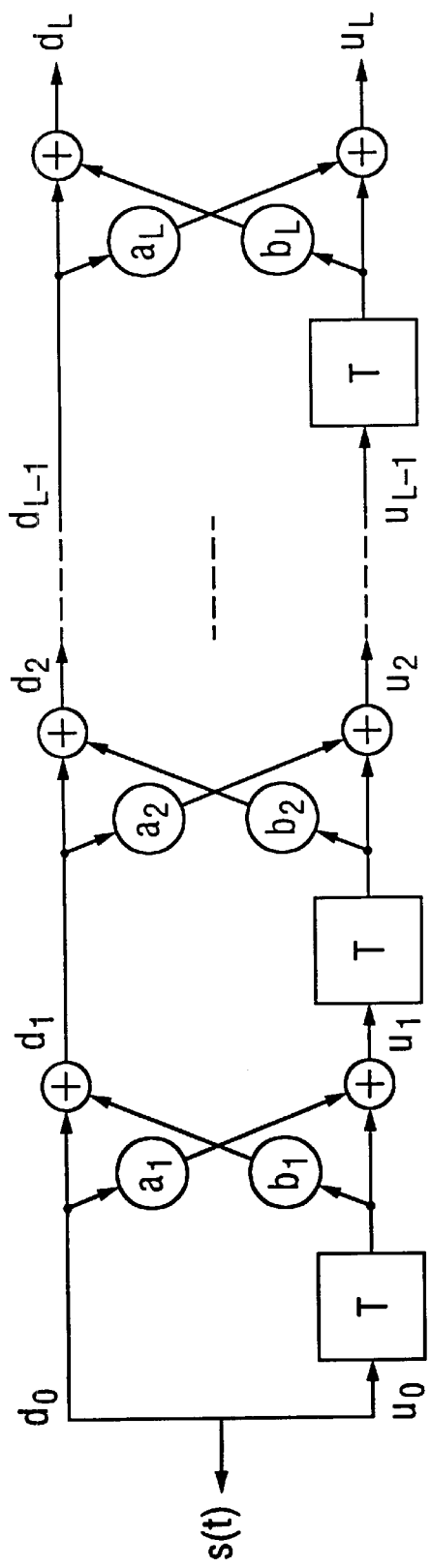
FIG. 34 is a block diagram illustrating a lattice filter.

A lattice filter is used to filter a digitally sampled input signal: s(t), to obtain an output signal: d(t). A lattice filter block diagram is shown in FIG. 34. It consists of L stages, where each stage is specified by two values: d and u, with stage-number as a subscript. Both and d and u values of all of the stages are digitally sampled functions of time.

In an inverse lattice filer the problem is to recover the original input signal s(t), given the filtered output signal d(t). For this purpose it is also necessary to recover the u values in all stages for each time-step. An inverse lattice filter block diagram is shown in FIG. 35.

Figure 36:
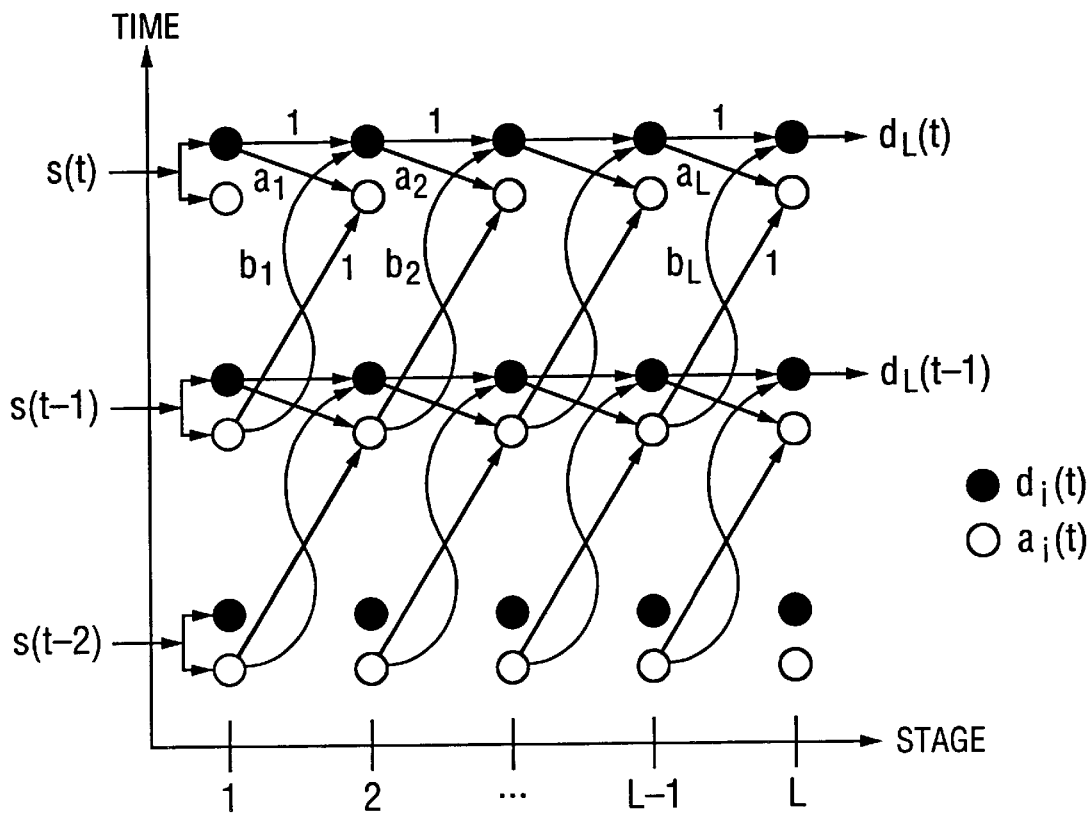
FIG. 36 is a lattice filter signal flowgraph.

In a lattice filter, the input signal s(t) is fed directly into both d and u values of stage-0, and then propagates according to the block diagram of FIG. 34. The blocks labeled "T" indicate delay of one time-step. The signal flowgraph of a lattice filter is shown in FIG. 36, and corresponds to the following equations:

1. $d_o(t) = u_o(t) = s(t)$
2. $d_k(t) = d_{k-1}(t) + b_k * u_{k-1}(t-1)$  (FOR k = 1 to L)
3. $u_k(t) = a_k * d_{k-1}(t) + u_{k-1}(t-1)$  (FOR k = 1 to L)

Figure 35:
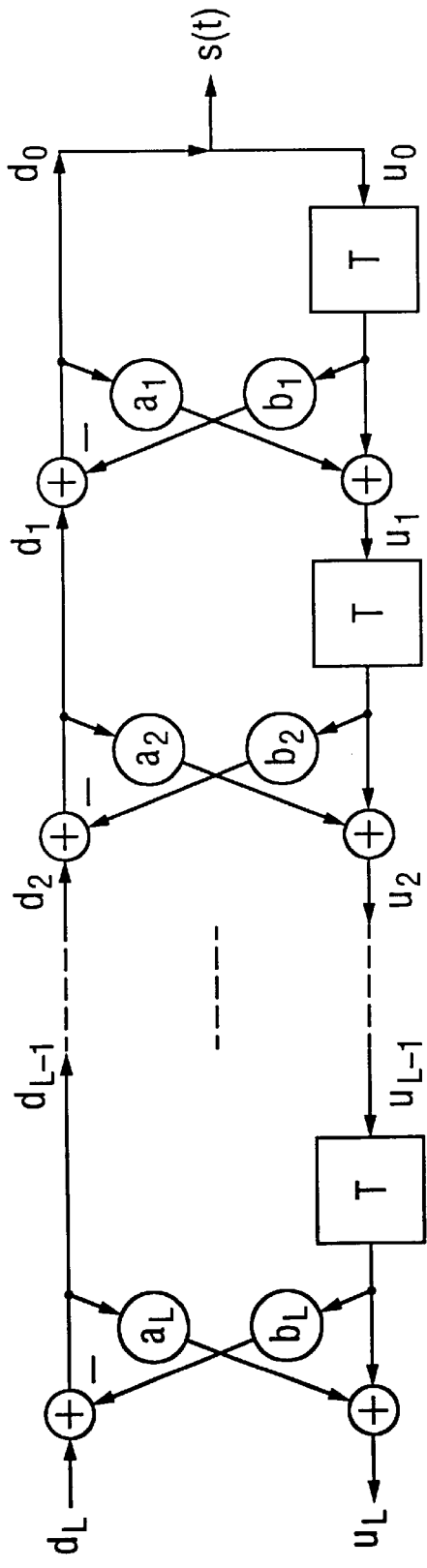
FIG. 35 is a block diagram illustrating an inverse lattice filter block diagram.
Figure 37:
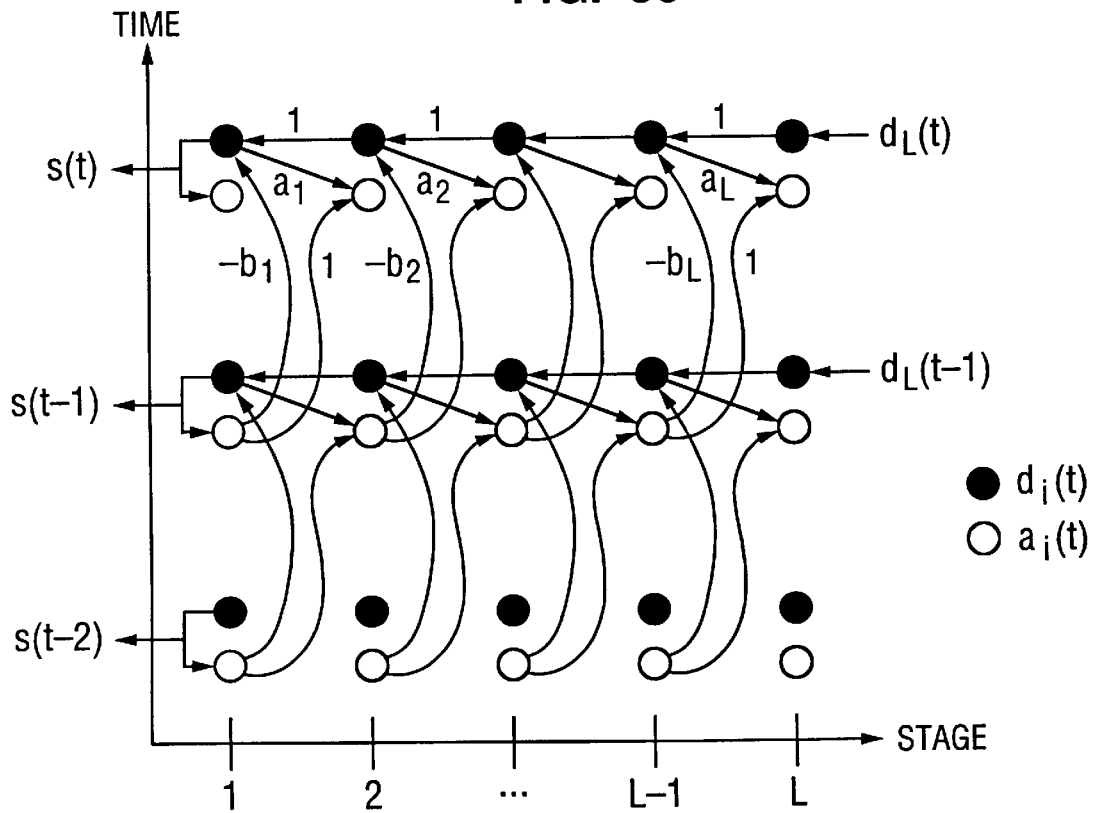
FIG. 37 is a inverse lattice filter signal flowgraph.

The input signal d(t) is fed into the d value of the last stage (stage-L), and then propagates according to the block diagram of FIG. 35. The signal first propagates along the d values from this last stage back to the first stage, using previous time-steps u values of the various stages. The output is taken from stage-0 and is also used to propagate back in order to update the new values of u for the current time-step. The signal flowgraph of an inverse lattice filter is shown in FIG. 37, and corresponds to the following equations:

$$d_{k-1}(t) = u_k(t) - b_k * u_{k-1}(t-1) \text{ (FOR k=L downto 1)} \quad 1.$$

$$s(t) = u_0(t) = d_0(t) \quad 2.$$

$$u_k(t) = a_k * d_{k-1}(t) + u_{k-1}(t-1) \text{ (FOR k-1 to L)} \quad 3.$$

The usual method for implementing a lattice filter and inverse lattice filter in software is to use a standard SDP processor and write code that corresponds directly to the above equations. This can be achieved by iterating for each stage and performing the steps indicated in that order.

The standard way of writing lattice filter and inverse lattice filter code as an iteration on filter stages is not appropriate for a vector processor which is capable of executing vector instructions with added efficiency due to pipelining.

The present invention implements the operations needed for a lattice filter and inverse lattice filter using such a vector processing architecture and does so using a minimal number of special-purpose vector instructions. In fact, it will be shown that both the lattice filter and inverse lattice filter can be performed using two vector-instructions: VCLATP and VCMAD. The VCMAD is a general-purpose vector-instruction with many other uses in DSP applications, so the cost of this scheme is actually an introduction of a single vector-instruction specifically for this purpose.

For the following description refer also to the above-provided description of the DSPM architecture.

The following data-structures are used in the implementation of both lattice filter and inverse lattice filter. They reside in the DSPM on-chip RAM. The syntax used is a pseudo-assembly language corresponding to the architecture specifications of the DSPM. (L is a constant specifying the number of stages).

```
FILTER_IN:              .COMPLEX    1    ;Input signal for lattice
FILTEROUT:              .COMPLEX    1    ;Output signal from lattice
INV_FILTERIN:           .COMPLEX    1    ;Input signal for inverse letter
INV_FILTER_OUT:         .COMPLEX    1    ;Output signal for inverse lattice
;Parameters for vector instructions
LATT_D:                 .PARAMS  LENG=L+1,  COJ=0, CLR=0, SUB=0
LATT_D:                 .PARAMS  LENG=L,    COJ=0, CLR=0, SUB=0
INV_LATT_D:  .PARAMS    LENG=L+1,  COJ=0, CLR=0, SUB=1
INV_LATT_p:  .PARAMS    LENG=L,    COJ=0, CLR=0, SUB=0
; Vector pointers
; DBUF = "d" values vector, length=L+1 (0 . . . L), no wrap-around
; UBUF = "u" values vector, length+L (0 . . . L), using wrap-around = L
; ABUF = vector of "a" coefficients, length=L (0 . . . L), no wrap-around
; BBUF = vector of "b" coefficients, length=L (0 . . . L-1), no wrap-around
DBUF_PTR:  .VECTOR_ADDR ADDR=DBUF_0, INCR=1, WRAP=2*L
```

```
UBUF_PTR: .VECTOR_ADDR ADDR=UBUF_0,INCR=1, WRAP=L
ABUF_PTR: .VECTOR_ADDR ADDR=ABUF_0, INCR=1, WRAP=2*L
BBUF_PTR: .VECTOR_ADDR ADDR=BBUF_0, INCR=1, WRAP=2*L
; Vector buffers, labels refer to zero'th entry
DBUF_0:         .COMPLEX    L              ; Reserve L complex entries
DBUF_L:         .COMPLEX    1              ; Plus one more, labeled DBUF_L
UBUF_0:         .COMPLEX    L
ABUF_0;         .COMPLEX    L
BBUF_0          .COMPLEX    L
; Lattice filter implementation:
LATT:   LX      FILTER_IN                  ; Read input signal
        SX      DBUF_0                     ; and store as d_0
        SX      UBUF_0                     ; and as u_0
        LX      UBUF_PTR
        LY      BBUF_PTR
        LZ      DBUF_PTR
        LPARAM  LATT_D
        VCLATP                             ; Compute all d values
        LX      DBUF_L
        SX      FILTER_OUT                 ; and store last one as output signal
        LX      UBUF_PTR
        LY      ABUF_PTR
        LZ      UBUF_PTR
        LPARAM  LATT_U
        VCLATP                             ; Update all u values
        DECX                               ; and adjust pointer
        SX      UBUF_PTR                   ; of UBUF for the next time-step
        HALT
; Inverse lattice filter implementation:
; Note: here the d and u values are stored backwards in the DBUF and UBUF,
;       with d_0 stored in DBUF-L- and d_L in DBUF-0-. Similarly for u.
INV_LATT:
        LX      INV_FILTER_IN              ; Read input signal (filtered)
        SX      DBUF_0                     ; and store as d_L
        LX      UBUF_PTR
        LY      BBUF_PTR
        LZ      DBUF_PTR
        LPARAM  INV_LATT_D
        VCLATP                             ; Compute all d values
        LX      DBUF_L
        SX      INV_FILTER_OUT             ; and store last one as output signal
        SX      UBUF_L                     ; and also as u_0 value
        LX      UBUF_PTR
        LY      ABUF_PTR
        LZ      UBUF_PTR
        LPARAM  INV_LATT_U
        VCMAD                              ; Update all u values
        INCX                               ; and adjust pointer
        SX      UBUF_PTR
        HALT
```

If the "a" and "b" coefficients are complex-conjugates, it is not necessary to reserve two separate vector buffers for them. It is possible to use a single buffer for these values and specify a COJ=1 modifier in the PARAM register when operation with their conjugates is needed.

The above description is suitable for a complex-valued filter. In the case of a real-valued filter, the same scheme is used with the VCLATP and VCMAD operations replaced by VRLATP and VRMAD, respectively. The corresponding changes in the date-structure specifications are straightforward to one skilled in the art.

It should be understood that various alternatives to the embodiment of the invention described herein may be employed in practicing the invention. It is intended that the following claims define the scope of the invention and that methods and apparatus within the scope of these claims and their equivalents be covered thereby.

What is claimed is:

1. An integrated circuit data processing system comprising:

an internal bus for transferring both data and instructions;

a bus interface unit connected to the internal bus and connectable via an external bus to an external memory array such that instructions and data held in the external memory array are transferrable to the internal bus via the bus interface unit;

a central processing unit (CPU) connected to the internal bus for retrieving CPU instructions, the CPU including means for executing CPU instructions to process data retrieved by the CPU from the internal bus in accordance with cycles of a CPU clock signal provided to the CPU;

first and second independent clock sources that provide first and second clock signals, respectively, that operate at first and second different asynchronous frequencies, respectively;

means for switching the CPU clock signal from the first clock source to the second clock source while the CPU continues to execute CPU instructions.

2. An integrated circuit data processing system as in claim 1 and further comprising means for turning off the first clock source when switching to the second clock source is completed.

* * * * *